(12) United States Patent
Rastegardoost et al.

(10) Patent No.: US 12,549,219 B2
(45) Date of Patent: Feb. 10, 2026

(54) FREQUENCY HOPPING OPERATION FOR NEW RADIO

(71) Applicant: Ofinno, LLC, Reston, VA (US)

(72) Inventors: Nazanin Rastegardoost, McLean, VA (US); Esmael Hejazi Dinan, McLean, VA (US); Yunjung Yi, Vienna, VA (US); Hua Zhou, Vienna, VA (US); Ali Cagatay Cirik, Chantilly, VA (US)

(73) Assignee: Ofinno, LLC, Reston, VA (US)

( * ) Notice: Subject to any disclaimer, the term of this patent is extended or adjusted under 35 U.S.C. 154(b) by 211 days.

(21) Appl. No.: 18/125,023

(22) Filed: Mar. 22, 2023

(65) Prior Publication Data

US 2023/0223985 A1 Jul. 13, 2023

Related U.S. Application Data

(63) Continuation of application No. PCT/US2021/052666, filed on Sep. 29, 2021.
(Continued)

(51) Int. Cl.
 *H04B 1/713* (2011.01)
 *H04B 1/7143* (2011.01)
(Continued)

(52) U.S. Cl.
 CPC ........... *H04B 1/713* (2013.01); *H04B 1/7143* (2013.01); *H04W 72/23* (2023.01); *H04W 76/38* (2018.02)

(58) Field of Classification Search
 CPC .. H04B 1/713; H04B 1/7136; H04B 1/71362; H04B 1/7143; H04B 2002/6908;
(Continued)

(56) References Cited

U.S. PATENT DOCUMENTS

| 10,574,419 B2 | 2/2020 | Chatterjee et al. |
| 2015/0131579 A1* | 5/2015 | Li ..................... H04L 1/1858 370/329 |

(Continued)

FOREIGN PATENT DOCUMENTS

| CN | 111406378 A | 7/2020 |
| EP | 3462795 A1 | 4/2019 |

(Continued)

OTHER PUBLICATIONS

3GPP TS 36.331 V15.4.0 (Dec. 2018); Technical Specification; 3rd Generation Partnership Project; Technical Specification Group Radio Access Network; Evolved Universal Terrestrial Radio Access (E-UTRA); Radio Resource Control (RRC); Protocol specification; (Release 15).

(Continued)

*Primary Examiner* — Young T. Tse
(74) *Attorney, Agent, or Firm* — Matthew Fernandez; Kavon Nasabzadeh; Jacob L. Mangan

(57) ABSTRACT

A wireless device may receive configuration parameters indicating a hopping pattern of bandwidth parts (BWPs) of a cell. The wireless device may start a BWP inactivity timer in response to activating a first BWP of the cell. In response to activating the hopping pattern, the wireless device may stop the BWP inactivity timer or it may deactivate the first BWP.

20 Claims, 26 Drawing Sheets

Related U.S. Application Data

(60) Provisional application No. 63/084,807, filed on Sep. 29, 2020.

(51) Int. Cl.
  *H04W 72/23* (2023.01)
  *H04W 76/38* (2018.01)

(58) Field of Classification Search
  CPC ... H04L 5/0005; H04L 5/0007; H04L 5/0012; H04W 72/21; H04W 72/23; H04W 76/38
  USPC ........ 375/132, 133, 135, 136, 138, 259, 260
  See application file for complete search history.

(56) References Cited

U.S. PATENT DOCUMENTS

| | | | |
|---|---|---|---|
| 2016/0295345 | A1 | 10/2016 | Oh |
| 2019/0053211 | A1* | 2/2019 | Ying ................... H04W 72/044 |
| 2019/0109732 | A1* | 4/2019 | Choi ..................... H04L 5/0051 |
| 2019/0132109 | A1 | 5/2019 | Zhou et al. |
| 2020/0145169 | A1 | 5/2020 | Zhou et al. |
| 2020/0259601 | A1* | 8/2020 | Zhou ..................... H04L 5/0085 |
| 2020/0314885 | A1* | 10/2020 | Cirik ..................... H04L 5/0048 |
| 2021/0051673 | A1* | 2/2021 | Chae ..................... H04W 72/23 |
| 2021/0075579 | A1 | 3/2021 | Liu et al. |

FOREIGN PATENT DOCUMENTS

| | | |
|---|---|---|
| EP | 3531566 A1 | 8/2019 |
| WO | 2020/033785 A1 | 2/2020 |

OTHER PUBLICATIONS

3GPP TS 38.211 V16.2.0 (Jun. 2020); Technical Specification; 3rd Generation Partnership Project; Technical Specification Group Radio Access Network; NR; Physical channels and modulation; (Release 16).

3GPP TS 38.212 V16.2.0 (Jun. 2020); Technical Specification; 3rd Generation Partnership Project; Technical Specification Group Radio Access Network; NR; Multiplexing and channel coding; (Release 16).

3GPP TS 38.213 V16.2.0 (Jun. 2020); Technical Specification; 3rd Generation Partnership Project; Technical Specification Group Radio Access Network; NR; Physical layer procedures for control; (Release 16).

3GPP TS 38.214 V16.2.0 (Jun. 2020); Technical Specification; 3rd Generation Partnership Project; Technical Specification Group Radio Access Network; NR; Physical layer procedures for data; (Release 16).

3GPP TS 38.321 V16.1.0 (Jul. 2020); Technical Specification; 3rd Generation Partnership Project; Technical Specification Group Radio Access Network; NR; Medium Access Control (MAC) protocol specification; (Release 16).

3GPP TS 38.331 V16.1.0 (Jul. 2020); Technical Specification; 3rd Generation Partnership Project; Technical Specification Group Radio Access Network; NR; Radio Resource Control (RRC) protocol specification; (Release 16).

R1-2005234; 3GPP TSG-RAN WG1 Meeting #102-e; e-Meeting, Aug. 17-28, 2020; Agenda Item: 8.6.1; Source: Ericsson; Title: Potential UE complexity reduction features for RedCap; Document for: Discussion and Decision.

R1-2005236; 3GPP TSG-RAN WG1 Meeting #102e; e-Meeting, Aug. 17-28, 2020; Agenda Item: 8.6.3; Source: Ericsson; Title: Coverage recovery and capacity impact for RedCap; Document for: Discussion and Decision.

R1-2005271; 3GPP TSG RAN WG1 Meeting #102-e; E-meeting, Aug. 17-Aug. 28, 2020; Agenda Item: 8.6.3; Source: Huawei, HiSilicon; Title: Functionality for coverage recovery; Document for: Discussion and Decision.

R1-2005385; 3GPP TSG-RAN WG1 #102; e-Meeting, Aug. 17-28, 2020; Source: vivo, Guangdong Genius, GDCNI; Title: Discussion on functionality for coverage recovery; Agenda Item: 8.6.3; Document for: Discussion and Decision.

R1-2005474; 3GPP TSG RAN WG1#102-e; e-Meeting, Aug. 17-28, 2020; Title: Potential UE complexity reduction features; Source: ZTE; Agenda item: 8.3.1; Document for: Discussion and decision.

R1-2006406; 3GPP TSG RAN WG1 Meeting #102-e; E-meeting, Aug. 17-28, 2020; Agenda Item: 8.6.4; Source: Huawei, HiSilicon; Title: Framework and principles for reduced capability devices; Document for: Discussion and Decision.

R1-2006542; 3GPP TSG RAN WG1 #102-e; e-Meeting, Aug. 17-28, 2020; Agenda item: 8.6.1; Source: Quectel; Title: On Impacts of UE Bandwidth Reduction; Document for: Discussion and Decision.

R1-2006630; 3GPP TSG-RAN WG1 #102-e; e-Meeting, Aug. 17-Aug. 28, 2020; Agenda item: 8.6.3 Coverage recovery and capacity impact; Title: On coverage recovery for reduced capability UEs; Source: Convida Wireless; Document for: Discussion.

R1-2006811; 3GPP TSG-RAN WG1 Meeting #102; e-Meeting, Aug. 17-Aug. 28, 2020; Agenda item: 8.6.1; Source: Qualcomm Incorporated; Title: UE Complexity Reduction for NR RedCap Devices; Document for: Discussion/Decision.

R1-2006813; 3GPP TSG-RAN WG1 Meeting #102-e; e-Meeting, Aug. 17-28, 2020; Agenda item: 8.6.3; Source: Qualcomm Incorporated; Title: Coverage Recovery for RedCap Devices; Document for: Discussion/Decision.

R1-2007312; 3GPP TSG RAN WG1 #102-e; e-Meeting, Aug. 17-28, 2020; Agenda item: 8.6.3; Source: Moderator (Qualcomm Inc.); Title: FL summary #3 on Coverage Recovery and Capacity Impact for NR RedCap; Document for: Discussion/decision.

R1-2007331; 3GPP TSG-RAN WG1 Meeting #102-e; e-Meeting, Aug. 17-28, 2020; Agenda Item:8.6.1; Title: FL summary #5 for Potential UE complexity reduction features for RedCap; Source: Moderator (Ericsson); Document for: Discussion, Decision.

3GPP TS 36.211 V15.4.0 (Dec. 2018); Technical Specification; 3rd Generation Partnership Project; Technical Specification Group Radio Access Network; Evolved Universal Terrestrial Radio Access (E-UTRA); Physical channels and modulation; (Release 15).

3GPP TSG RAN WG1 Meeting #102-e; e-Meeting, Aug. 17-28, 2020; Title: RAN1 Chairman's Notes.

3GPP TSG RAN WG1 Meeting #101-e; e-Meeting, May 25-Jun. 5, 2020; Title: RAN1 Chairman's Notes.

MEHARI; Frequency Hopping in LTE Uplink; Mar. 2009; Blekinge Institute of Technology; MEE09:23; Ericsson.

International Search Report and Written Opinion of the International Searching authority mailed Mar. 22, 2022, in International Application No. PCT/US2021/052666.

R1-1804643; 3GPP TSG RAN WG1 Meeting #92bis; Sanya, China, Apr. 16-20, 2018; Source: Panasonic; Title: On support of faster inter-bandwidth part hopping for increased reliability; Agenda Item: 7.2.5; Document for: Discussion.

* cited by examiner

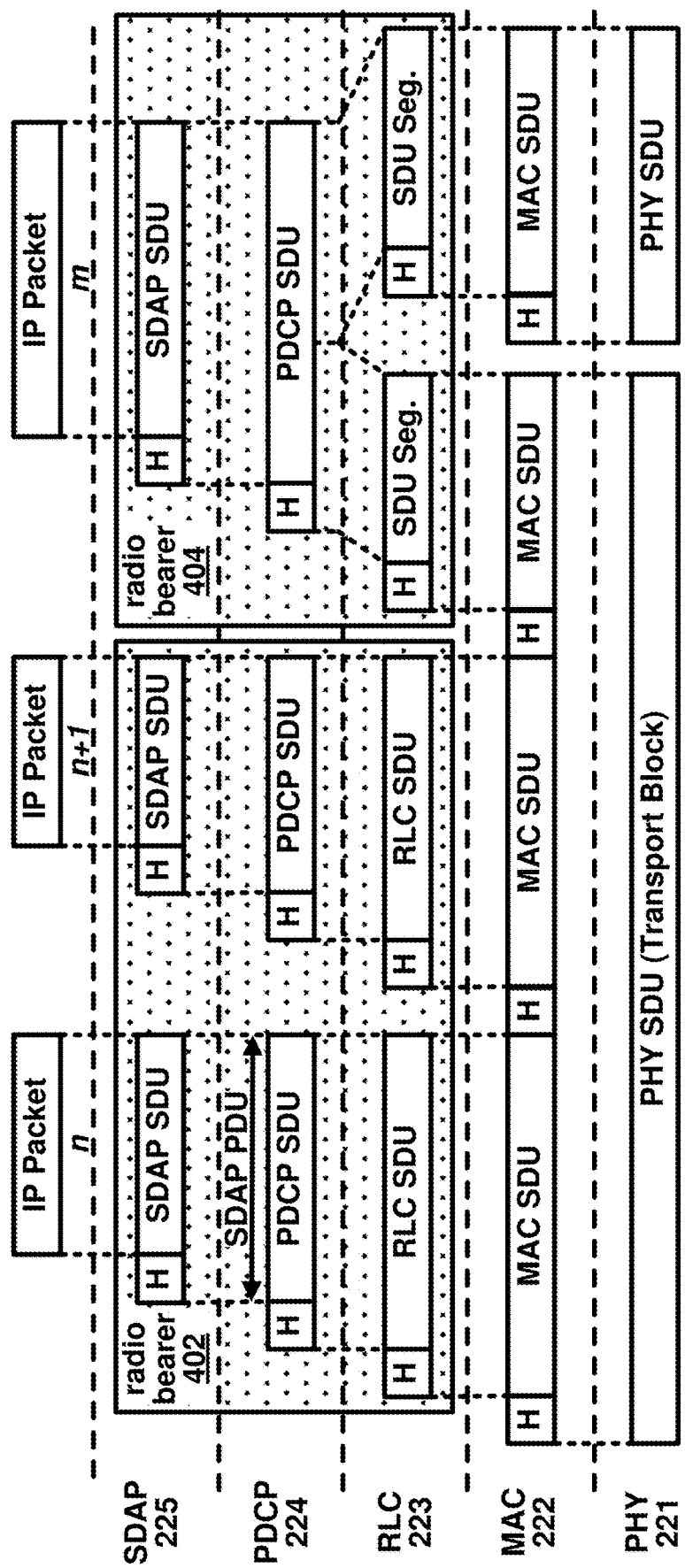
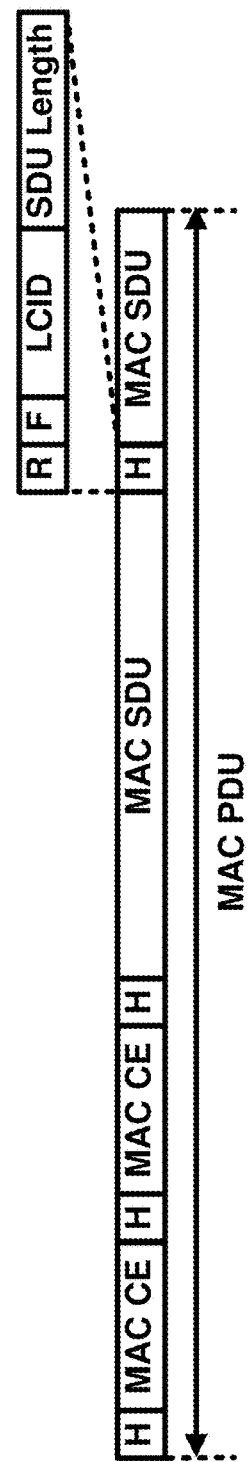
FIG. 4A
FIG. 4B

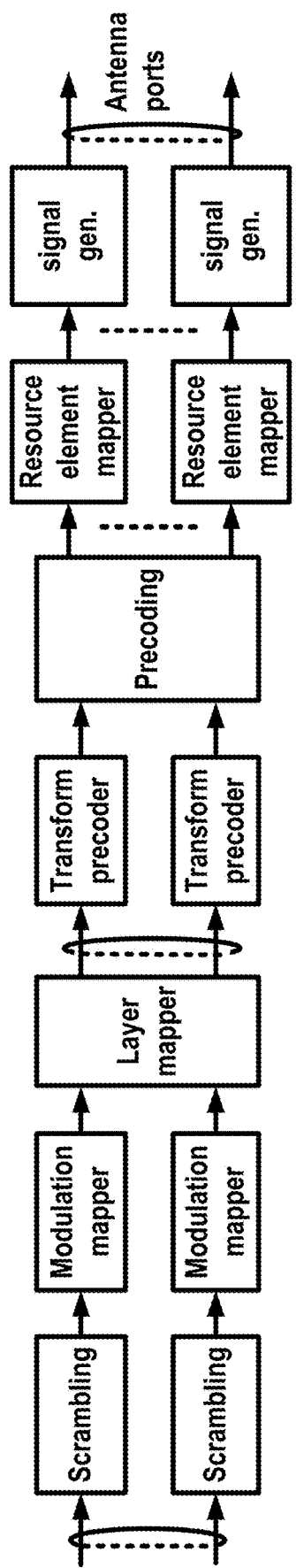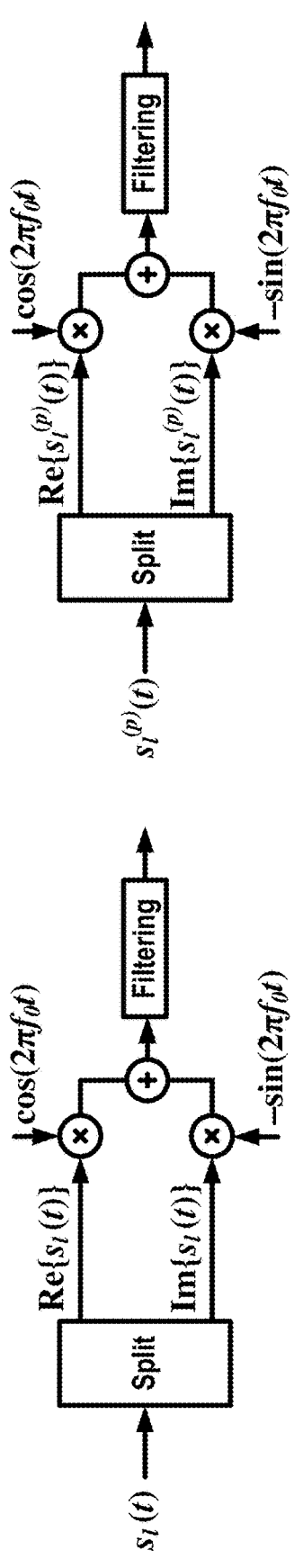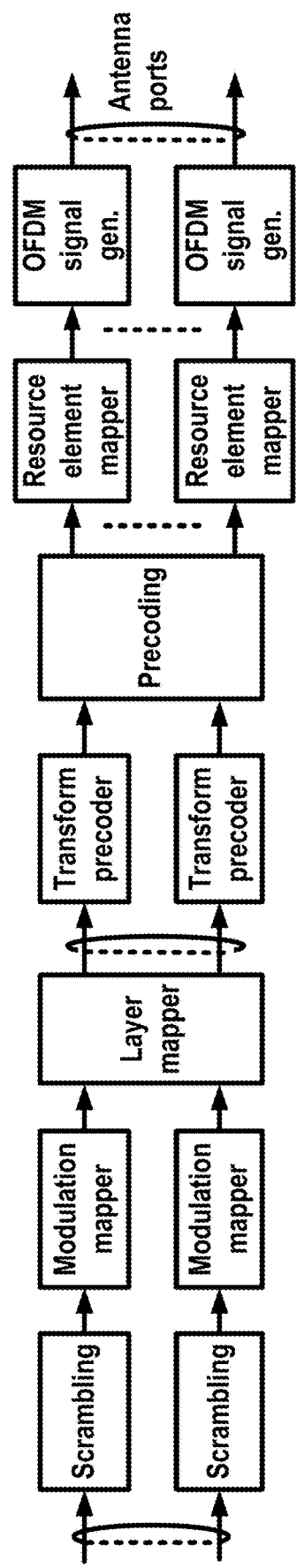
FIG. 16A
FIG. 16B
FIG. 16C
FIG. 16D

FREQUENCY HOPPING OPERATION FOR NEW RADIO

CROSS REFERENCE TO RELATED APPLICATIONS

This application is a continuation of International Application No. PCT/US2021/052666, filed Sep. 29, 2021, claims the benefit of U.S. Provisional Application No. 63/084,807, filed Sep. 29, 2020, the contents of which are hereby incorporated by reference in their entireties.

BRIEF DESCRIPTION OF THE DRAWINGS

Examples of several of the various embodiments of the present disclosure are described herein with reference to the drawings.

FIG. 4A illustrates an example downlink data flow through the NR user plane protocol stack of FIG. 2A.

FIG. 4B illustrates an example format of a MAC subheader in a MAC PDU.

FIG. 16A, FIG. 16B, FIG. 16C, and FIG. 16D illustrate example structures for uplink and downlink transmission.

DETAILED DESCRIPTION

Figure 1A:
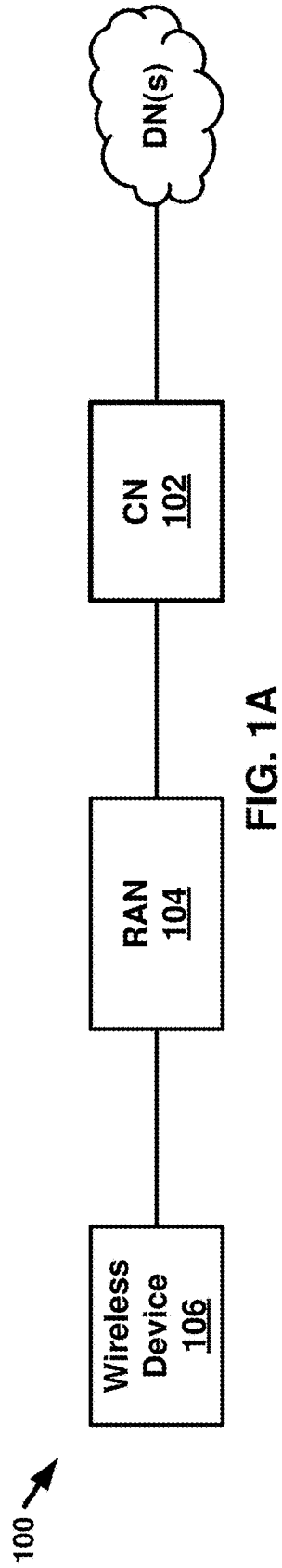
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
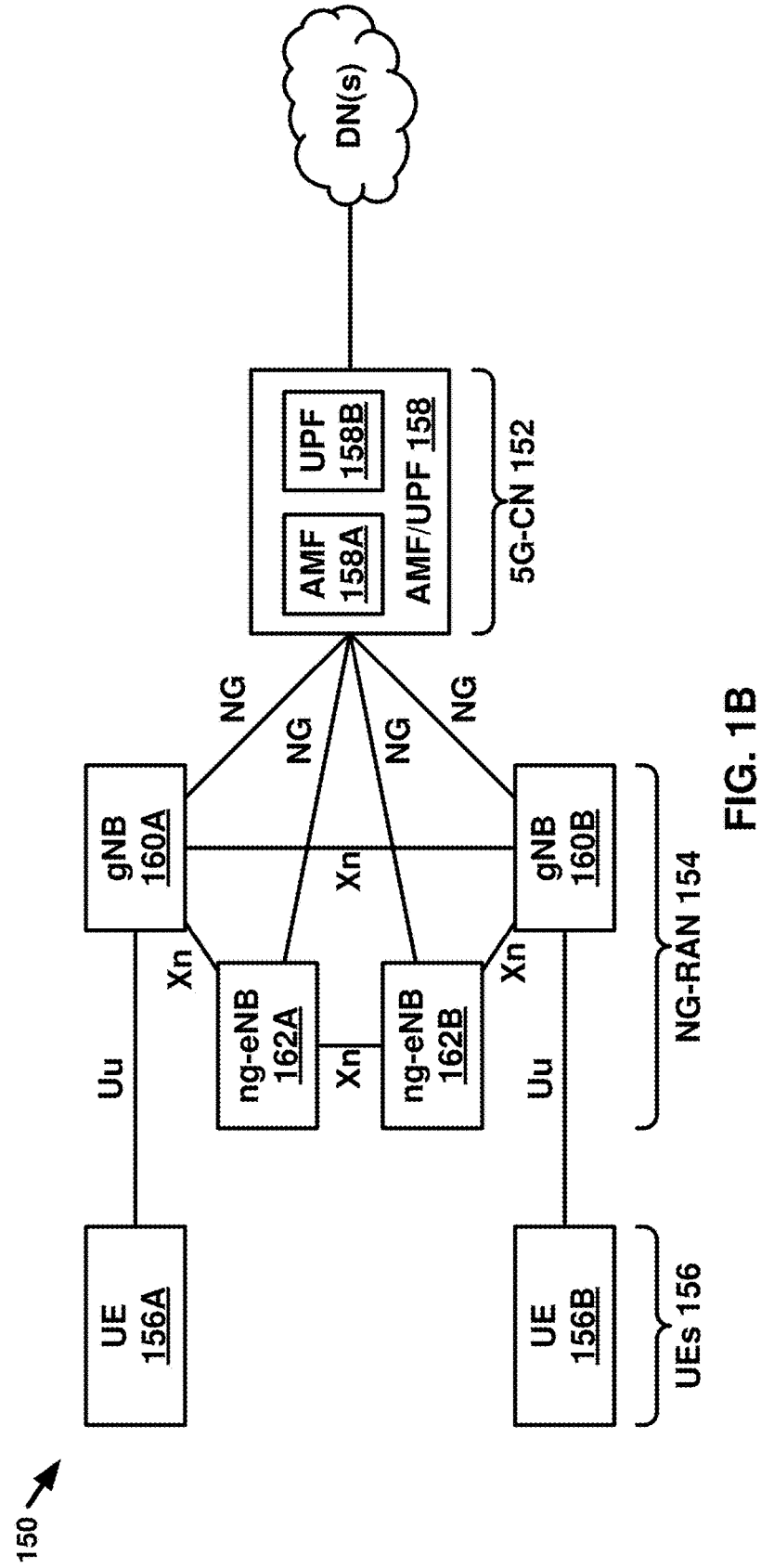

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
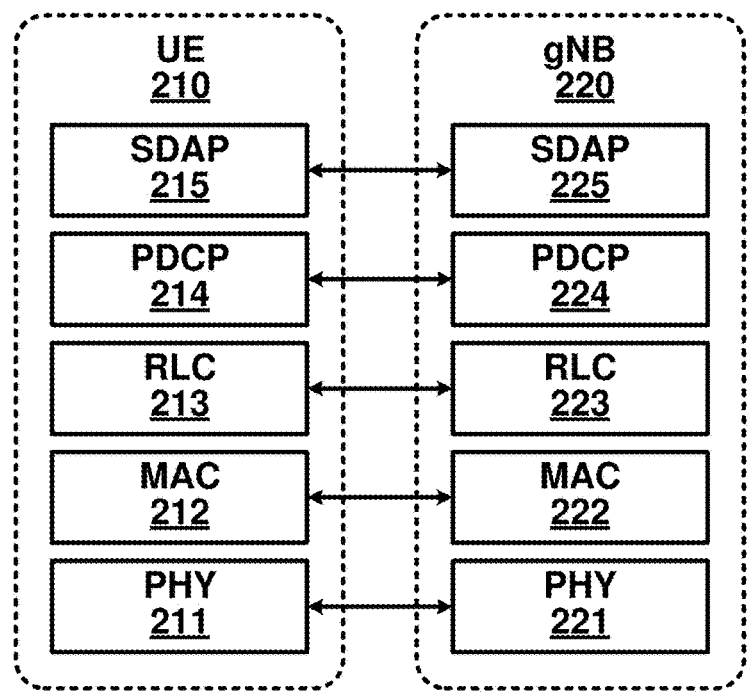
FIG. 2A and FIG. 2B respectively illustrate a New Radio (NR) user plane and control plane protocol stack.
Figure 2B:
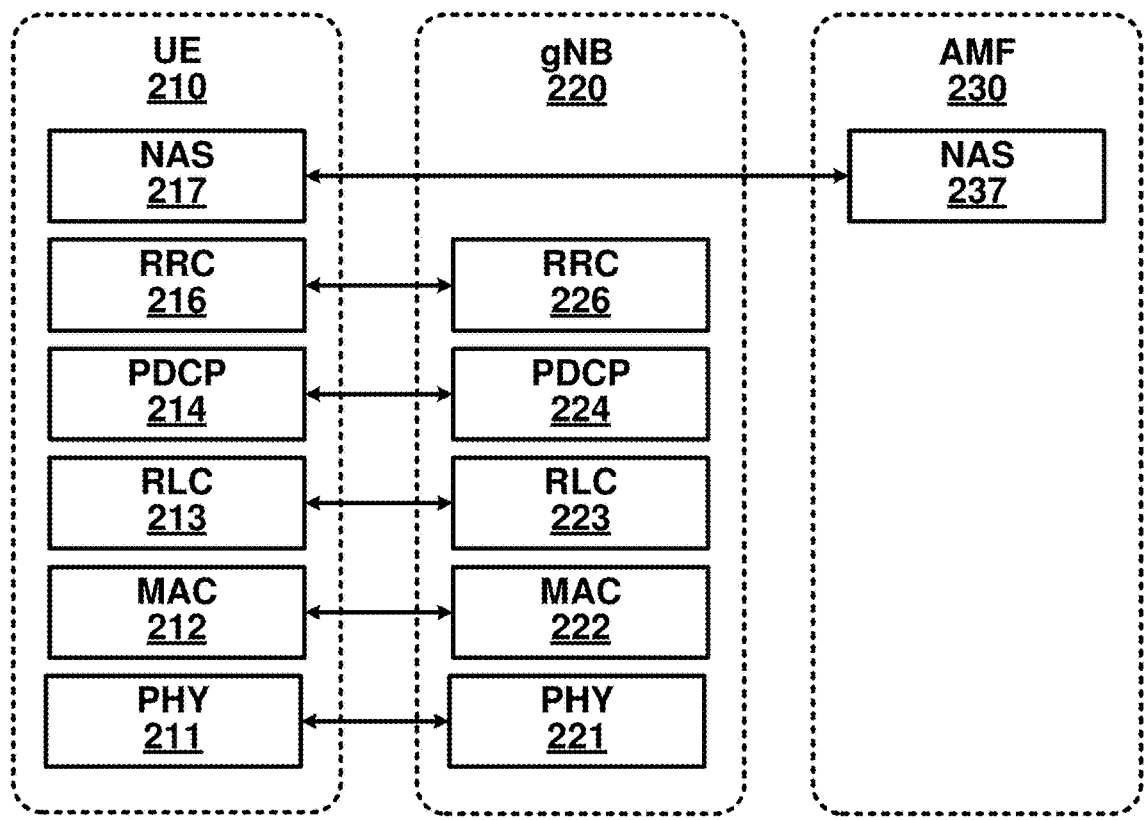

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
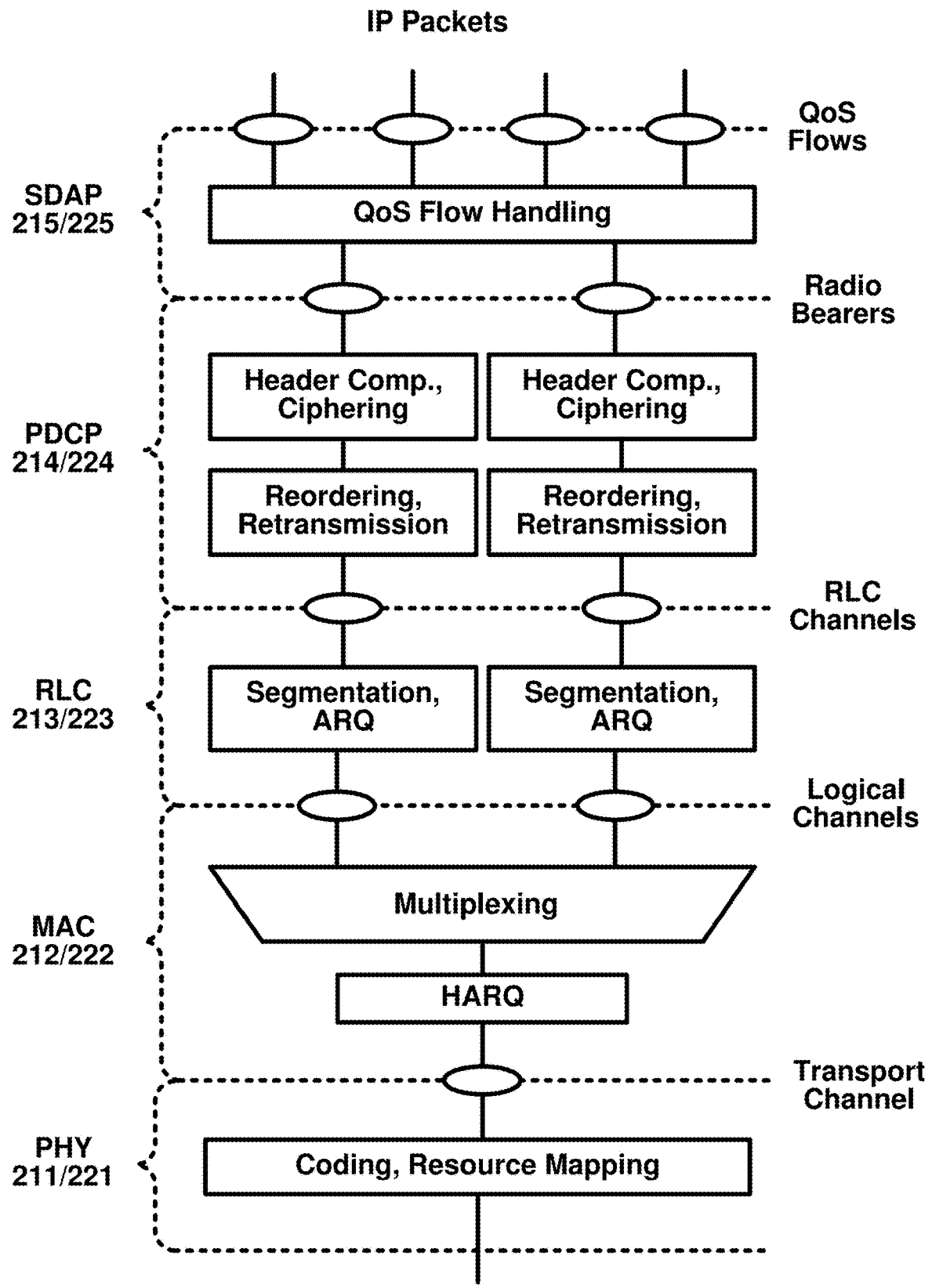
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
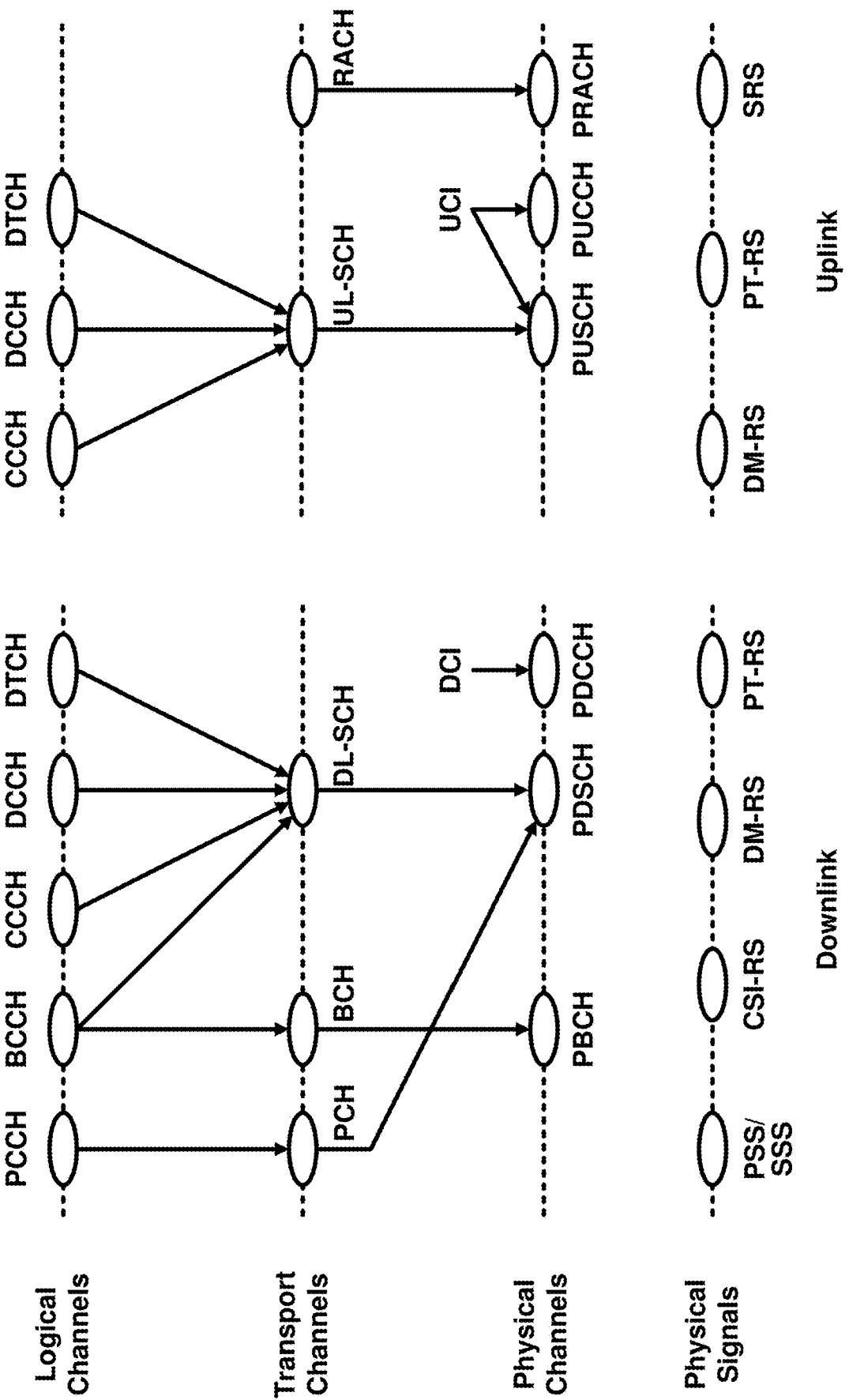
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;
  a broadcast control channel (BCCH) for carrying system information messages in the form of a master information block (MIB) and several system information blocks (SIBs), wherein the system information messages may be used by the UEs to obtain information about how a cell is configured and how to operate within the cell;
  a common control channel (CCCH) for carrying control messages together with random access;
  a dedicated control channel (DCCH) for carrying control messages to/from a specific the UE to configure the UE; and
  a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:
  a paging channel (PCH) for carrying paging messages that originated from the PCCH;
  a broadcast channel (BCH) for carrying the MIB from the BCCH;
  a downlink shared channel (DL-SCH) for carrying downlink data and signaling messages, including the SIBs from the BCCH;
  an uplink shared channel (UL-SCH) for carrying uplink data and signaling messages; and
  a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:
  a physical broadcast channel (PBCH) for carrying the MIB from the BCH;
  a physical downlink shared channel (PDSCH) for carrying downlink data and signaling messages from the DL-SCH, as well as paging messages from the PCH;
  a physical downlink control channel (PDCCH) for carrying downlink control information (DCI), which may include downlink scheduling commands, uplink scheduling grants, and uplink power control commands;
  a physical uplink shared channel (PUSCH) for carrying uplink data and signaling messages from the UL-SCH and in some instances uplink control information (UCI) as described below;
  a physical uplink control channel (PUCCH) for carrying UCI, which may include HARQ acknowledgments, channel quality indicators (CQI), pre-coding matrix indicators (PMI), rank indicators (RI), and scheduling requests (SR); and
  a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
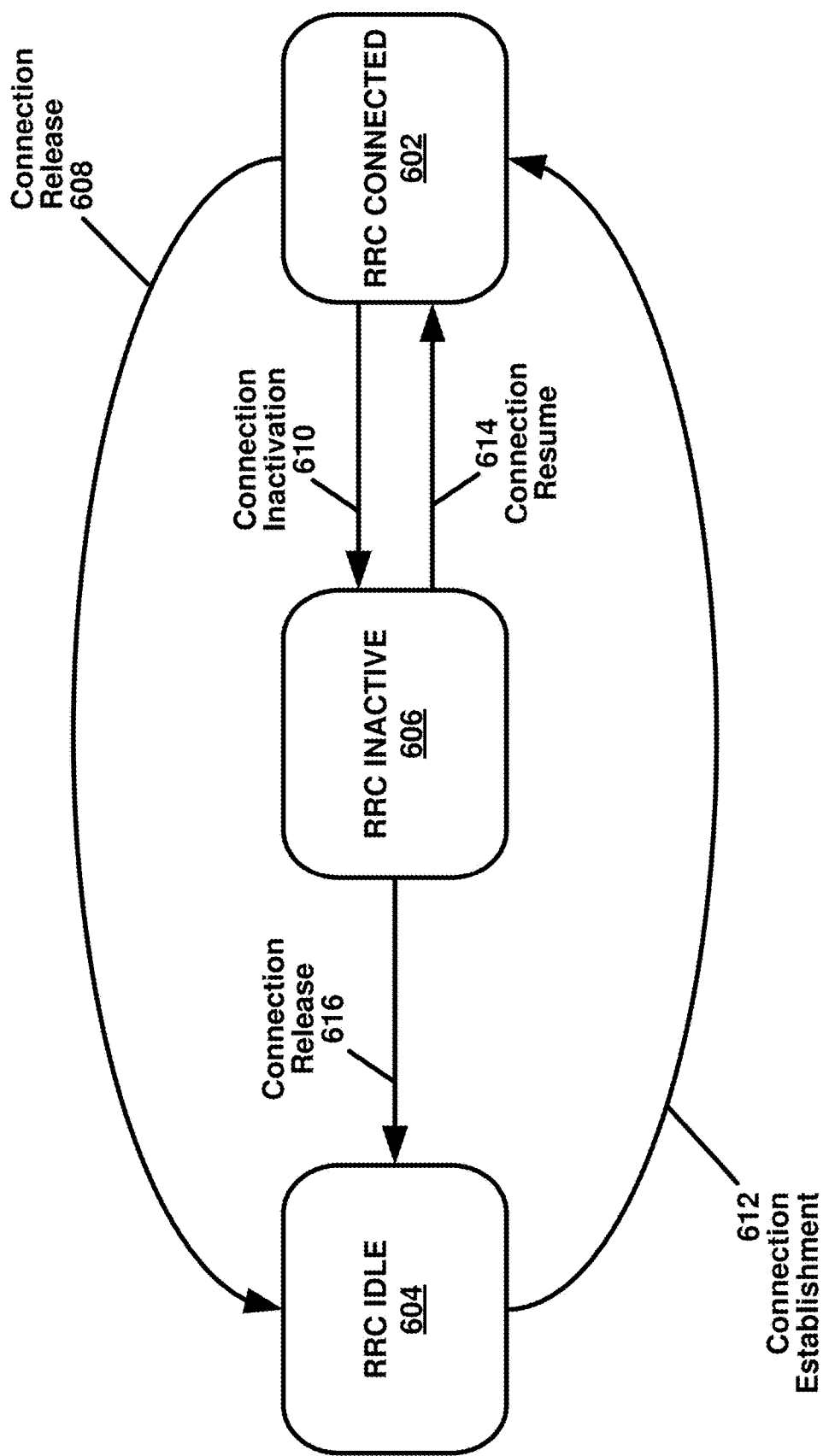
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
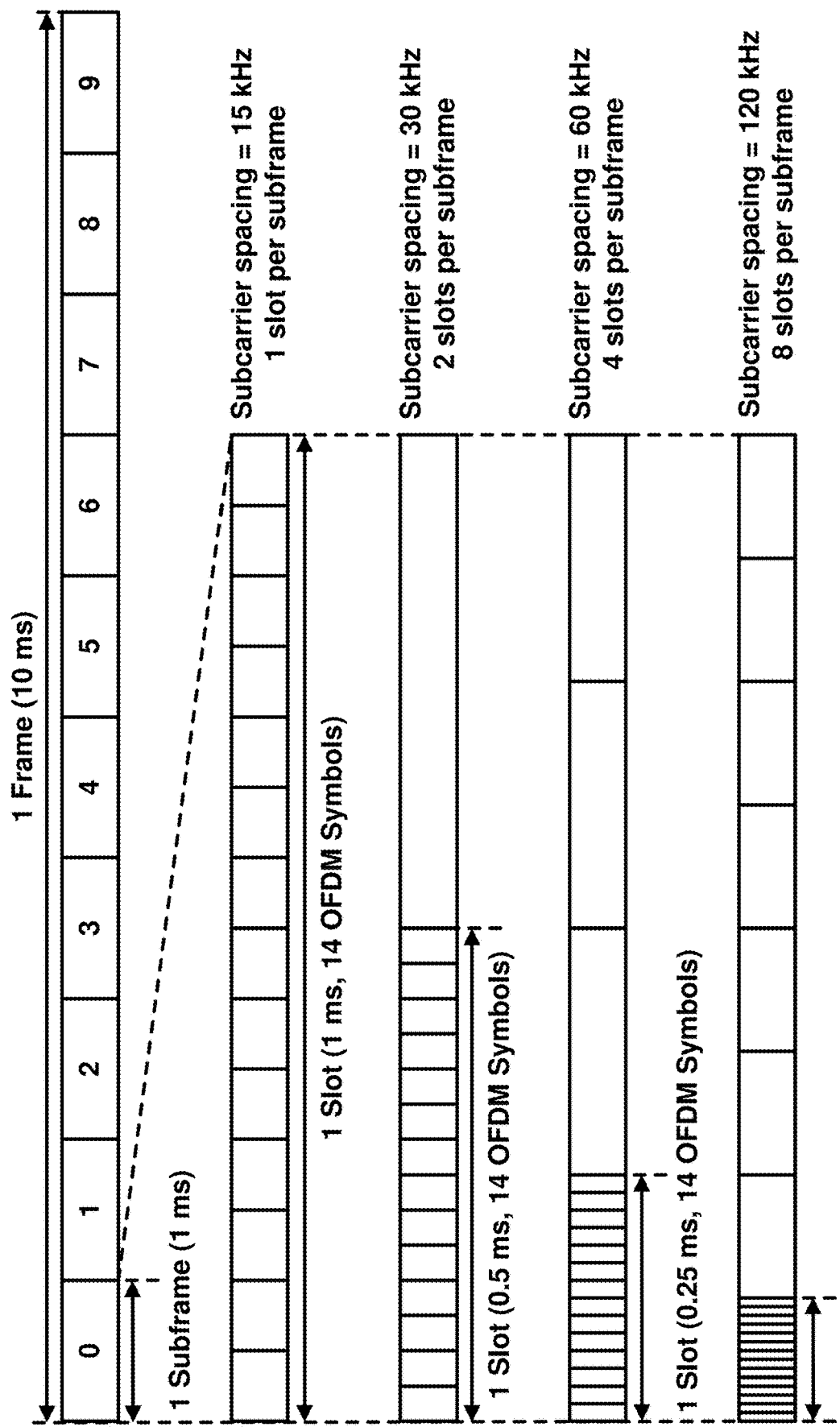
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
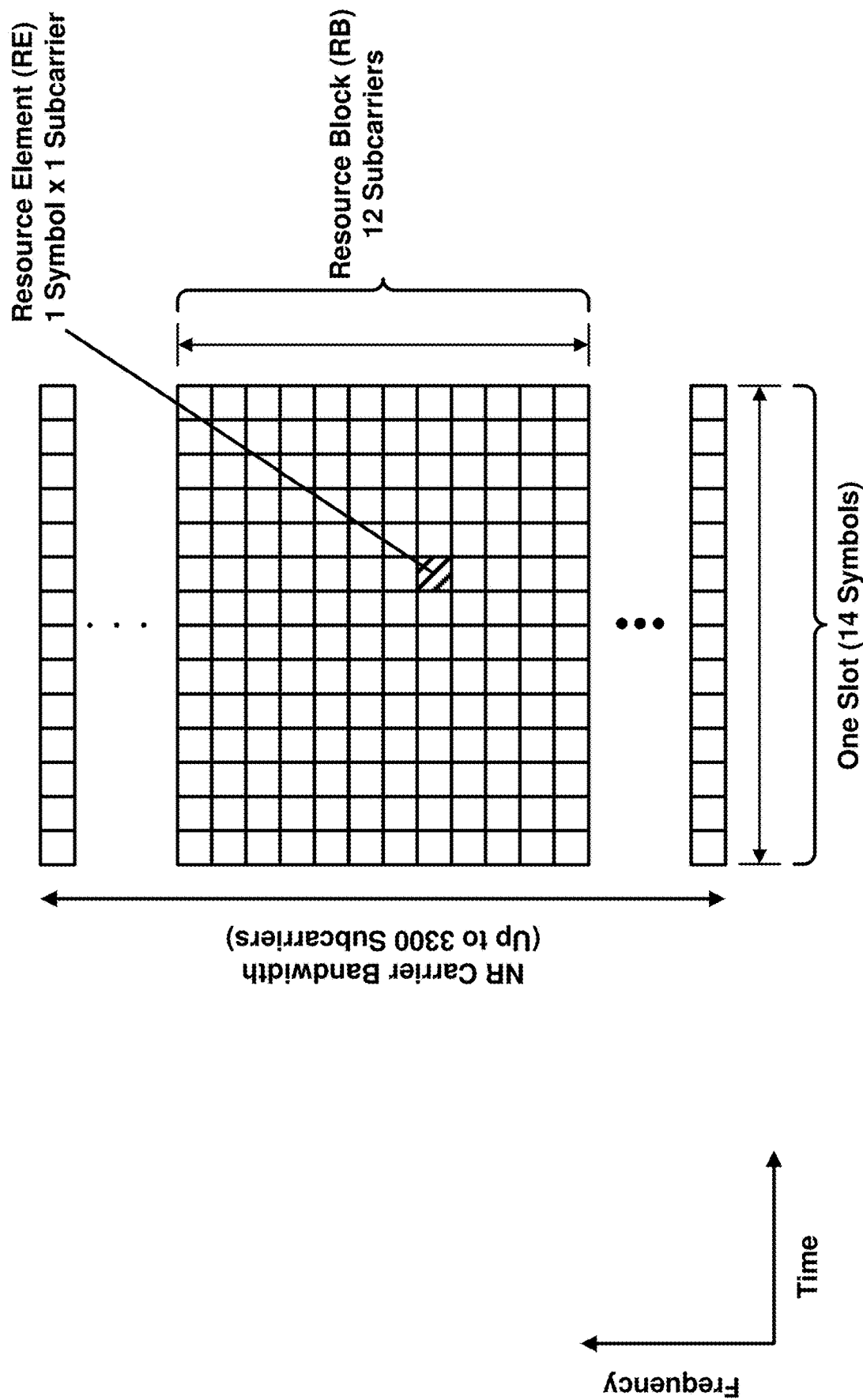
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
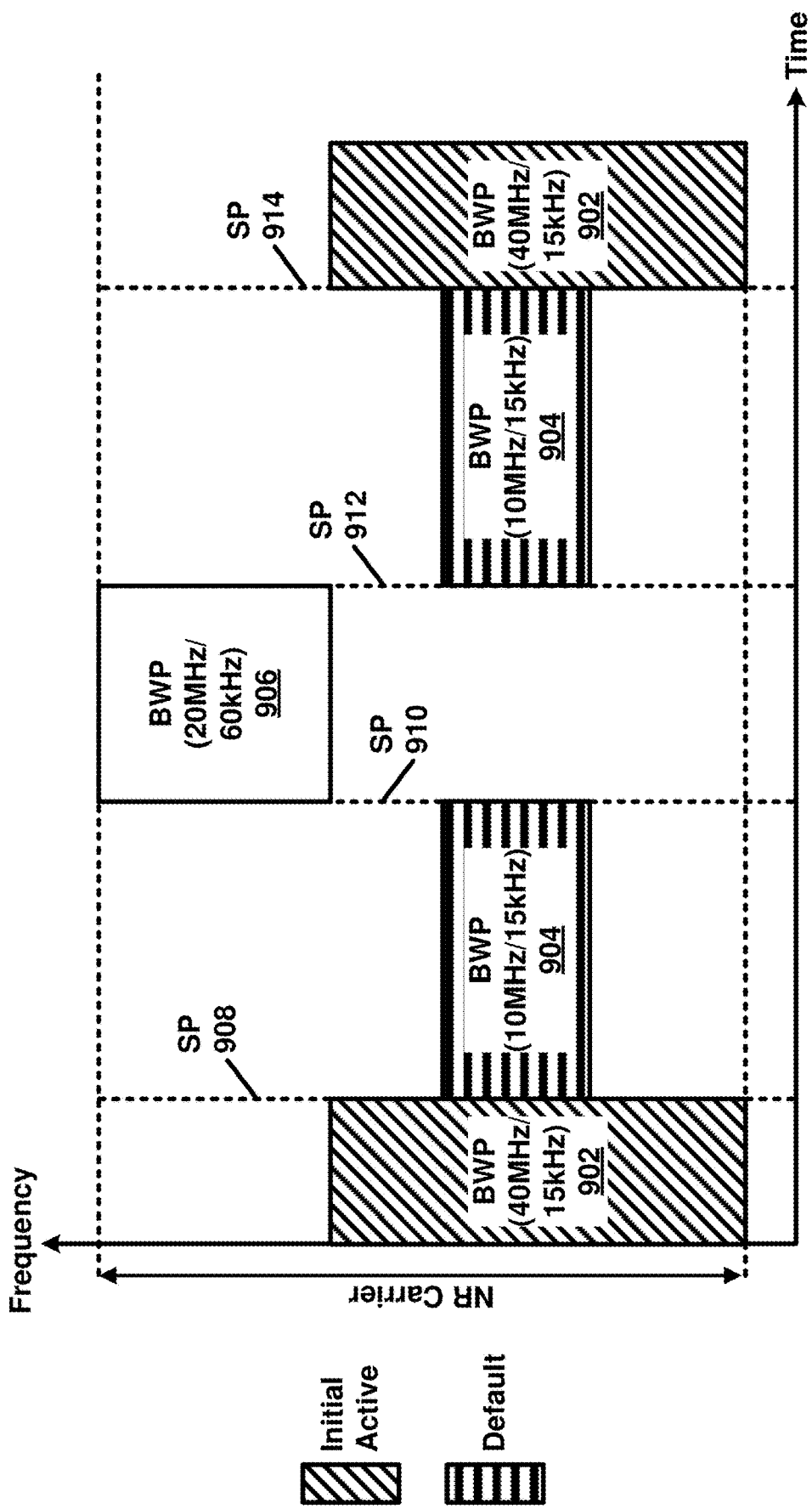
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
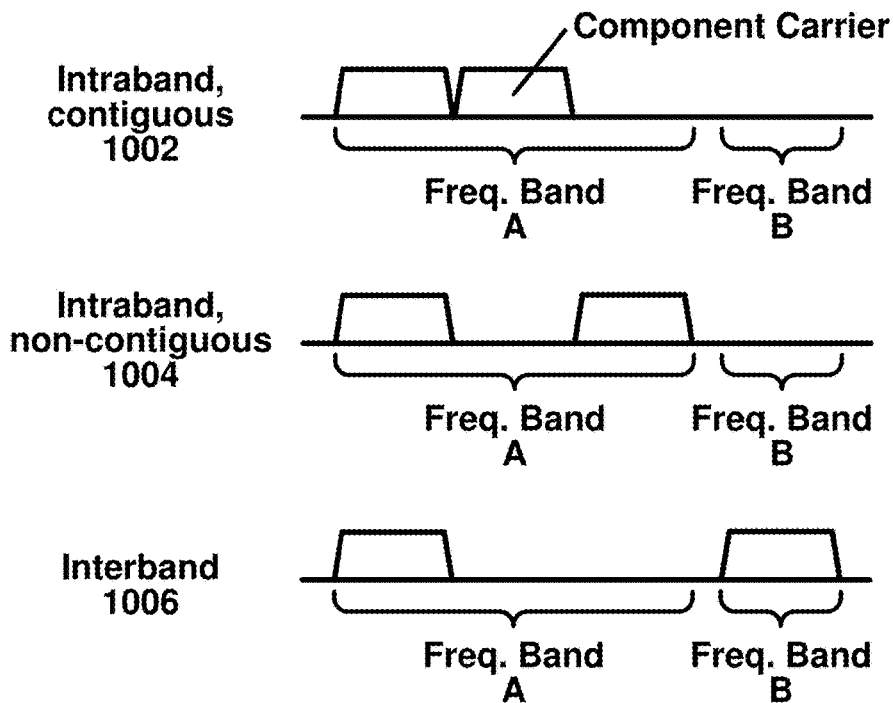
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
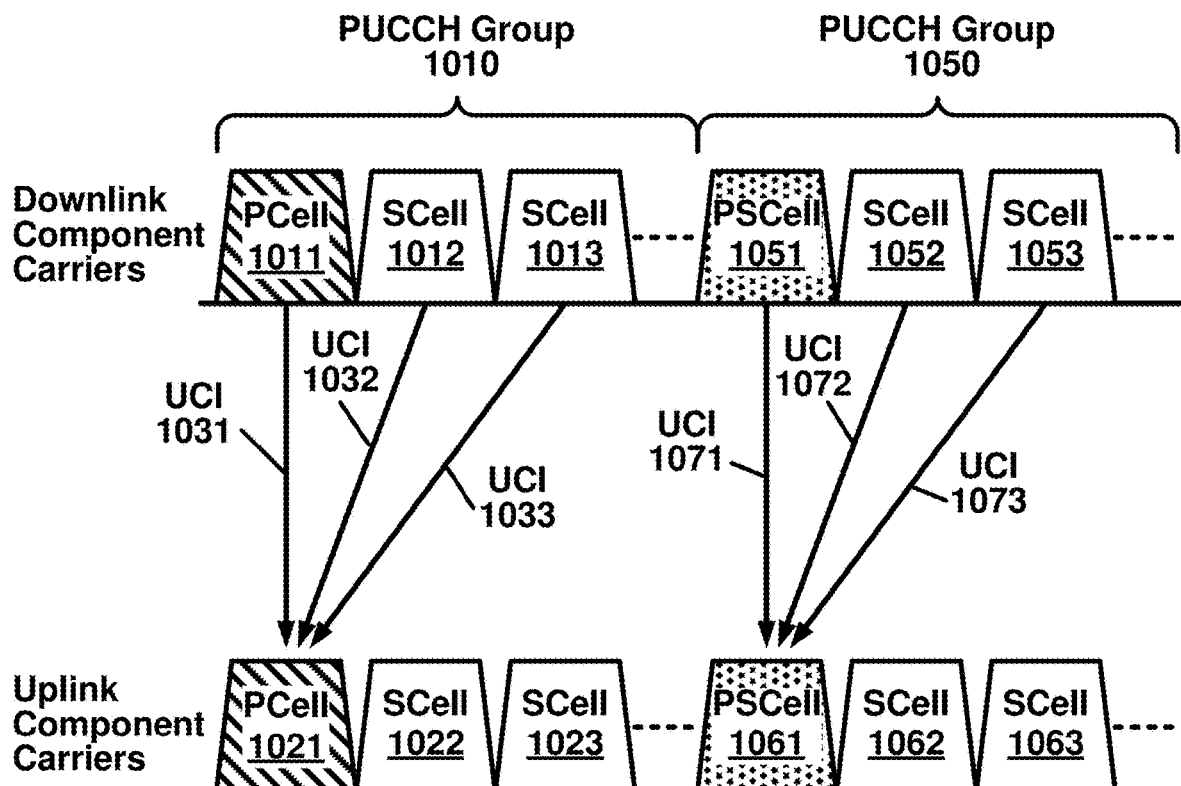
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
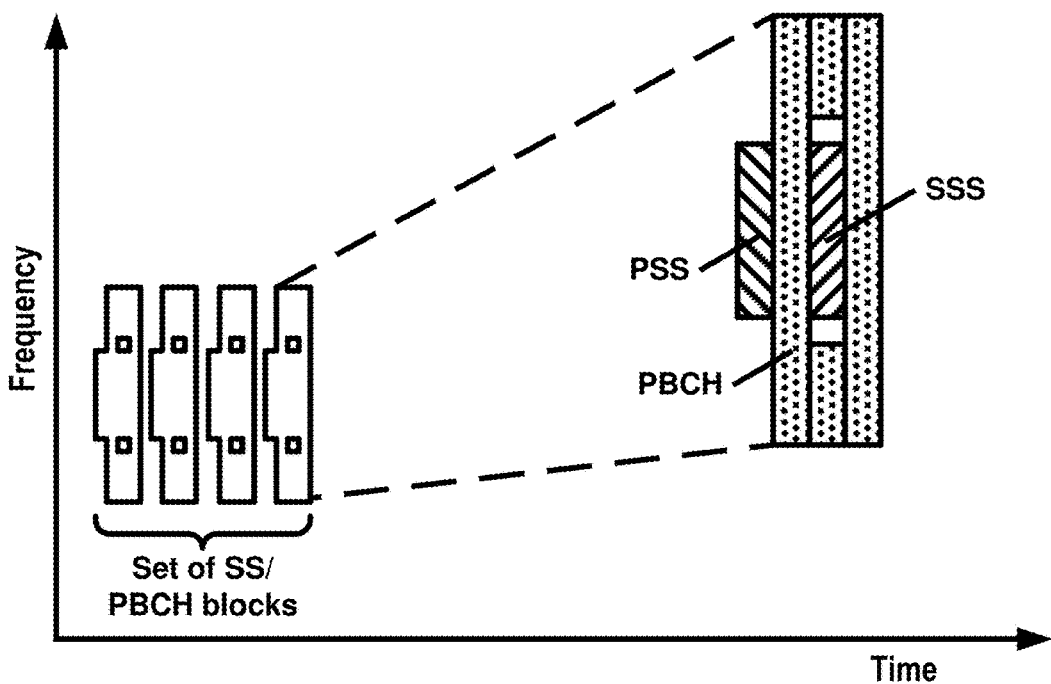
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
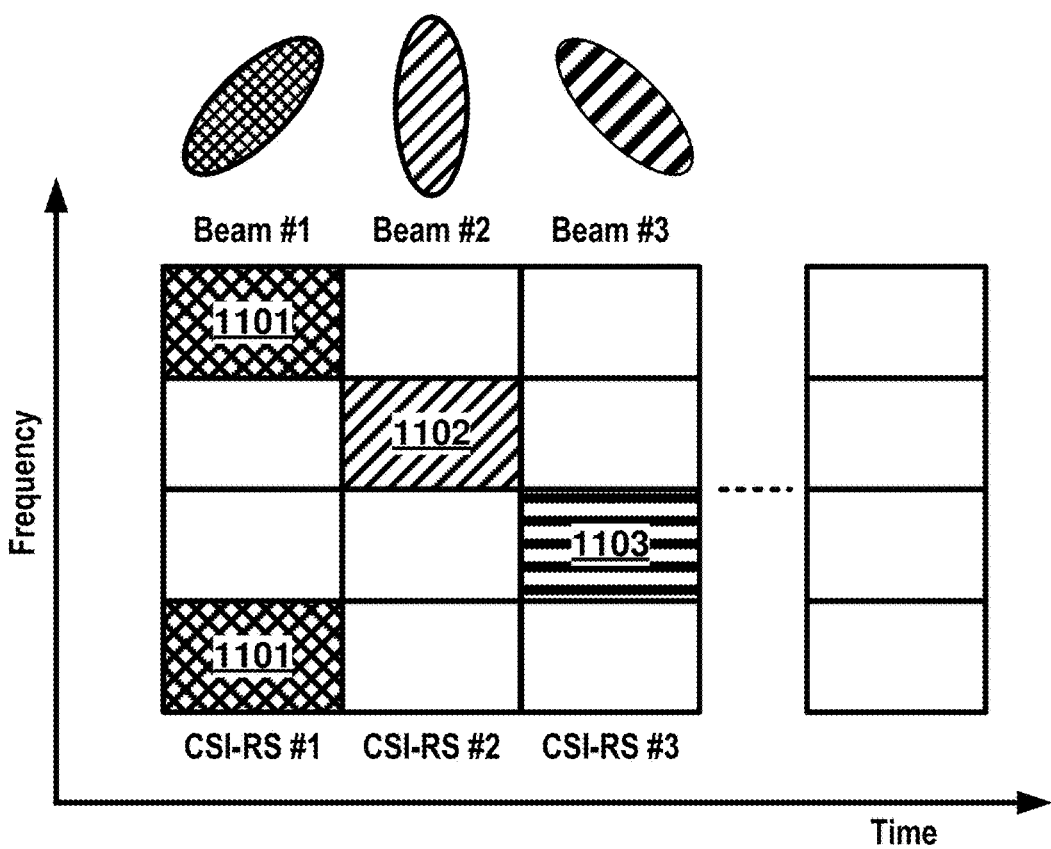
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figure 12A:
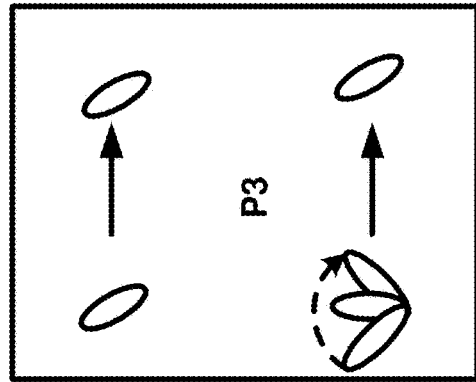
FIG. 12A and FIG. 12B respectively illustrate examples of three downlink and uplink beam management procedures.
Figure 12A:
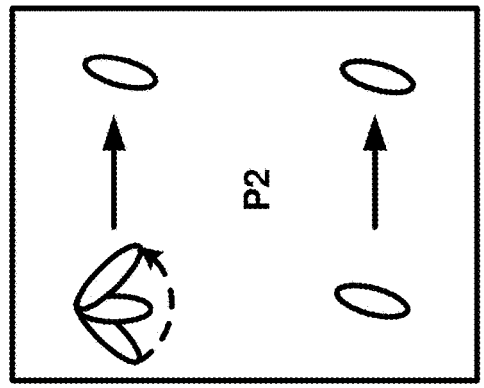
Figure 12A:
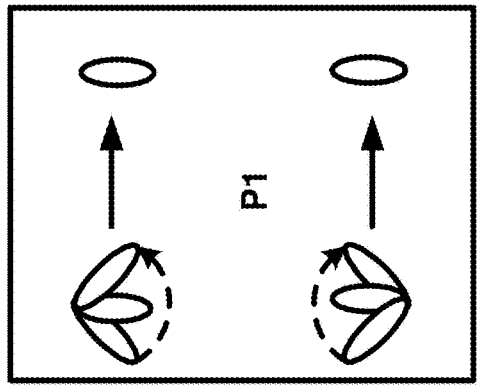
Figure 12A:
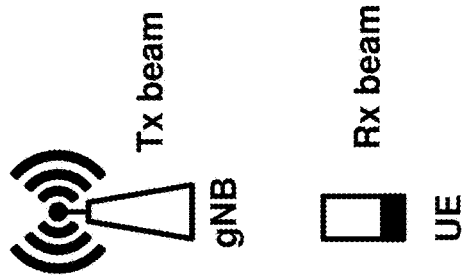

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

Figure 12B:
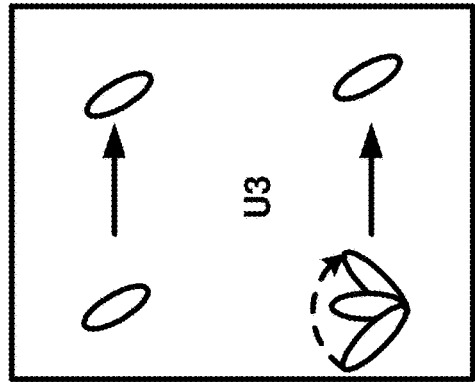
Figure 12B:
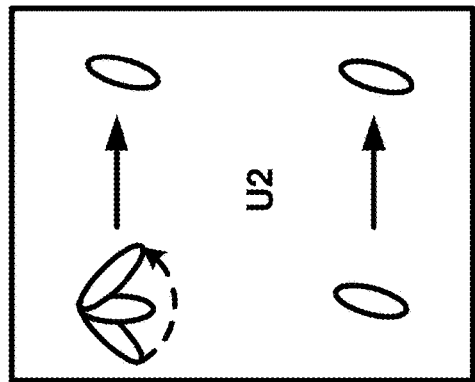
Figure 12B:
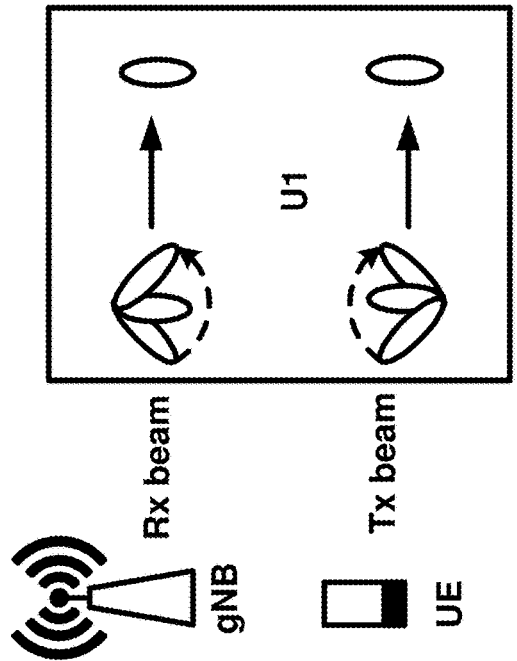

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
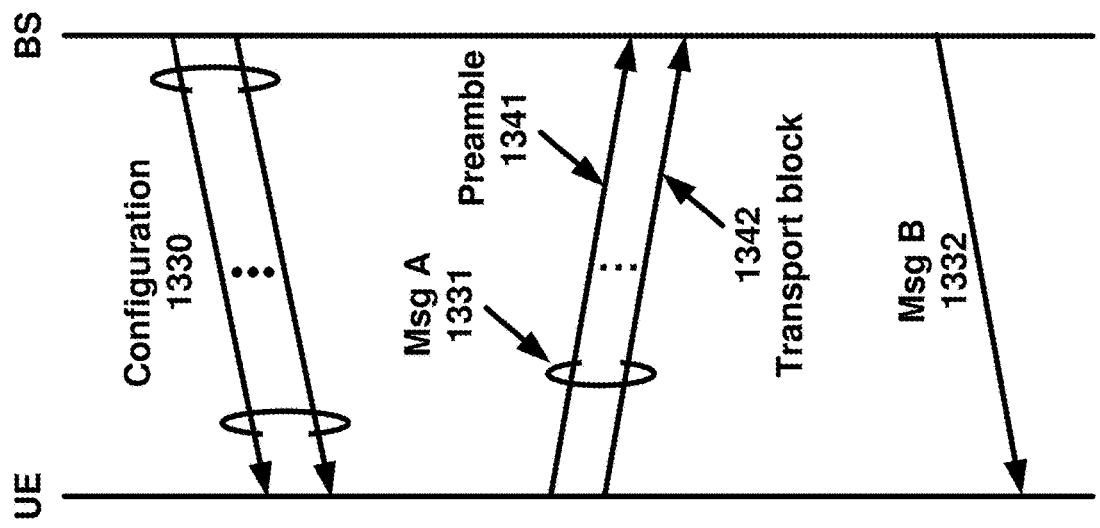
FIG. 13A, FIG. 13B, and FIG. 13C respectively illustrate a four-step contention-based random access procedure, a two-step contention-free random access procedure, and another two-step random access procedure.
Figure 13B:
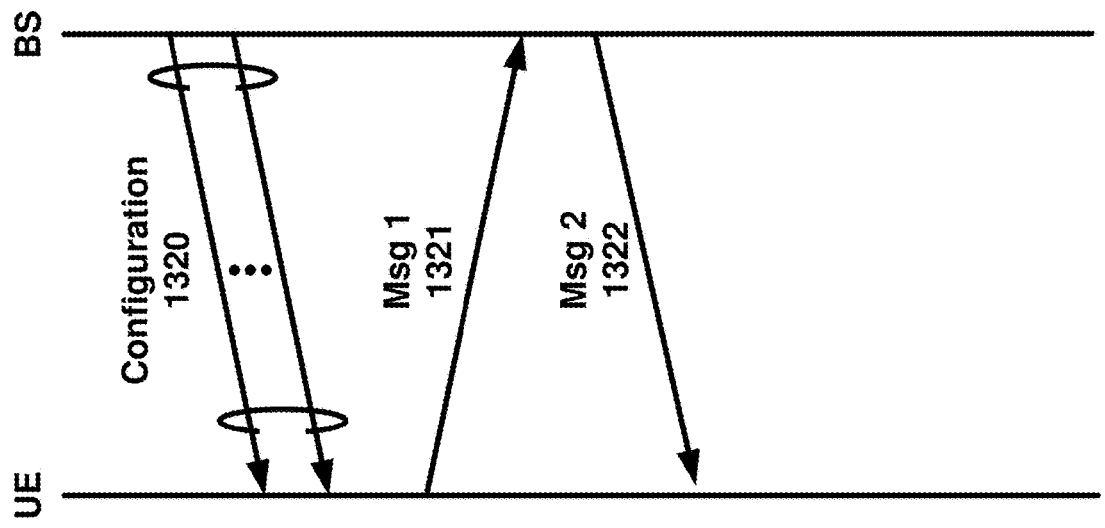
Figure 13A:
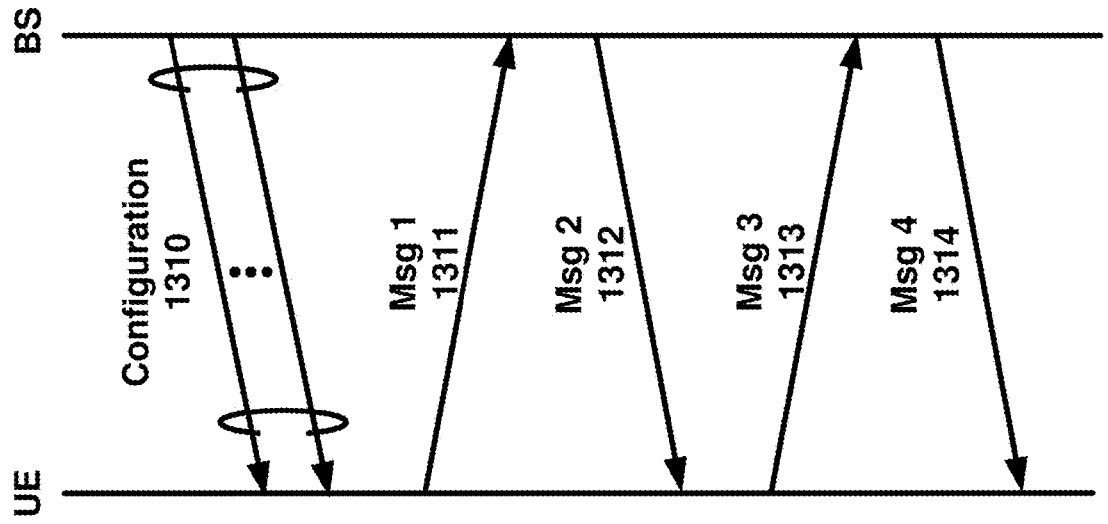

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$\text{RA-RNTI}=1+s\_id+14\times t\_id+14\times 80\times f\_id+14\times 80\times 8\times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
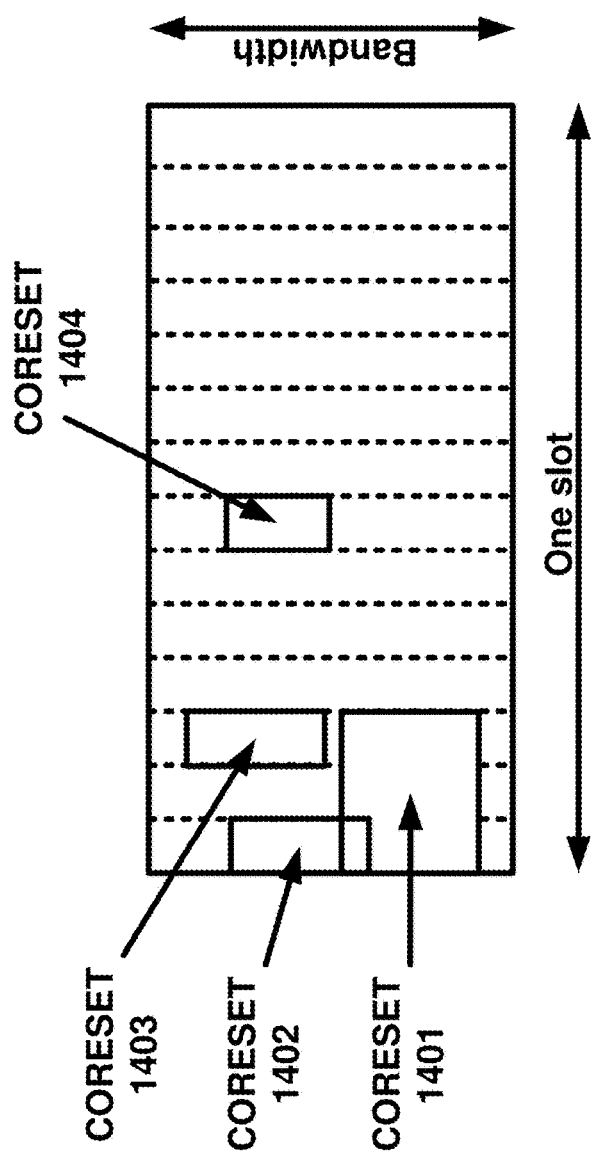
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
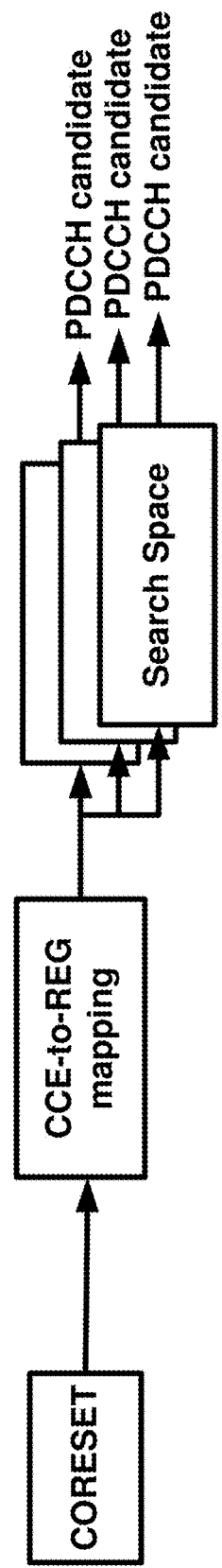
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
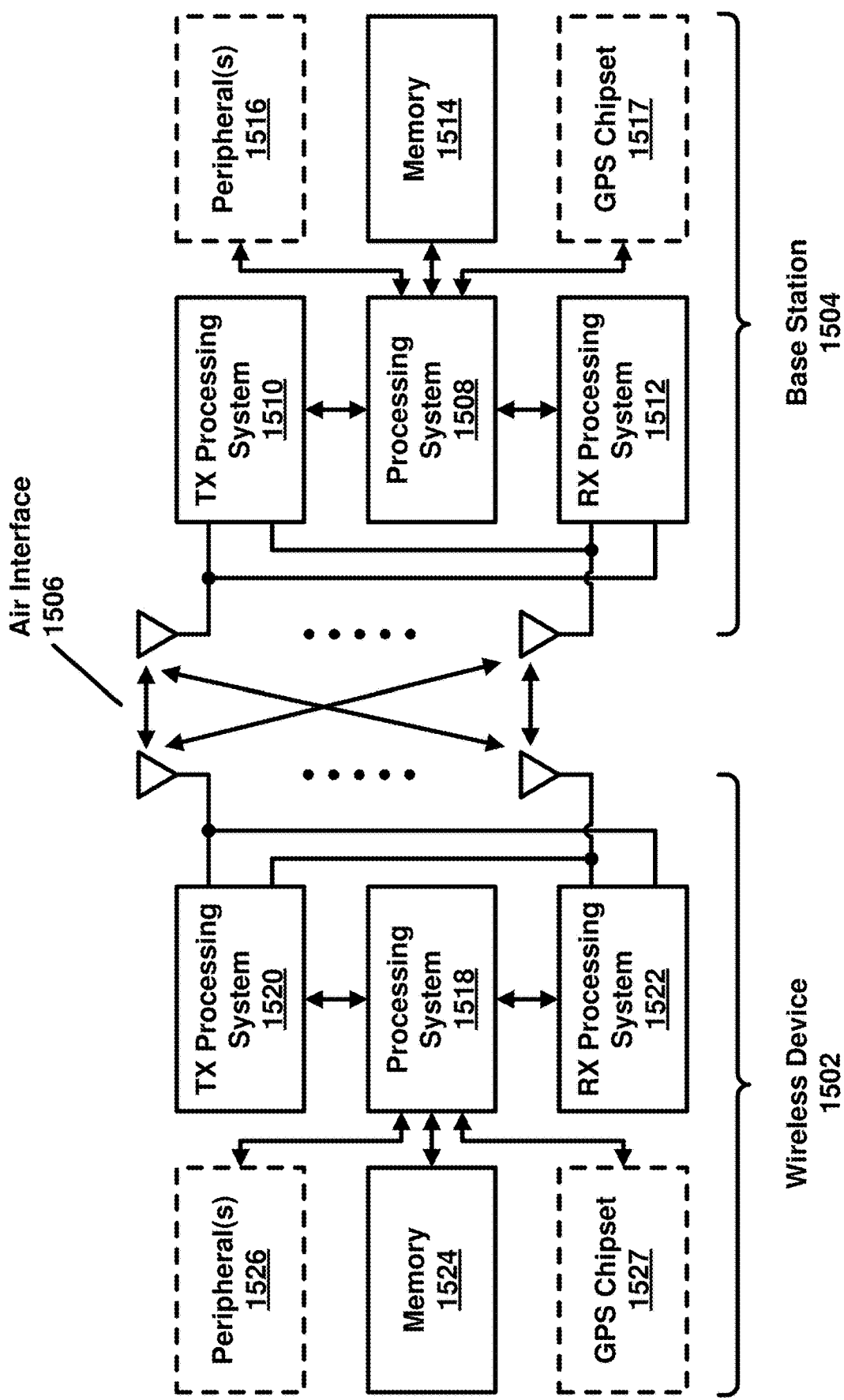
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

The usage scenarios that have been identified for 5G are enhanced mobile broadband (eMBB), massive machine-type communication (mMTC), and Ultra-Reliable and Low Latency communication (URLLC). Yet another identified area to locate the boundary between mMTC and URLLC would be time sensitive communication (TSC). In particular, mMTC, URLLC and TSC are associated with novel IoT use cases that are targeted in vertical industries. It is envisaged that eMBB, mMTC, URLLC and TSC use cases may all need to be supported in the same network.

One objective of 5G is to enable connected industries. 5G connectivity can serve as a catalyst for the next wave of industrial transformation and digitalization, which improve flexibility, enhance productivity and efficiency, reduce maintenance cost, and improve operational safety. Devices in such an environment include, e.g. pressure sensors, humidity sensors, thermometers, motion sensors, accelerometers, actuators, etc. It is desirable to connect these sensors and actuators to 5G radio access and core networks. The massive industrial wireless sensor network (IWSN) use cases and requirements described in 3GPP TR 22.804, TS 22.104, TR 22.832 and TS 22.261 include not only URLLC services with very high requirements, but also relatively low-end services with the requirement of small device form factors, and/or being completely wireless with a battery life of several years.

Similar to connected industries, 5G connectivity can serve as catalyst for the next wave of smart city innovations. As an example, 3GPP TS 22.804 describes smart city use cases and requirements for smart city use cases. The smart city vertical covers data collection and processing to more efficiently monitor and control city resources and to provide services to city residents. The deployment of surveillance cameras is an essential part of the smart city but also of factories and industries.

Finally, the wearables use case includes smart watches, rings, eHealth related devices, medical monitoring devices, etc. One characteristic for the wearables use case is that the device is small in size.

As a baseline, the requirements for these use cases, also known as NR-Light, are device complexity, device size, and deployment scenarios. For device complexity, the main motivation for the new device type is to lower the device cost and complexity as compared to high-end eMBB and URLLC devices of Rel-15/Rel-16. This is the case for industrial sensors. For device size, the requirement for most use cases is that the standard enables a device design with compact form factor. For deployment scenarios, the system should support all FR1/FR2 bands for FDD and TDD. Use case specific requirements may include industrial wireless sensors, for which communication service availability is 99.99% and end-to-end latency less than 100 ms; the reference bit rate is less than 2 Mbps (potentially asymmetric e.g. UL heavy traffic) for all use cases and the device is stationary; the battery should last at least few years; for safety related sensors, latency requirement is lower, 5-10 ms. Use case specific requirements may include video surveillance, for which reference economic video bitrate would be 2-4 Mbps, latency<500 ms, reliability 99%-99.9%. High-end video (e.g., for farming) would require 7.5-25 Mbps. It is noted that traffic pattern is dominated by UL transmissions. Use case specific requirements may include wearables. Reference bitrate for smart wearable application can be 10-50 Mbps in DL and minimum 5 Mbps in UL and peak bit rate of the device higher, 150 Mbps for downlink and 50 Mbps for uplink. Battery of the device should last multiple days (up to 1-2 weeks).

Recognizing UE features and parameters with lower end capabilities, relative to Release 16 eMBB and URLLC NR, may help to serve the use cases mentioned above. Potential UE complexity reduction features may include: reduced number of UE RX/TX antennas; reduced UE bandwidth (e.g. Rel-15 SSB bandwidth may be reused and L1 changes minimized); Half-Duplex-FDD; relaxed UE processing time; and relaxed UE processing capability.

UE power saving may be enabled and battery lifetime enhancements may be considered for reduced capability UEs (RedCap UEs) in applicable use cases (e.g., delay tolerant use case). For example, by enabling reduced PDCCH monitoring by smaller numbers of blind decodes and CCE limits; and/or by enabling extended DRX for RRC Inactive and/or Idle; and/or enabling RRM relaxation for stationary devices. Functionalities may be enabled that mitigate or limit the performance degradation of such features and complexity reductions, e.g., coverage recovery to compensate for potential coverage reduction due to the device complexity reduction. Standardization framework and principles may be studied for how to define and constrain such reduced capabilities, considering the definition of a limited set of one or more device types and considering how to ensure those device types are used for the intended use cases. Functionalities may be studied that will allow devices with reduced capabilities (RedCap UEs) to be explicitly identifiable to networks and network operators and allow operators to restrict their access if desired.

Reduction of UE bandwidth may be beneficial in terms of UE complexity reduction, e.g., in frequency range 1 and/or frequency range 2 (FR1 and/or FR2). For determining a RedCap UE bandwidth, the following may be considered: reusing legacy initial access scheme, SSB bandwidth, CORESET #0 configurations, initial BWP bandwidth, data rates needed for RedCap use cases, leverage of the LTE ecosystem (e.g., using the same bandwidth as LTE), UE cost saving consideration, UE power saving consideration, PDCCH performance (e.g., implication on the aggregation level), and scheduling flexibility.

For example, a UE bandwidth reduction to 20 MHz or lower (e.g., 5/10/15 MHz) in FR1 may be considered. The lowest bandwidth capability may not be less than LTE Category 1bis modem (20 MHz). For example, for low-end use cases, a 20 MHz UE bandwidth may be enough to achieve a data rate requirement. For example, for high-end use cases, such as small size wearables, 20 MHz may not be enough to achieve the 150 Mbps DL peak data rate for single antenna case. Considering that initial access should support different RedCap UEs, a 20 MHz bandwidth may be considered as the baseline for initial access in FR1. For example, 20 MHz may be useful for future RedCap unlicensed devices to support a Listen-Before-Talk (LBT) bandwidth of 20 MHz. For example, RedCap UEs may support at least a maximum of 20 MHz bandwidth in FR1. In FR1, the existing configuration options for SSB and CORESET #0 may be preserved, while reducing the specification impact when RedCap is introduced in Rel-17. The market acceptance of RedCap may be weakened if enabling RedCap support in the network comes at the cost of losing certain configuration options for SSB or CORESET #0. In FR1, CORESET #0 bandwidth can be up to 17.28 MHz. Therefore, a RedCap UE can be expected to support at least 20 MHz maximum channel bandwidth, at least during initial access. 20 MHz may also be considered as a sweet spot that balances device cost and required data rate for various services. Further reduction of maximum UE bandwidth may lead to diminishing gain in cost reduction and power saving, but significant loss in coverage, data rates, latency, scheduling flexibility, and coexistence with legacy NR UEs. For example, a 10 MHz bandwidth may be considered because it does not require specification change for initial access. For the low-to-mid end data rate services, no MIMO is needed if 20 MHz is assumed, which is beneficial for devices with small form factors. If a smaller bandwidth is used, e.g. 10 MHz, MIMO or CA might be needed for low-to-mid end data rate services, which can be challenging for certain devices. For example, 20 MHz channel bandwidth may be supported, and smaller bandwidth such as 10 MHz may also be considered at least for use cases not requiring high peak data rate such as low-end wearables.

In FR2, even more than in FR1, UE bandwidth reduction is a key feature to significantly reduce UE complexity and cost. For FR2, the RedCap UE may support 50 MHz and/or 100 MHz maximum UE bandwidth at least for initial access. A supported bandwidth of less than 80-100 MHz may have impacts due to PBCH and coreset selection. A supported bandwidth of 80 MHz may not provide significant UE cost savings and going below 80 MHz may have large specification impacts and legacy network impacts. 50 MHz and 100 MHz bandwidths are already specified for FR2, and may be preferred over the other proposals in order to minimize the impacts on specifications, implementations and deployments. In FR2, even though the maximum SSB bandwidth can be up to 57.6 MHz and CORESET #0 bandwidth can be up to 69.12 MHz, these SSB and CORESET #0 configuration options can still be used in cells supporting 50 MHz RedCap UEs. For example, a UE may need to skip certain SSB or PDCCH subcarriers outside of the UE receive bandwidth. This will result in some coverage loss that should be studied and that can be mitigated through suitable coverage recovery solution should SSB and PDCCH become the coverage limiting channels.

The legacy mobile broadband networks were designed to optimize performance mainly for human type of communications and thus, are not designed/optimized to meet the machine type communications (MTC) related requirements. The primary objective of MTC specific designs is to focus on the lower device cost, enhanced coverage, and reduced power consumption. To further reduce the cost and power consumption, it may be beneficial to further reduce the transmission/reception bandwidth of legacy systems (e.g., LTE or New Radio). The transmission/reception bandwidth for both control and data channels may be reduced (e.g., to 5 MHz or 10 MHz or 20 MHz or 50 MHz or 100 MHz). In general, it is envisioned that a large number of MTC/RedCap devices will be deployed for specific services within one cell in near future. When such a massive number of MTC/RedCap devices attempt to access and communicate with the network, multiple MTC regions/bandwidths (e.g., 20 MHz bandwidths) may be allocated by the base station.

Given that the considered bandwidths for RedCap UEs are quite small, these devices may benefit from frequency hopping. Frequency hopping may increase a channel gain and frequency diversity of the channel, which will be explained in what follows. Frequency hopping may be defined within a BWP for NR. One aspect to consider would be if frequency hopping should be enabled on a bandwidth larger than the RedCap bandwidth: for instance, a RedCap UE could monitor a 20 MHz bandwidth on a given slot, but could hop to another 20 MHz subband in another slot so that overall, 100 MHz would be covered.

Frequency hopping is supported in Rel-16 for the UL (e.g. PUSCH). Frequency hopping may also be applied in the DL, given that a candidate complexity reduction technique is to operate with a narrower bandwidth. The UE may hop between narrow bandwidth regions in order to get similar frequency diversity as a wideband operation. Enhancements to UL frequency hopping may also be considered, such as operation with more frequency hops in the frequency hopping pattern.

Frequency-hopped CORESET for Redcap UEs may be considered to increase frequency diversity.

In an example, an NR legacy UE with 100 MHz bandwidth capability may be scheduled dynamically within 100 MHz in a transmission occasion while a NR RedCap UE may only be scheduled dynamically within at most 20 MHz. A frequency hopping-like mechanism may be introduced for NR RedCap UEs to allow a 20 MHz-bandwidth UE to frequency hop within a 100 MHz network carrier bandwidth. In an example, the performance loss by a RedCap UE with a fixed 20 MHz bandwidth over a RedCap UE with a flexible 20 MHz bandwidth within 100 MHz may be evaluated. According to the evaluation results, it may be observed that the RedCap UE with the fixed 20 MHz bandwidth will suffer from a decrease in frequency selective gain. The performance loss by fixed scheduling over flexible scheduling within 100 MHz may be greater with a reduction in RX antennas common to many RedCap UEs since more TX/RX antennas can provide for larger TX/RX diversity and decrease the impact incurred by channel frequency selective fading. In addition, the gain under different SINR may be comparable for a given bandwidth and TX/RX antenna configuration. For example, the loss by a RedCap UE with a fixed 20 MHz bandwidth over a RedCap UE with a flexible 20 MHz bandwidth within 100 MHz may be 1.66/1.57/1.47 dB when SINR is −10/0/10 dB and RX antenna number is 2. This is because channel frequency selective fading is caused by multipath transmission and has nothing to do with the received SINR. According to the results, it can be observed that giving 4TX and 2RX antennas, there is about a 1.5 dB performance loss if UE bandwidth is reduced from 100 MHz to 20 MHz.

Repetition may be the baseline method for coverage recovery in RedCap devices. It may be considered to enable hopping between narrow bands which can be useful for load balancing. Returning from one narrow band to another may also be considered since it may be useful for load balancing and possibly frequency diversity. The impact of frequency retuning time should be considered for this approach.

Currently, frequency hopping is supported only in the uplink. This is because distributed VRB-to-PRB mapping can be configured in downlink for achieving frequency domain diversity gain. For a RedCap UE, the bandwidth of a BWP may be small due to UE bandwidth reduction, and the diversity gain from distributed PRB mapping may be quite limited. Frequency hopping across BWPs or a large bandwidth may be considered to achieve more diversity gain. In Rel-15, the BWP switching delay is large, e.g., requiring up to several slots depending on UE capability and subcarrier spacing. If the same delay value is reused for frequency hopping across BWPs, there is a significant reduction on data throughput and performance benefits. If the BWP switch does not require a change of the subcarrier switch, the required time can be reduced. In LTE-MTC, the RF retuning time for hopping across different narrowbands may be only 1 or 2 OFDM symbols. It can be studied whether the same RF retuning time can be reused for NR if frequency hopping across BWPs is considered for coverage recovery.

Frequency hopping is supported in NR Rel-16 for UL (e.g., PUSCH). Frequency hopping may also be applied in the DL, given that a candidate complexity reduction technique is to operate with a narrower bandwidth. For example, the UE may hop between narrow bandwidth regions to achieve similar frequency diversity as wideband operation.

In an example, frequency hopping may be applied to downlink, e.g. PDSCH and/or PDCCH (e.g. frequency-hopped CORESET), to increase frequency diversity for RedCap UEs.

Different radio resource management (RRM) techniques have been proposed in 3GPP LTE in order to improve uplink performance. Frequency hopping is one of the techniques that can be used to improve uplink performance by providing frequency diversity and interference averaging. Frequency hopping comprises of changing of frequency resource allocation from one time instant to another. The hopping can be between subframes (inter-subframe) or within a subframe (intra-subframe). 3GPP specifies two types of frequency hopping for the LTE uplink: hopping based on explicit hopping information in the scheduling grant, and sub-band based hopping according to cell-specific hopping and mirroring patterns. Frequency hopping is supported between subframes (inter-TTI frequency hopping) and within sub-frames (intra-TTI frequency hopping).

Frequency hopping may be performed on PUSCH (Physical Uplink Shared Channel)—the channel on which the user data is transmitted. 3GPP specifies two types of frequency hopping for the LTE uplink, Type 1 PUSCH Hopping and Type 2 PUSCH Hopping. DCI format 0 may be used to transport scheduling information for the uplink. DCI format 0 may have a 1 bit hopping flag to indicate whether PUSCH frequency hopping is enabled or not. A UE with a scheduling grant performs frequency hopping if this hopping flag is set to 1. Depending on the system bandwidth, 1 or 2 bits are excluded from the resource allocation field in DCI format 0 in case of hopping. The uplink system bandwidth (NB) may be expressed in terms of number of resource blocks (RBs). The number of hopping bits in the DCI may depend on the system bandwidth (e.g., 1 bit for 6-49 RBs, and 2 bits for 50-110 RBs). The bandwidth for user data transmission, the PUSCH bandwidth ($N_{RB}^{PUSCH}$), may be given as follows: $N_{RB}^{PUSCH}=N_{RB}^{UL}-N_{RB}^{PUCCH}$, where $N_{RB}^{PUCCH}$ is the number of resource blocks assigned for PUCCH (−1 for Type II PUSCH hopping and $N_{RB}^{PUCCH}$ an odd integer).

Depending on the information in the hopping bits of a DCI, a frequency hopping UE performs either Type 1 or Type 2 PUSCH hopping. In each type of PUSCH hopping, there is a possibility to hop in frequency between subframes (inter-subframe hopping) or within a subframe, (intra-subframe) depending on a single bit provided from higher layers.

In Type 1 PUSCH hopping, the hopping information may be provided in a scheduling grant. UEs may be allocated on contiguously allocated resource blocks, starting from a lowest index physical resource block (PRB) in each transmission slot. The wireless device may determine a first PRB (lowest index PRB) in a first slot of subframe based on a system bandwidth excluding the PRBs allocated to PUCCH. The wireless device may determine a first PRB (lowest index PRB) in a second slot of subframe (next hop) based on the first PRB (of the first slot/hop), and/or a hopping offset. The hopping offset may be equal to ½ or ¼ or −¼ of the hopping bandwidth (e.g. bandwidth allocated to PUSCH). The wireless device may use a modulo function to determine the starting PRB of a hop within the PRBs (bandwidth) allocated to the PUSCH. For example, the UE may apply the hopping offset based on a modulo function of the PUSCH bandwidth ($N_{RB}^{PUSCH}$).

In a second type of hopping (e.g. Type 2 PUSCH hopping), the hopping bandwidth may be virtually divided into sub-bands of equal width/size. Each sub-band may constitute a number of contiguous resource blocks. In addition to hopping, the UEs can also perform mirroring as a function of the slot number. While mirroring, the resource allocation starts from the right edge of the sub-band where a UE is allocated. The hopping and mirroring patterns may be cell-specific. Thus Type 2 PUSCH hopping may also be referred to as "sub-band based hopping according to cell-specific hopping/mirroring patterns". In this type of hopping, virtual resources (Virtual Resource Blocks—VRBs) are assigned in the scheduling grant. A UE receiving a number of VRBs, performs frequency hopping according to a predefined hopping/mirroring pattern. User data is transmitted in each slot on the corresponding physical resource blocks (PRBs). The UE may determine the corresponding PRBs within the allocated bandwidth based on the allocated VRBs and/or the hopping offset.

A number of sub-bands may be configured by the higher layers (e.g. $N_{sb}$). The UE may determine a size/width of a sub-band in term of a number of RBs ($N_{RB}^{sb}$) based on the system UL bandwidth (NR) excluding the RBs allocated to control transmissions ($N_{RB}^{PUCCH}$), and the number of sub-bands ($N_{sb}$). The sub-bands may have equal size. The allocated bandwidth may comprise equal-sized ($N_{RB}^{sb}$) number of sub-bands ($N_{sb}$). The UE may determine the hopping offset based on a hopping pattern and/or mirroring pattern. The UE may determine the hopping offset in terms of a number of sub-bands. For example, the corresponding PRBs of a second hop in a second sub-band, may be apart from the corresponding PRBs of a first hop in a first sub-band, by the number of RBs of a sub-band size. The UE may determine the hopping pattern and/or the mirroring pattern based on a scrambling sequence generated according to a pseudo-random sequence. The pseudo-random sequence may be initialized by the physical layer cell identity, e.g. at the start of each frame. Thus, the hopping pattern and/or the mirroring pattern may be cell-specific. This may give a possibility to mitigate the effects of inter-cell interference by averaging the interference over a number of users. Type 2 PUSCH hopping may give more flexibility, frequency diversity and inter-cell interference averaging compared to Type 1 PUSCH hopping. Type 2 PUSCH hopping may put more limitation on the scheduler. For example, the UE may not be allocated on RBs that are in different subbands. In an example, the number of subbands may be from 1 to 4. For example, as the number of sub-bands increases, the length of contiguous RBs that can be allocated for a single user may become shorter.

Frequency hopping may comprise sending data with changing carrier frequency in a certain pattern (e.g. hopping pattern). For example, a resource may be allocated for transmission of an uplink frame at a portion of the operation band. For example, the location of the frequency region may not change throughout the frame. In an example, some impairment may happen at the allocated frequency region where the data is carried. This may result in severe corruption of the data. To avoid the impairment, frequency hopping may be used. For example, if the frequency (e.g. the starting RB of the data) changes, at least a portion of the data may be able to avoid the impairment/noise.

Frequency hopping may happen between two subframes (e.g. consecutive subframes), which is referred to as inter-subframe frequency hopping. Frequency hopping may happen within a subframe, which is referred to as intra-subframe frequency hopping. Frequency hopping may happen between two slots (e.g. consecutive slots), which is referred to as inter-slot frequency hopping. Frequency hopping may happen within a slot, which is referred to as intra-slot frequency hopping. The hopping distance (frequency offset) between two consecutive hops (e.g. a first slotlsubframe and a second slotlsubframe) may be constant. The hopping distance (frequency offset) between two consecutive hops (e.g. a first slotlsubframe and a second slotlsubframe) may be variable.

The network (e.g. LTE network) may determine/configure one or more hopping patterns and may indicate to the UE to hop based on a first hopping pattern from the one or more hopping patterns. For example, the network may inform the UE of the details of the hopping pattern via a system information block (e.g. SIB 2) and/or a DCI. The details of the hopping pattern may comprise indication of whether the hopping mode is inter-subframe/inter-slot and/or intra-subframe/intra-slot; and/or a hopping offset (e.g. a number of RBs). For example, a field in the DCI (e.g. hopping bit field) may indicate which hopping type/pattern should be used. For example, a mapping may be defined between values of the field in the DCI and the hopping types/patterns. In an example, the mapping may depend on the system bandwidth. In an example, for a first hopping type, the frequency offset between a first slotlsubframe and a second slotlsubframe may be explicitly determined based on the DCI. In an example, for a second hopping type, the frequency offset between a first slotlsubframe and a second slotlsubframe may be configured by a pre-defined pattern. For example, when there is multiple subbands, hopping may be done from one subband to another subband. For example, the wireless device may determine the start RB of a PUSCH at a subframe/slot at least based on: system bandwidth; a start RB of the system bandwidth; the RB size of the PUSCH; the PUSCH hopping offset; and/or whether inter-slotlsubframe or intra-slotlsubframe hopping.

In NR, frequency hopping may be applied to a bandwidth part. The BWP concept in NR may allow the dynamic configuration of a relatively small active bandwidth for smaller data packets, which allows power saving for the UE because for a small active BWP the UE needs to monitor less frequencies or use less frequencies for transmission.

A bandwidth part (BWP; or a carrier BWP) may be a subset of contiguous common resource blocks for a given numerology in the bandwidth part on a given carrier. The network may indicate a BWP by a starting position in frequency domain (resource block) and/or a number of resource blocks in the BWP (e.g. location and bandwidth). For example, the UE determines the resource blocks based on the given numerology of the BWP. A numerology is defined by subcarrier spacing and cyclic prefix (CP). A resource block is generally defined as 12 consecutive sub-carriers in the frequency domain. Physical resource blocks (PRB) are numbered within a BWP, the PRB numbering of the BWP starts from 0. The size of a BWP can vary from a minimum of 1 PRB to the maximum size of system bandwidth. In an example, up to four BWPs may be configured by higher layer parameters for each DL (downlink) and UL (uplink), with a single active downlink and uplink BWP in a given TTI (transmission time interval). However, the disclosure is not limited to the case of a UE being configured with up to four bandwidth part. The number of bandwidth parts may be greater than 4 in the uplink and/or downlink. For example, a UE may be configured with 8 BWPs.

TTI (Transmission Time Interval) determines the timing granularity for scheduling assignment. One TTI is the time interval in which given signals is mapped to the physical layer. The TTI length can vary from 14-symbols (slot-based scheduling) to up to 2-symbols (non-slot based scheduling).

Downlink and uplink transmissions are specified to be organized into frames (10 ms duration) consisting of 10 subframes (1 ms duration). In slot-based transmission, a subframe, in return, is divided into slots, the number of slots being defined by the numerology/subcarrier spacing and the specified values range between 10 slots for a subcarrier spacing of 15 kHz to 320 slots for a subcarrier spacing of 240 kHz. In non-slot-based communication, the minimum length of a TTI may be 2 OFDM symbols.

In an example, a UE may be configured with frequency hopping for transmission/reception via a channel in a BWP. For example, PUSCH and/or PUCCH transmission corresponding to an UL BWP of the UE may be configured with frequency hopping. The base station may indicate, e.g. via higher layers (RRC) signaling, whether the frequency hopping is intra-slot or inter-slot. The base station may indicate, e.g. via higher layers (RRC) signaling, a set of frequency hopping offsets e.g. for the PUSCH/PUCCH transmission. The frequency hopping offsets may be in terms of a number of RBs. For example, the UE may determine the frequency resource at a time instance/slot/TTI/subframe according to two or more hops. A hop may comprise a location (e.g. starting PRB) and/or a bandwidth (e.g. a number of PRBs).

For a first type of PUSCH repetition (e.g. Type A), a UE may be configured for frequency hopping by higher layer signaling. One of two frequency hopping modes may be configured: Intra-slot frequency hopping, applicable to single slot and multi-slot PUSCH transmission; or Inter-slot frequency hopping, applicable to multi-slot PUSCH transmission.

In case of interlaced resource allocation (e.g. type 2), the UE may transmit PUSCH without frequency hopping. In case of resource allocation type 1, whether or not transform precoding is enabled for PUSCH transmission, the UE may perform PUSCH frequency hopping, for example, if the frequency hopping field in a corresponding detected DCI format or in a random access response UL grant is set to 1, or for example, if for a Type 1 PUSCH transmission with a configured grant a higher layer parameter (e.g. frequencyHoppingOffset) is provided, otherwise no PUSCH frequency hopping may be performed. For a PUSCH scheduled by RAR UL grant, fallbackRAR UL grant, or by DCI format 0_0 with CRC scrambled by TC-RNTI, frequency offsets are obtained as described in clause 8.3 of [6, TS 38.213]. For a PUSCH scheduled by a DCI format 0_0/0_1 or a PUSCH based on a Type2 configured UL grant activated by DCI format 0_0/0_1 and for resource allocation type 1, frequency offsets may be configured by a higher layer parameter (e.g. frequencyHoppingOffsetLists in pusch-Config). For a PUSCH scheduled by a DCI format 0_2 or a PUSCH based on a Type2 configured UL grant activated by DCI format 0_2 and for resource allocation type 1, frequency offsets may be configured by a higher layer parameter (e.g. frequencyHoppingOffsetLists-ForDCIFormat0_2 in pusch-Config). One of two higher layer configured offsets may be indicated in the UL grant, for example, when the size of the active BWP is less than 50 PRBs. One of four higher layer configured offsets may be indicated in the UL grant, for example, when the size of the active BWP is equal to or greater than 50 PRBs. For PUSCH based on a Type1 configured UL grant, the frequency offset may be provided by a higher layer parameter (e.g. frequencyHoppingOffset in rrc-ConfiguredUplinkGrant). For a MsgA PUSCH the frequency offset may be provided by the higher layer parameter.

In case of intra-slot frequency hopping, the starting RB in each hop may be given by:

$$RB_{start} = \begin{cases} RB_{start} & i = 0 \\ (RB_{start} + RB_{offset}) \bmod N_{BWP}^{size} & i = 1 \end{cases},$$

where i=0 and i=1 may be the first hop and the second hop respectively, and $RB_{start}$ is the starting RB within the UL BWP, as calculated from the resource block assignment information of resource allocation type 1, and $RB_{offset}$ is the frequency offset in RBs between the two frequency hops. The number of symbols in the first hop may be given by $\lfloor N_{symb}^{PUSCH,s}/2 \rfloor$, the number of symbols in the second hop may be given by $N_{symb}^{PUSCH,s} - \lfloor N_{symb}^{PUSCH,s}/2 \rfloor$, where $N_{symb}^{PUSCH,s}$ is the length of the PUSCH transmission in OFDM symbols in one slot.

In case of inter-slot frequency hopping, the starting RB during slot $n_s^\mu$ may be given by:

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases},$$

where $n_s^\mu$ is the current slot number within a radio frame, where a multi-slot PUSCH transmission can take place, $RB_{start}$ is the starting RB within the UL BWP, as calculated from the resource block assignment information of resource allocation type 1, and $RB_{offset}$ is the frequency offset in RBs between the two frequency hops.

The UE may transmit a PUCCH using frequency hopping, for example, if not provided useInterfacePUCCH-Common-r16. The UE may transmit a PUCCH without frequency hopping for example, if provided useInterfacePUCCH-Common-r16. The UE may perform frequency hopping for PUCCH per slot, for example, if the UE is configured to perform frequency hopping for PUCCH transmissions across different slots. The UE may transmit the PUCCH starting from a first PRB (e.g. provided by startingPRB) in slots with even number and starting from a second PRB (e.g. provided by secondHopPRB) in slots with odd number. The slot indicated to the UE for the first PUCCH transmission may have number 0 and each subsequent slot until the UE transmits the PUCCH in $N_{PUCCH}^{repeat}$ slots may be counted regardless of whether or not the UE transmits the PUCCH in the slot. The UE may not expect to be configured to perform frequency hopping for a PUCCH transmission within a slot. The frequency hopping pattern between the first PRB and the second PRB may be the same within each slot, for example, if the UE is not configured to perform frequency hopping for PUCCH transmissions across different slots and/or if the UE is configured to perform frequency hopping for PUCCH transmissions within a slot.

A UE may be configured by a higher layer parameter (e.g. resourceMapping in SRS-Resource) with an SRS resource occupying one or more (e.g. 1 or 2 or 4) adjacent symbols within the last 6 symbols of the slot. All antenna ports of the SRS resources may be mapped to each symbol of the resource. A UE may be configured with multiple (e.g. 2 or 4) adjacent symbols aperiodic SRS resource with intra-slot frequency hopping within a bandwidth part. The full hopping bandwidth may be sounded with an equal-sized subband across the multiple symbols when frequency hopping is configured with no repetition, e.g. repetition factor R=1. A UE may be configured with multiple (e.g. 4) adjacent symbols aperiodic SRS resource with intra-slot frequency hopping within a bandwidth part. The full hopping bandwidth may be sounded with an equal-sized subband across two pairs of R adjacent OFDM symbols, for example, when frequency hopping is configured with repetition factor R=2. Each of the antenna ports of the SRS resource may be mapped to the same set of subcarriers within each pair of R adjacent OFDM symbols of the resource. A UE may be configured with a symbol for periodic or semi-persistent SRS resource with inter-slot hopping within a bandwidth part. The SRS resource may occupy the same symbol location in each slot. A UE may be configured with multiple (e.g. 2 or 4) symbols for periodic or semi-persistent SRS resource with intra-slot and/or inter-slot hopping within a bandwidth part. The N-symbol SRS resource may occupy the same symbol location(s) in each slot. For 4 symbols, when frequency hopping is configured with R=2, intra-slot and inter-slot hopping may be supported with each of the antenna ports of the SRS resource mapped to different sets of subcarriers across two pairs of R adjacent OFDM symbol (s) of the resource in each slot. Each of the antenna ports of the SRS resource may be mapped to the same set of subcarriers within each pair of R adjacent OFDM symbols of the resource in each slot. When number of symbols is equal to the repetition factor, and/or frequency hopping is configured, inter-slot frequency hopping may be supported with each of the antenna ports of the SRS resource mapped to the same set of subcarriers in R adjacent OFDM symbol (s) of the resource in each slot.

For CSI reporting, a UE may be configured via higher layer signaling with one out of two possible subband sizes, where a subband may be defined as $N_{PRB}^{SB}$ contiguous PRBs and/or may depend on the total number of PRBs in the bandwidth part. A CSI Reporting Setting configuration may define a CSI reporting band as a subset of subbands of the bandwidth part. For example, the CSI Reporting Setting configuration may indicate a contiguous or non-contiguous subset of subbands in the bandwidth part for which CSI shall be reported (e.g. csi-ReportingBand). A UE may not expect to be configured with csi-ReportingBand which contains a subband where a CSI-RS resource linked to the CSI Report setting has the frequency density of each CSI-RS port per PRB in the subband less than the configured density of the CSI-RS resource. A first subband size may be given by $N_{PRB}^{SB} - (N_{BWP,i}^{start} \bmod N_{PRB}^{SB})$ and a last subband size may be given by $(N_{BWP,i}^{start} + N_{BWP,i}^{size}) \bmod N_{PRB}^{SB}$ if $(N_{BWP,i}^{start} + N_{BWP,i}^{size}) \bmod N_{PRB}^{SB} \neq 0$ and $N_{PRB}^{SB}$ if $(N_{BWP,i}^{start} + N_{BWP,i}^{size}) \bmod N_{PRB}^{SB} = 0$. The subbands for a given CSI report indicated by the higher layer parameter csi-ReportingBand may be numbered continuously in increasing order with the lowest subband of csi-ReoprdingBand as subband 0. When omitting Part 2 CSI information for a particular priority level, the UE may omit all of the information at that priority level.

In unlicensed operation, a carrier/BWP, may comprise one or more listen-before-talk (LBT) subbands. In unlicensed operation, a wideband carrier/BWP, may comprise two or more LBT subbands. An LBT subband may be 20 MHz. A base station and/or UEs may perform transmission/reception on a subband basis, due to unlicensed spectrum regulations that enforce fairness for coexistence of different operators and nodes. The base stations and/or UEs may perform one or more LBT procedure on one or more subbands prior to a transmission. The base stations and/or UEs may transmit on the one or subbands if at least one LBT procedure is successful (e.g. indicates an idle channel).

The base station may configure one or more subbands/LBT bandwidths for a carrier/cell (UL or DL) via higher layer signaling. Each subband/LBT bandwidth may comprise one or more resource blocks (e.g. RB set). The UE may determine a number of RB sets (corresponding to LBT bandwidths/subbands) and the available PRBs in each RB set, both for DL and UL. The base station may not configure a guard-band between two consecutive subbands of a carrier. The base station may configure a guard-band between two consecutive subbands of a carrier (e.g. intra-carrier guard-band per cell). A guard-band may comprise one or more common resource blocks (CRBs) of a carrier. For example, the base station may configure/indicate a list of intra-carrier guard-bands for a cell, using one or more higher layer parameters (e.g. intraCellGuardBandDL-r16 and/or intraCellGuardBandUL-r16). The UE may determine a guard-band based on the CRB index of a lower CRB (e.g. start CRB) and/or a size/number of CRBs for the intra-cell guard-band. In an example, the UE may determine the RB sets (subbands) within a carrier based on the intra-cell guard-bands of the carrier/cell.

In an example, the UE may determine a number of subbands within a cell based on the configured guard-bands. For example, a first subband may comprise one or more contiguous CRBs from the start CRB of the cell up to a first CRB of a first intra-cell guard-band of the cell. For example, a second subband may comprise one or more contiguous CRBs from a last CRB of the first intra-cell guard-band of the cell up to a first CRB of a second intra-cell guard-band of the cell. For example, a last subband may comprise one or more contiguous CRBs from the start CRB of a third intra-cell guard-band of the cell up to a last CRB of the cell. For example, the number of subbands/RB sets of the cell may be equal to the number of intra-cell guard-bands of the cell plus one. The UE may determine one or more available RBs associated with an RB set/LBT subband between two intra-cell guard-bands based on the starting and/or ending RB index of the guard-bands. The UE may determine one or more available RBs associated with an RB set/LBT subband based on the starting and/or ending RB index of the cell.

The intra-cell guard-bands may be pre-defined. The base station may indicate/configure the intra-cell guard-bands using RRC signaling. The base station may indicate using RRC signaling that no intra-cell guard-bands are configured for a cell/carrier. For example, the base station may use this configuration for the case where transmission only occurs in a BWP if LBT is successful in all RB sets within the BWP. For a carrier with intra-carrier guard bands, the UE may not expect a dedicated BWP to include parts of a RB set (e.g. partial overlap).

For unlicensed wideband operation (e.g. bandwidth larger than 20 MHz) in DL with a single serving cell operation within a carrier, multiple BWPs may be configured, single or multiple BWP may be activated. The base station may transmit PDSCH on parts or whole of single active BWP where Clear Channel Assessment (CCA)/Listen-before-talk (LBT) is successful at the base station. In an example, gaps and combinations of gaps between noncontiguous blocks may be supported. In an example, gaps and combinations of gaps between noncontiguous blocks may not be supported. For example, a block may span over one or multiple contiguous successful LBT sub-bands. For example, a gap may span over one or multiple contiguous unsuccessful LBT sub-bands. In an example, transmission bandwidth adaptation delay may depend on a number of supported gaps and/or transmission bandwidths and/or positions of the LBT sub-bands where transmissions occur.

After initial cell search, to reduce the UE's bandwidth and thus save power, the UE may switch into a narrow bandwidth active BWP (e.g. NBWP). For a narrowband UE (e.g., a UE with reduced bandwidth capability), to achieve frequency diversity gains, frequency domain hopping may be one of the methods that can be used. In some high frequency regions (e.g., FR2), due to beamforming at both base station and UE in addition to smaller cells, the delay spread may be smaller compared to low frequency regions (e.g. FR1). This may lead to larger coherence bandwidth and less gain using frequency hopping (e.g., if the hopping is within a limited frequency range). In such cases, to achieve the frequency diversity gain, the UE may need to hop across a larger system frequency range (e.g., across larger system bandwidth). For example, in case the network supports carrier aggregation, the UE may hop in frequency domain over/across multiple carrier components (e.g., using one carrier component at a time).

Hopping within a limited system bandwidth may be beneficial to mitigate persistent interference, because narrow bandwidth operation may be more prone to such interference, which may affect a large portion of the active BWP. This may be more exemplified for stationary devices where the interference is not randomized by the UE movements and may be persistent. It may be beneficial to have some sort of NBWP hopping mechanism. For example, we may consider a virtual NBWP that is hopping in the frequency domain where the procedures (e.g., HARQ, timers, grants, etc.) are transparent to frequency hopping. The narrow bandwidth interference may be different across different subbands. Thus, beam management L1 reports may be different if measured across these different subbands. Optimizations for the L1 measurement reports may be considered to have some granularity in the frequency domain. UE hopping across frequency (e.g., using NBWP hopping) may lead to utilization issues in time due to the switching gaps (based on UE capability). In case of narrow active BWP operation, the SSB may not be fully included in the active BWP. The network may configure additional off-raster SSB in these active BWPs (e.g., if CSI-RS is not configured), and/or the UE may periodically switch the BWP containing SSB to do the measurements. A narrow active BWP may not enclose a single paging search space. In an example, the network may configure paging search space for each BWP hop. In an example, the UE may hop into BWP containing paging search space every cycle.

A cell bandwidth may be partitioned (e.g. statically) into a number of narrow bands (e.g. as in LTE eMTC). The scheduler may assign a narrow band (NB) (or a starting NB within a set of NBs for frequency hopping), e.g., for a PDSCH or a PUSCH transmission. The network may signal frequency domain resource allocation in terms of PRB pairs in a DCI within an operating NB. This type of narrow-band based frequency domain resource allocation may be simple and flexible for very narrow bandwidths (e.g. 6 PRBs with 15 kHz SCS of eMTC UEs). However, it may be inefficient/not proper to hard partition a BWP into several RedCap narrow bands. For example, the PRBs contained by a BWP may not fit into a number of RedCap narrow bands (e.g., if a BWP is flexibly configured with any bandwidth larger than the UE bandwidth). For example, prominent resource fragments may be incurred due to much larger UE bandwidth for RedCap than eMTC, which may undermine the resource utilization. Thus, more flexible and efficient resource allocation scheme may be needed for RedCap UEs.

BWP switching in a larger bandwidth than the UE reduced bandwidth may be used to achieve frequency scheduling gain. BWP switching may achieve fast load balancing between narrow bands in a cell.

A number of purposes may be served by employing BWP setting, for example, coexistence of UEs with different bandwidths, UE battery saving, support of different numerologies, etc. In terms of these purposes, employing BWP may be useful for RedCap UEs. BWP may provide a possibility to achieve more frequency diversity by supporting frequency hopping for RedCap UEs. NR may support flexible BWP bandwidth configuration (e.g. 1-275 PRBs). For RedCap UEs, fixed set of UE bandwidths may be defined (e.g., one or two channel bandwidths in a given frequency range). For a shared spectrum channel access (NR-U), a BWP may be configured as an integer number of RB sets (corresponding to LBT bandwidth). The network may consider the LBT regulations and the unlicensed spectrum usage for coexistence when scheduling the BWP configuration of the RedCap UEs.

A wireless device may have one or more reduced capabilities/complexities (e.g. a machine type UE, IoT UE, sensors, light/small/wearable devices) that require relaxed/enhanced configurations/procedures/parameters for communication with a base station. As mentioned above, these wireless device may be referred to as reduced capability (RedCap) wireless devices. For example, a wireless device may be a narrowband UE with reduced bandwidth. The base station may configure/tailor radio resources and/or parameters for a given category of reduced capability wireless device that may compensate for the performance degradation and enable/enhance successful/efficient/reliable/low latency communication based on the category requirements. For example, the base station may employ resource allocation based on frequency hopping techniques to compensate for the loss of frequency diversity caused by the reduced bandwidth of a narrowband UE. For example, at a first time slot/TTI, the narrowband UE may transmit/receive/communicate using a first frequency region/band/block (e.g., subband), and at a second time slot/TTI, the narrowband UE may transmit/receive/communicate using a second frequency region/band/block (e.g., subband). In an example, the subband may be a BWP. For example, the UE may hop from the first frequency region to the second frequency region. For example, the first frequency region and the second frequency region may have bandwidths equal to or less than the maximum given bandwidth that the UE supports. In an example, the UE may determine resource blocks (RBs/PRBs) of a BWP based on a frequency hopping pattern (e.g., hopped BWP or BWP retuning). For example, the UE may determine a starting RB of a BWP based on the hopping pattern. For example, the UE may determine a starting PRB of the BWP (e.g., active UL/DL BWP) based on the hopping pattern. In an example, the UE may use different BWPs, among a set/group of BWPs, based on a hopping pattern (e.g., BWP hopping and/or fast BWP switching). Throughout this disclosure, this technique may be referred to as "hopped BWP" and/or "subband hopping" and/or "BWP hopping" and/or "BWP retuning" and/or "(fast) BWP switching" and/or "virtual BWP switching" and/or "intra-BWP hopping" and/or "inter-BWP hopping", which may comprise hopping across subbands within a BWP and/or hopping across frequency regions/blocks of the cell for a BWP and/or hopping across narrowband BWPs. The UE may determine available/effective/valid/active PRBs of a BWP at each time slot/instance/TTI, based on a subband/BWP hopping pattern. The UE's communications comprising transmission and/or receptions and/or monitoring at/during each time slot/instance/TTI may be confined to the respective available/effective/valid/active PRBs of the BWP at that time slot/instance/TTI.

In existing technologies, a wireless device may be semi-statically and/or statically configured with subband/BWP hopping (e.g. BWP hopping and/or hopped BWP and/or BWP retuning and/or (fast/virtual) BWP switching). For a successful communication, it is important for the wireless device and the network to have a mutual understanding of when the subband/BWP hopping is used/applied and when it is stopped. In addition, there is a need to define the UE behavior when subband/BWP hopping is paused/stopped/deactivated. For example, which resource blocks the BWP comprise when subband/BWP hopping is configured but not activated yet and/or deactivated and/or suspended/paused? Also, some flexibility may be needed for the network to control frequency hopping of multiple UEs in a cell such that inter-UE collision/interference is reduced. Based on some embodiments, the base station may use or configure an activation/deactivation and/or switching mechanism for subband/BWP hopping. For example, a UE may receive an indication of activation and/or deactivation and/or changing/switching of a subband/BWP hopping pattern, based on which the UE may determine resource blocks of a BWP to use at a given time.

In an example, the wireless device may receive configuration parameters and/or activation command of subband/BWP hopping and may continue hopping (e.g., changing the baseband and/or RF hardware and filters to adapt to the frequency band corresponding to each hop) based on a subband/BWP hopping pattern. For example, the wireless device may keep on hopping for an extended duration, e.g., until a respective cell is deactivated, and/or an active BWP is deactivated, and/or as long as the wireless device is not IDLE/INACTIVE/dormant. This may be inefficient and may result in an unnecessarily increased power consumption. For example, the wireless device may not have enough/effective activities (e.g. transmissions and/or receptions) in a cell and/or BWP and/or effective BWP to need frequency hopping. Effective BWP may refer to discontinuous portions (PRBs) of the BWP in frequency domain corresponding to each hop (e.g., hopping interval). For example, the wireless device may be moving, and due to the mobility, may experience a small channel coherence bandwidth and a frequency diversity gain which may rule out the need for subband hopping. For example, the system bandwidth may be small and subband hopping may not always be beneficial. For example, in a high mobility and/or dormant and/or inactive state, the wireless device may not need to waste the battery for subband hopping.

There may be a need to control the subband/BWP hopping for an efficient frequency gain and a controlled power consumption at the same time. For example, the wireless device may apply subband/BWP hopping under one or more conditions (e.g., triggering events). For example, the wireless device may benefit from applying subband/BWP hopping for a percentage of time. For example, the network may need to control subband/BWP hopping of different UEs in the same cell/frequency region for load balancing and/or scheduling flexibility purposes.

In an example, the network may use some signaling mechanism to indicate to the wireless device whether and/or how (e.g., based on what hopping pattern) and/or when to perform subband/BWP hopping. For example, the network may activate/enable and/or deactivate/disable subband/BWP hopping via signaling (e.g. DCI and/or MAC-CE and/or RRC signaling). For example, the network may switch/change a subband/BWP hopping pattern via signaling (e.g. DCI and/or MAC-CE and/or RRC signaling). The signaling may be group specific (e.g., group common DCI). In an example, considering that frequency hopping may be needed by default for enhanced performance of the RedCap UE, a signaling-based activation/deactivation/switching mechanism may result in an increased overhead (from a UE and/or network perspective). It may be desired in a deployment scenario to control subband/BWP hopping while avoiding signaling overhead.

To address the above issues, an automated mechanism may be desired to control the subband/BWP hopping for a wireless device (e.g., a RedCap UE). Based on one or more embodiments of the present disclosure, a timer may be configured and/or employed by the wireless device and/or the base station to activate/enable/start the subband/BWP hopping. The timer may be used to deactivate/disable/suspend/stop subband/BWP hopping. The timer may be used to switch/change a subband/BWP hopping pattern. For example, the wireless device may internally use a timer to determine whether/when/how to apply subband/BWP hopping. For example, the base station may use a synchronized timer to be aligned with the wireless device activities. Based on one or more embodiments of the present disclosure, at least one time interval/duration may be defined and/or configured for the wireless device subband/BWP hopping. For example, a periodic subband/BWP hopping may be configured, wherein during a first time interval of each period, the wireless device may apply subband/BWP hopping, and during a second time interval of each period, the wireless device may not apply subband/BWP hopping, or may apply a second subband/BWP hopping pattern.

Based on one or more embodiments of the present disclosure, the wireless device may determine a subband/BWP hopping pattern and/or whether/when to apply the subband/BWP hopping based on one or more conditions. In an example, the wireless device may start/restart and/or stop/suspend and/or switch/change subband/BWP hopping in response to receiving an indication (e.g., a signal comprising an indication, the signal may be a DCI and/or MAC-CE and/or RRC). In an example, the wireless device may start/restart and/or stop/suspend and/or switch/change subband/BWP hopping in response to expiration of a timer/counter/duration. In an example, the wireless device may start/restart and/or stop/suspend and/or switch/change subband/BWP hopping periodically, e.g., based on one or more pre-defined and/or pre-configured periodicities. In an example, the wireless device may start/restart and/or stop/suspend and/or switch/change subband/BWP hopping in response to determining one or more parameters (e.g., a collision parameter, and/or a speed parameter, and/or an activity ratio parameter, and/or a power parameter) are below/above one or more thresholds. The one or more embodiments may define at least two modes of hopping, based on at least two hopping patterns and/or hopping ON and/or hopping OFF modes, to enable efficient subband/BWP hopping and controlled power consumption. Embodiments may enhance a scheduling flexibility for the network while reducing a collision probability across the subbands/BWP/frequency regions of the cell.

There is a need to re-define the legacy BWP switching behavior with respect to BWP hopping/fast BWP switching. In an example, a wireless device may receive configuration parameters of a cell comprising a plurality of BWPs. The configuration parameters may indicate a value for a BWP inactivity timer of the cell. The BWP inactivity timer may control BWP switching in the cell for a more power efficient and flexible communication. When BWP hopping is configured, the legacy behavior of the BWP inactivity timer may not be efficient anymore. For example, due to frequent BWP switching/hopping, the legacy BWP inactivity timer may not capture the dynamics of the activities within a BWP. It is important to re-visit and re-define the behavior of the BWP inactivity timer with respect to BWP hopping. Based on some of the embodiments, the UE may stop/disable the BWP inactivity timer if BWP hopping is configured and/or activated/enabled.

A wireless device may receive one or more RRC messages. The one or more RRC messages may comprise configuration parameters indicating a cell/carrier. The cell/carrier may be a downlink cell/carrier. The cell/carrier may be an uplink/SUL cell/carrier. The cell/carrier may comprise a plurality of subbands. The configuration parameters may indicate the plurality of subbands of the cell/carrier. For example, the configuration parameters may indicate a plurality of cell-specific subbands/narrowbands/RB sets/blocks within the bandwidth of the carrier (e.g. system bandwidth). The configuration parameters may indicate a starting RB of the carrier/cell (e.g., index of a starting common resource block (CRB)) for at least a first subband of the plurality of subbands. The starting RB for at least the first subband of the plurality of subbands may be pre-defined (e.g., with a pre-defined offset with respect to Point A of the carrier). The configuration parameters may indicate a size/width (e.g., a number of CRBs) for at least a first subband of the plurality of subbands. The size/width of at least the first subband of the plurality of subbands may be pre-defined. The plurality of subbands may or may not have the same size/width. The configuration parameters may indicate a number of subbands for the plurality of subbands. The number of subbands of the plurality of subbands may be pre-defined. The one or more RRC messages may be broadcast or multicast messages sent to all or multiple UEs of the cell. For example, the base station may send the one or more RRC messages to the reduced-bandwidth (RedCap) UEs of the cell. For example, the base station may send the configuration parameters indicating the plurality of subbands to the reduced-bandwidth (RedCap) UEs of the cell.

The base station may configure/define/indicate the subbands based on a first numerology/SCS. For example, the configuration parameters may indicate the plurality of subbands within the cell/carrier. For example, the configuration parameters may indicate resource blocks (e.g., start RB and size) of the multiple subbands within the carrier bandwidth. For example, the wireless device may determine the plurality of subbands of the carrier based on a pre-defined rule, e.g., by dividing the carrier bandwidth into a predefined or preconfigured number of subbands. The base station may configure intra-cell guard-bands in between the subbands of the carrier/cell. For example, a guard-band may comprise one or more RBs of the carrier/cell.

The base station may configure multiple sets of subbands for the carrier/cell. For example, each set of subbands may be configured/defined based on a given subcarrier spacing (SCS)/numerology. For example, each set of subbands may be nested in the carrier bandwidth. Each set of subbands may comprise one or more subbands. Each subband may comprise one or more resource blocks, wherein the resource blocks are defined/configured based on the SCS/numerology of the set. For example, a resource block may comprise 12 subcarriers, wherein a width of each subcarrier in the frequency domain is equal to the given subcarrier spacing of the set. A first set of subbands may be configured based on a first SCS/numerology.

Figure 17:
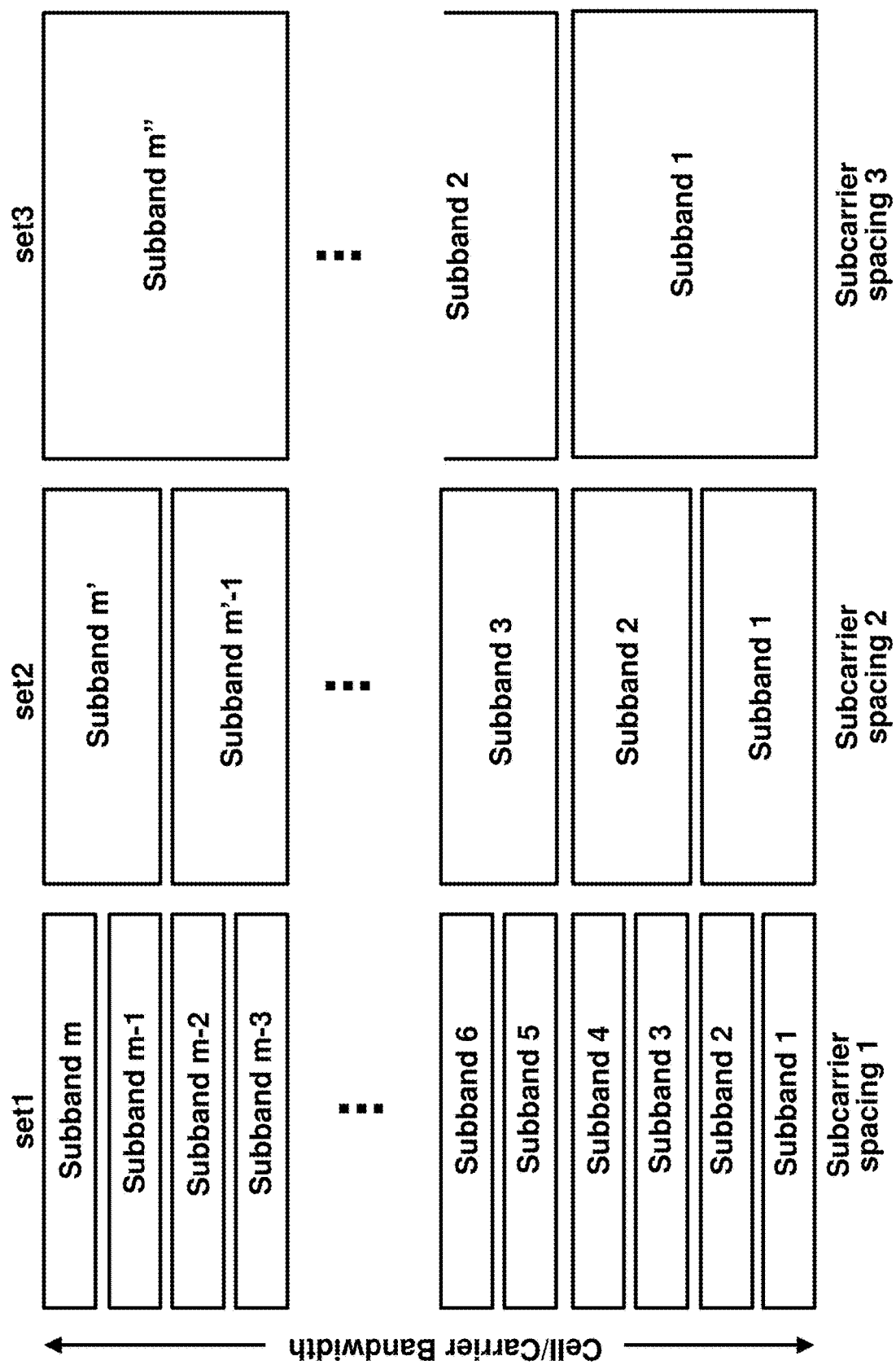
FIG. 17 shows an example of a carrier/cell configured with multiple sets of subbands based on different subcarrier-spacings as per one or more embodiments of the present disclosure.

FIG. 17 shows an example of a carrier/cell configured with 3 sets of subbands. As shown in the figure, the carrier bandwidth may comprise one or more subbands. In this example, three sets of subbands are configured for the carrier. The base station may configure each set of subbands based on a numerology/SCS. For example, set #1 is configured based on SCS1, set #2 is configured based on SCS2, and set #3 is configured based on SCS3. For example, SCS2 may be twice SCS1. For example, SCS3 may be twice SCS2. In this example, the subband sets span over the entire carrier bandwidth. In another example, each set may span over a part of the carrier bandwidth. The sets may or may not overlap in the frequency domain. In example of FIG. 17, set #1 comprises m subbands, set #2 comprises m' subbands, and set #3 comprises m" subbands. In an example, the subband sets may comprise same number of subbands.

A bandwidth of a subband may be equal to or smaller than a bandwidth capability of the wireless device (e.g., a RedCap UE). For example, the wireless device may indicate (explicitly or implicitly) its bandwidth capability to the base station. For example, a reduced bandwidth UE may use a first set of PRACH resources dedicated to/configured for reduced bandwidth UEs of the same type. For example, the base station may configure the subbands (e.g., the SCS of subbands and/or the size/width of subbands and/or the number of subbands) for a wireless device in response to its indicated bandwidth capability. The UE may not expect to receive subband configuration with bandwidth greater than the UE's bandwidth capability. The UE may skip/ignore subband configuration with bandwidth greater than the UE's bandwidth capability. The UE may use part of the subbands that is equal to the UE's bandwidth capability, and not use/ignore the rest of the subband's bandwidth.

The wireless device may receive one or more messages (e.g., one or more RRC message) comprising configuration parameters of one or more BWPs of the cell/carrier. A BWP may be a DL BWP. The BWP may be an active DL BWP. The BWP may be an initial/default DL BWP. The BWP may not be an initial/default DL BWP. A BWP may be an UL BWP. The BWP may be an active UL BWP. The UE may receive the one or more messages via dedicated/UE-specific signaling. The configuration parameters may indicate a plurality of resource blocks of the carrier/cell as the physical resource blocks (PRBs) of the BWP. For example, the configuration parameters may indicate a location (e.g., an index of an RB of the cell/carrier as a starting PRB of the BWP) and/or a bandwidth (e.g., a number of contiguous RBs of the cell/carrier, starting from the starting PRB) for the BWP.

The BWP may be configured based on a second numerology/SCS. For example, the second numerology/SCS of the BWP may be the same as the first numerology/SCS of the first set of subbands of the carrier/cell. The wireless device may determine one or more subbands from the plurality of subbands that overlap with the BWP. For example, the wireless device may determine one or more subbands from the first set of subbands whose numerology is the same as/equal to the BWP's numerology. For example, the BWP may fully comprise the one or more subbands. The one or more subbands may partially overlap with the BWP. The bandwidth of the BWP may comprise the one or more subbands. The BWP may comprise a first subband from the one or more subbands.

Figure 18:
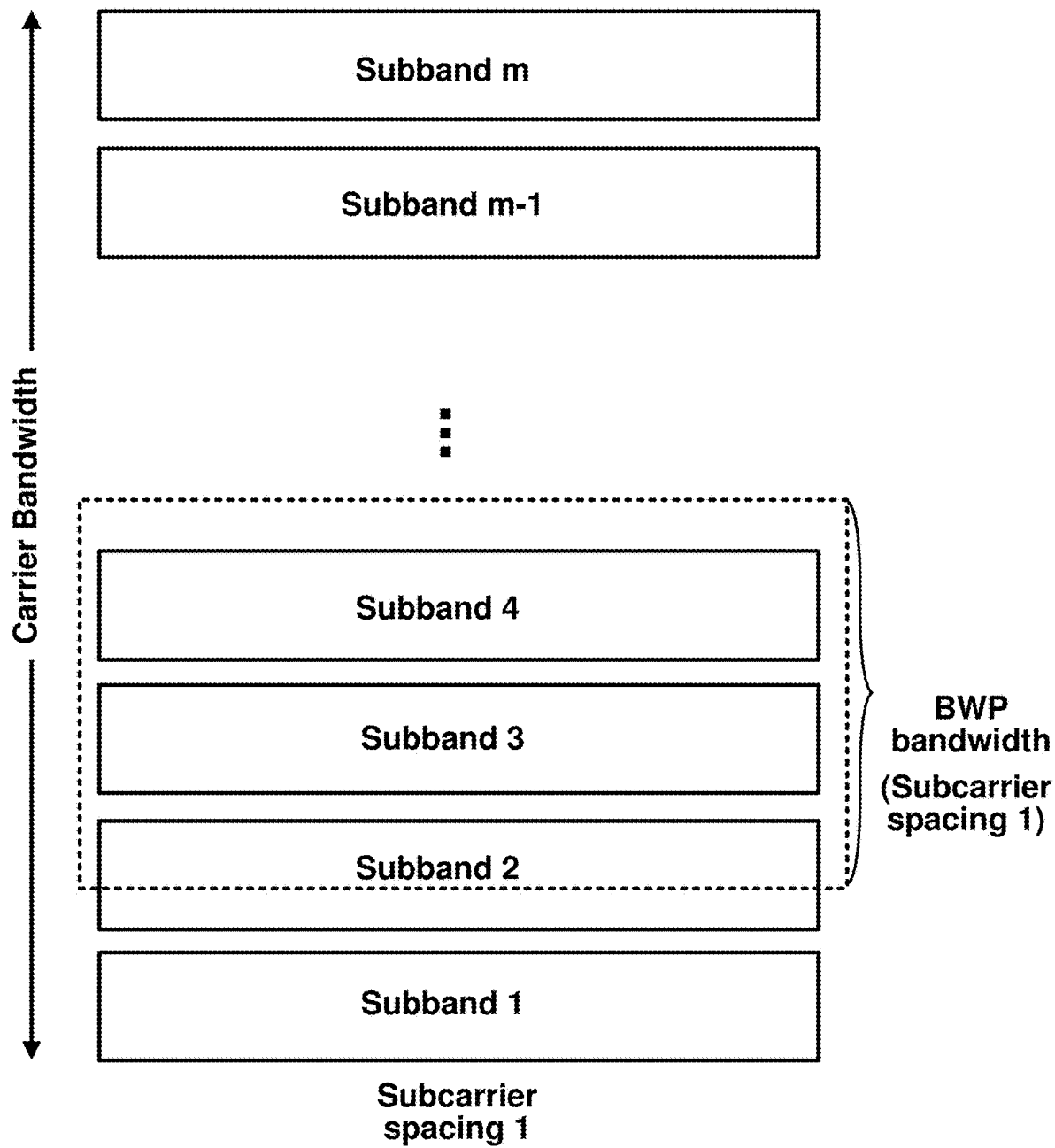
FIG. 18 shows an example of a BWP comprising subbands based on a specific subcarrier-spacing as per one or more embodiments of the present disclosure.

FIG. 18 shows an example of a BWP comprising cell-specific subbands. The base station configures the cell/carrier comprising m subbands. The m subbands may have equal size/width. The m subbands may have different size/width. For example, the base station may indicate the number m, and the UE may determine the m subbands by dividing the carrier bandwidth into m sections. For example, the UE may exclude guard-bands (inter-cell and/or intra-cell). For example, the value m may be pre-defined, e.g. based on the carrier bandwidth. For example, the base station may indicate a starting RB and/or a size in terms of number of consecutive/contiguous RBs for each subband. The numerology/SCS of the BWP and the subbands may be the same. The wireless device may receive the BWP configuration and determine the RBs of the BWP. The wireless device may determine that subband #2 and subband #3 and subband #4 overlap with the BWP. For example, the wireless device may determine subband #2 and subband #3 and subband #4 of the cell/carrier as the set of subbands for subband hopping within the configured BWP. The wireless device may determine only the part/RB(s) of subband #2 that overlaps with the BWP as available RBs of subband #2 for hopping within the BWP. For example, the wireless device may determine subband #3 and subband #4 of the cell/carrier as the set of subbands for subband hopping within the configured BWP, because they fully overlap with the BWP. The wireless device may not select/determine subbands from the other sets of subbands configured for the carrier with a numerology/SCS different than BWP's numerology/SCS #1. The wireless device may not determine the subbands within the selected set that do not overlap with the BWP.

The BWP may comprise at least one cell-specific subband. For example, the bandwidth of the BWP may comprise a first subband. The first subband may be cell-specific. The base station may indicate the first subband using common/cell-specific/group-specific signaling. The first subband may be configured based on the same numerology as the BWP. The first subband may fully or partially overlap with the bandwidth of the BWP. The UE may determine one or more PRBs of the BWP that overlap with the first subband.

The configuration parameters may indicate a subband hopping pattern for the one or more subbands of the BWP. The UE may determine the one or more subbands from the plurality of cell-specific subbands that are configured based on the same numerology as the BWP and/or overlap with the BWP. The subband hopping pattern may be BWP-specific. For example, the base station may indicate the subband hopping pattern using dedicated signaling (e.g., RRC signaling and/or MAC-CE and/or DCI).

The configuration parameters may indicate a hopping pattern for the one or more subbands. The hopping pattern may be BWP-specific. The wireless device may apply the hopping pattern to the one or more subbands of the BWP, which overlap with the BWP's bandwidth. The hopping pattern may be predefined. For example, the hopping pattern may comprise a hopping interval. For example, the hopping interval may indicate intra-slot/subframe or inter-slot/subframe hopping. For example, the hopping interval may be one or more slots based on the numerology of the BWP and/or subband. For example, the hopping interval may be one or more milli-seconds/subframes/frames. The hopping pattern may comprise at least one hopping offset in frequency domain. The frequency hopping offsets may be in terms of a number of RBs. The frequency hopping offsets may be in terms of a number of sub-bands. The UE may index the RBs and/or subbands along the carrier/cell bandwidth sequentially in an increasing order. The UE may index the PRBs and/or subbands of the BWP sequentially in an increasing order.

The configuration parameters may indicate the RB index and/or a number of RBs for a first subband corresponding to a first hop/hopping interval/TTI. The configuration parameters may indicate the index of the first subband corresponding to a first hop/hopping interval/TTI. The first subband may be pre-defined, e.g. the subband of the carrier/cell with lowest RB/PRB index within the BWP. The first subband may be a subband with a lowest subband index. The configuration parameters may indicate a number of RBs for a hopping offset. The configuration parameters may indicate a number of subbands for a hopping offset. For example, the UE may determine a second subband corresponding to a second hop/hopping interval/TTI by adding the hopping PRB offset to an index of a first/last PRB of the first subband. For example, the UE may determine the second subband corresponding to the second hop/hopping interval/TTI by adding the hopping subband offset (hopping offset in terms of number of subbands) to the index of the first subband.

In an example, RB may refer to the common resource blocks of a carrier. The UE may index the RBs (CRBs) in an increasing order starting from the lower edge of the carrier (the CRB comprising the lowest available subcarrier spacing with respect to Point A of the carrier). In an example, PRB may refer to the physical resource blocks within a BWP. For example, the UE may determine the PRBs of a BWP based on the RBs of the carrier (based on the numerology of the BWP) that overlap with the bandwidth of the BWP. For example, the UE may index the PRBs within a BWP staring from the lowest RB of the BWP. The UE may index the one or more subbands of the BWP, e.g., in an increasing order of starting PRBs. The hopping pattern may indicate an index of a first/reference/initial/anchor subband, e.g. for an initial hop and/or for an operation with disabled hopping. For example, the UE may stay on/use continuously the first/reference/initial/anchor subband in response to the subband hopping not being enabled/activated or being disabled/deactivated.

For example, the hopping pattern may indicate a starting time for the subband hopping across the one or more subbands of the BWP. For example, the hopping pattern may indicate a time offset. The UE may apply the time offset to a reception time of a signal triggering subband hopping. The UE may apply the time offset to the time instance/slot/symbol of the triggering event. The time offset may be pre-defined. The time offset may comprise one or more OFDM symbols defined based on the numerology of the BWP/subband of the BWP. The time offset may comprise one or more slots defined based on the numerology of the BWP/subband. The time offset may be expressed in milli-seconds. The UE may determine the reference subband for communication via the BWP at a first time interval based on the starting time. The UE may determine the starting time based on the time offset.

The hopping pattern may comprise one or more hopping intervals. For example, the second configuration parameters may indicate a time interval for each hop, at the end of which the UE may hop to the next subband. The UE may determine the next subband based on the hopping offset/frequency offset. The hopping interval may comprise one or more slots/OFDM symbols defined using the numerology of the BWP/subbands of the BWP. The hopping interval may comprise one or more subframes/frames. The hopping interval may be an absolute value (e.g. one or more milli-seconds). For example, the hopping interval may be half a slot (e.g. intra-slot hopping). For example, the hopping interval may be one slot (e.g. inter-slot hopping).

For example, the hopping pattern may indicate one or more hopping offsets/frequency offsets. The hopping offset may comprise one or more PRBs (e.g. a number of PRBs), based on the numerology/SCS of the BWP/subbands of the BWP. The frequency offset may comprise one or more subbands (e.g. a number of subbands). The UE may determine the next hop/subband/starting PRB by applying the hopping offset to the current hop/subband/starting PRB. The hopping offset may be wrapped in the bandwidth of the BWP (e.g. using a modulo function). For example, the UE may use a first hopping offset for a first hop, and a second hopping offset for a second hop. For example, the UE may use the first hopping offset for a third hop, and so on.

Figure 19:
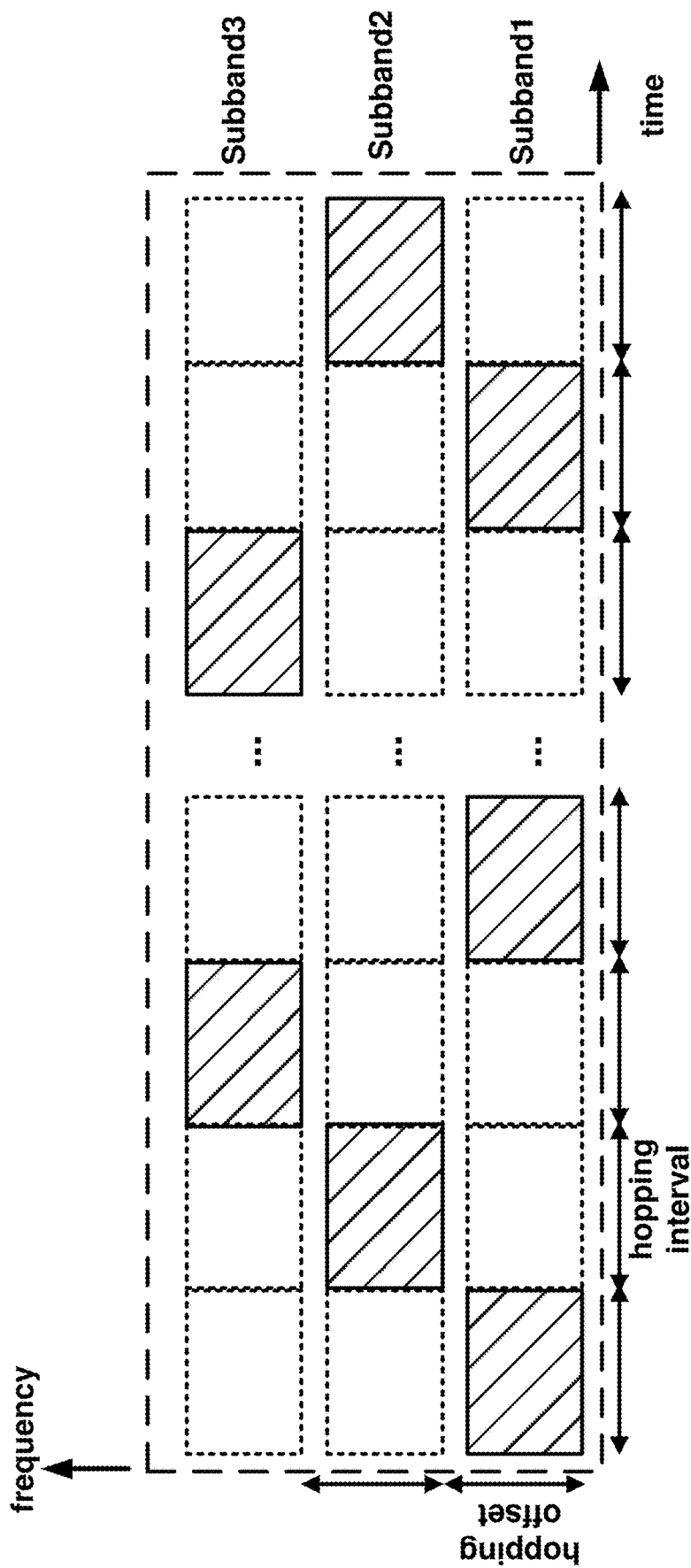
FIG. 19 shows an example of subband hopping as per one or more embodiments of the present disclosure.

FIG. 19 shows an example of subband hopping. The figure may show subband hopping within a BWP comprising three subbands. The figure may show BWP hopping in a cell across three BWPs (subbands). The figure may show BWP hopping (hopped BWP and/or BWP retuning and/or virtual BWP switching) in a cell across three subbands, wherein (effective/active) resource blocks of the BWP during each hopping interval are determined, in a TDM manner, based on a subband associated with the hopping interval according to the subband hopping pattern. The effective (active) RBs/subband/BWP at each hop is shown by hatched pattern. There may be intra-cell guard-bands in between the subbands. In an example, the guard-bands may be zero. The figure shows the hopping pattern across the three subbands. The hopping pattern Comprises the Hopping Interval and the Hopping Offset, as Shown. For Example, the hopping interval may be ½ or 1 or 2 or more slots. For example, the hopping offset may be 1 subband. For example, the subbands may have equal or different sizes. For example, the UE may determine subband #1 for communication at/during the first hopping interval, e.g. based on a pre-configured and/or pre-defined hopping pattern. For example, in an intra-BWP hopping scenario, the UE may determine the PRB(s) of the BWP that overlap with subband #1 as the available/effective/valid/active PRB(s) of the BWP for communication at/during the first hopping interval. Based on the hopping pattern/offset, the UE may determine subband #2 for communication at/during the second hop, e.g. in response to expiration of the first hopping interval. Based on the hopping pattern/offset, the UE may determine subband #3 for communication at/during the third hop, e.g., in response to expiration of the second hopping interval. Based on the hopping pattern/offset, the UE may determine subband #1 for communication at/during the fourth hop, e.g., in response to expiration of the third hopping interval. For example, hopping may be wrapped in the bandwidth of the BWP. In an example, the hopping offset may indicate a number of PRBs. The UE may apply the hopping offset to the index of the starting PRB/RB (e.g. common RB) of the first hopping interval, to determine the index of the starting PRB/RB of the second hopping interval. The UE may index the PRBs of the BWP in an increasing order. The UE may skip indexing the PRBs/RBs that overlap with guard-bands (inter-cell and/or intra-cell guard-bands).

In an example, the wireless device may start/apply hopping based on a hopping command/signal/indication. In an example, the wireless device may start/apply hopping based on a triggering event (e.g., timer and/or RACH procedure). For example, the configuration parameters of the hopping pattern may indicate a time offset. For example, the configuration parameters of the hopping pattern may indicate a frequency offset. The wireless device may use/communicate via a first subband before starting/applying the subband hopping pattern. The wireless device may start/apply the subband hopping after the offset from a time slot/subframe/symbol of receiving the hopping command/signal/indication. The wireless device may start/apply the subband hopping after the offset from a time slot/subframe/symbol of the triggering event. The wireless device may transition from the first subband to a second subband based on the frequency offset of the hopping pattern. For example, the wireless device may determine the second subband by applying the frequency offset to the first subband. In an example, the second subband corresponding to the first hop (e.g., earliest hop after starting/applying the hopping offset) may be fixed and/or independent of time slot/subframe/frame/symbol of the first hop. In an example, the second subband may be the first subband. For example, the wireless device may apply the frequency offset to the second subband to determine a third subband. For example, the wireless device may apply the frequency offset from a second hop, e.g., not the first hop.

In an example, the second subband corresponding to the first hop (e.g., earliest hop after starting/applying the hopping offset) may be variable and/or dependent of time slot/subframe/frame/symbol of the first hop. For example, the hopping pattern may be based on an absolute timing. For example, the hopping pattern may start from a fixed time slot/frame (e.g., frame #0 and/or slot #0 of a frame). For example, the hopping pattern may follow a fixed/absolute time/slot/frame index. The wireless device may determine the second subband based on the time slot/subframe/symbol/frame of starting the subband hopping and the hopping pattern. For example, the wireless device may determine the second subband based on the overlap of the hopping pattern and the (fixed) hopping pattern.

The configuration parameters of the BWP may indicate whether subband hopping on one or more subbands of the BWP is activated/enabled or not. For example, the subband hopping may be activated in response to the BWP being activated. For example, the UE may receive BWP configuration with enabled subband hopping in response to the UE's indication of reduced bandwidth capability/requirement. In an example, subband hopping may be limited to BWP bandwidth. The UE may determine the one or more subbands of the BWP in response to the configuration parameters of the BWP indicating that subband hopping is configured/enabled/activated. For example, the UE may start subband hopping across the one or more subbands in response to the configuration parameters of the BWP indicating that subband hopping is configured/enabled/activated. The UE may start subband hopping in response to receiving a DCI format indicating that subband hopping is activated/enabled. For example, one or more fields in the DCI format may indicate a first subband hopping pattern for the BWP. For example, one or more fields in the DCI format may indicate (explicitly or implicitly) that subband hopping is enabled/activated based on the first subband hopping pattern. For example, the wireless device may validate the DCI format (e.g., determining that the one or more fields indicate activation/enabling of the subband hopping). The UE may start subband hopping in response to validating the DCI format. The UE may discard the information in the DCI format and may not apply subband hopping if the validation is not achieved. The UE may start subband hopping in response to receiving a MAC-CE indicating that subband hopping is activated/enabled for the BWP. For example, one or more fields in the MAC-CE may indicate a first subband hopping pattern. For example, one or more fields in the MAC-CE may indicate (explicitly or implicitly) that subband hopping is enabled/activated based on the first subband hopping pattern.

In an example, the base station may configure one or more BWPs for the wireless device in a cell. The base station may configure a plurality of subbands for a BWP of the wireless device (e.g., the active BWP). For example, the subbands may be BWP-specific. The subbands may have the same numerology as the BWP. The base station may configure the plurality of subbands within the bandwidth of the BWP. For example, the base station may indicate a starting PRB and/or a size/length for a subband (e.g., a first subband and/or for each subband). For example, the starting PRB may be with respect to the resource blocks (e.g., PRB0) of the BWP. The wireless device may apply a subband hopping pattern to the plurality of subbands of the BWP. For example, the subband hopping pattern may be BWP-specific. The subband hopping pattern may be UE-specific.

In an example, a subband may be a BWP. For example, the base station may configure a plurality of BWPs for a wireless device. The base station may configure at least one BWP set/group, each BWP set/group comprising BWPs. For example, a first BWP set may comprise the plurality of BWPs. For example, the plurality of BWPs in the first BWP set may have the same numerology/SCS. Having the same numerology may result in reduced BWP switching delay, and optimized BWP hopping (subband hopping). For example, bandwidths of the plurality of BWPs may be equal to or smaller than the UE bandwidth capability. The wireless device may be configured with BWP hopping in a cell. For example, the wireless device may apply subband hopping pattern on the plurality of BWPs (e.g., BWP hopping). For example, at each hop, the wireless device may perform BWP switching. The subband/BWP hopping pattern may be cell-specific. The subband/BWP hopping pattern may be UE-specific.

Figure 20:
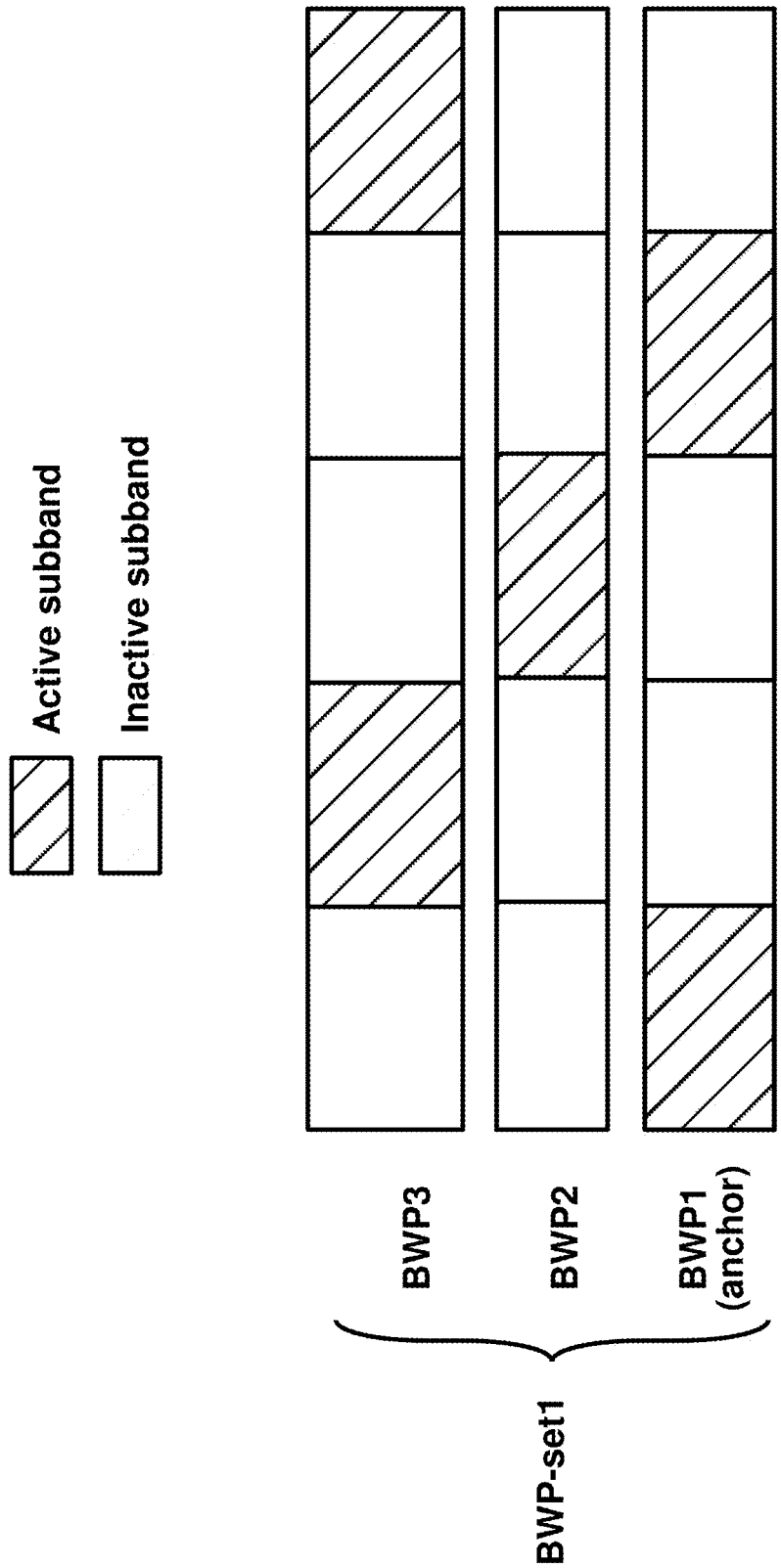
FIG. 20 shows an example of a BWP set as per one or more embodiments of the present disclosure.

FIG. 20 shows an example BWP set/group. The BWP set comprises three BWPs. Each BWP in the BWP set may be defined/considered as a subband. One of the BWPs in the BWP set may be configured/defined/indicated as an anchor BWP (e.g., anchor/primary/default BWP/subband). In this figure, BWP #1 is the anchor BWP. The wireless device may be configured with more BWP sets (this figure shows BWP-set #1). The wireless device may apply the subband hopping pattern to the BWPs in the BWP set. As shown in this example, the wireless device performs subband hopping within the BWP set. In this example, the frequency offset is equal/equivalent to two BWPs. The BWPs in the BWP set may or may not have the same bandwidth. The resource allocation at each hop may be compatible (e.g., confined to the bandwidth) of the respective BWP (subband). The effective (active) subband/BWP at each hop is shown by hatched pattern.

In any of the embodiments of the present disclosure, the wireless device may be configured with a plurality of subbands. The plurality of subband may be cell-specific. The plurality of subband may be BWP-specific. A subband may be a portion of a carrier/system bandwidth. A subband may be a portion of a BWP (e.g., a wideband BWP). A subband may be a BWP. In these embodiments, the wireless device may be configured with a subband hopping pattern for the plurality of subbands. The wireless device may communicate with the base station and/or other wireless devices at each hop (hoping interval) using the subband corresponding to the hop (e.g., effective/active subband). For example, an active/effective BWP may comprise of different/hopped resource blocks/frequency regions/subbands in a TDM manner. For example, the wireless device may determine resource blocks (e.g., staring RB/PRB) of the BWP based on the subband hopping pattern. For example, based on the hopping pattern, during each hopping interval, the BWP may comprise of resource blocks of a subband associated with the hopping interval. The wireless device may transmit/receive signals and/or channels based on the subband hopping pattern. For example, the wireless device may only monitor PDCCH monitoring occasions that are within an effective/active subband at a hop. The wireless device may hop from a first subband at a first hopping interval to a second subband at a second hopping interval based on the (activated/enabled/configured) subband hopping pattern.

The base station may perform/apply the same subband hopping pattern as the wireless device, to be aligned for transmissions/receptions.

A wireless device may receive configuration parameters of subband hopping pattern. The configuration parameters may indicate a plurality of subbands to the wireless device. A subband may be a portion of a carrier/system bandwidth. A subband may be a portion of a BWP (e.g., a wideband BWP). A subband may be a BWP. The plurality of subbands may be cell-specific. For example, the configuration parameters may indicate a starting RB and/or size/length of a subband/BWP, with respect to common resource blocks of the carrier/cell. In an example, the starting RB and/or size/length of subbands/BWPs may be pre-defined. In an example, the starting RB and/or size/length of subbands/BWPs may be indicated via DCI and/or MAC-CE. In an example, the UE may determine the starting RB and/or size/length of a BWP in a TDM manner based on the subband hopping pattern. The wireless device may receive configuration parameters of one or more BWPs. In an example, a subband may be a BWP. In an example, a BWP may comprise the plurality of subbands. For example, the plurality of subbands may be BWP-specific. For example, the configuration parameters may indicate a starting PRB and/or size/length of a subband, with respect to physical resource blocks (PRBs) of the BWP. In an example, the starting PRB and/or size/length of subbands may be pre-defined. In an example, the starting PRB and/or size/length of subbands may be indicated via DCI and/or MAC-CE.

The wireless device may receive configuration parameters of a subband hopping pattern. The subband hopping pattern may be for the plurality of subbands. The subband hopping pattern may be for a subset of the plurality of subbands. The subband hopping pattern may be pre-defined. The subband hopping pattern may indicate one or more parameters for subband hopping. The one or more parameters may comprise: a hopping interval (e.g., one or two or more slots or half a slot, etc.); a frequency offset (e.g., one or more PRBs, or one or more subbands, etc.); an indication indicating a subset of the plurality of subbands; a primary/anchor/default subband; etc. In an example, the hopping interval may be pre-defined. In an example, the hopping interval may be indicated by a DCI and/or MAC-CE. In an example, the frequency offset may be pre-defined. In an example, the frequency offset may be indicated by a DCI and/or MAC-CE.

A bandwidth of a subband may be equal to a bandwidth capability of the wireless device. A bandwidth of a subband may be smaller than a bandwidth capability of the wireless device.

For example, when wireless device receives configuration parameters of subband hopping, the wireless device may determine an initial subband. The initial subband may be a primary/anchor/default subband. The configuration parameters of subbands may indicate the primary/anchor/default subband. The subband hopping pattern may indicate the primary/anchor/default subband. The primary/anchor/default subband may be pre-defined. For example, the primary/anchor/default subband may be a subband with a smallest/largest index (e.g., subband index or BWP index). For example, the primary/anchor/default subband may be a subband with a lowest/highest resource block in the cell/BWP. For example, the configuration parameters may indicate an index of the primary/anchor/default subband. For example, the configuration parameters may indicate an RB (e.g., starting PRB) of the primary/anchor/default subband. For example, a DCI/MAC-CE may indicate the primary/anchor/default subband. For example, the wireless device may select one of the plurality of subbands as the primary/anchor/default subband. The wireless device may indicate to the base station (e.g., via uplink control/data transmission) the primary/anchor/default subband.

The wireless device may communicate (e.g., transmit or receive) via the initial subband (e.g., the primary/anchor/default subband), e.g., after/in response to receiving the configuration parameters of the subbands. For example, the wireless device may monitor PDCCH monitoring occasions limited to the initial subband. The PRBs of the active BWP may be limited to the PRBs of the initial subband, e.g., before activating subband hopping. For example, the wireless device may stay on/use the initial subband until the subband hopping is activated/enabled/started.

The wireless device may start hopping based on a subband hopping pattern. The wireless device may start applying the subband hopping pattern. The wireless device may apply/perform/activate/enable the subband hopping pattern in response to an indication. For example, the wireless device may receive a signal/indication from the base station indicating an activation/enabling of the subband hopping. For example, the wireless device may receive a DCI/MAC-CE/RRC signal indicating that subband hopping is activated/enabled. The wireless device may be configured with multiple subband hopping patterns. In an example, one or more fields in the DCI/MAC-CE/RRC message may indicate that the subband hopping is activated/enabled based on a first subband hopping pattern. The wireless device may start/apply subband hopping after a time offset from receiving the activation command. In an example, the time offset may be based on a subband/BWP switching delay and/or BWP numerology.

Figure 21:
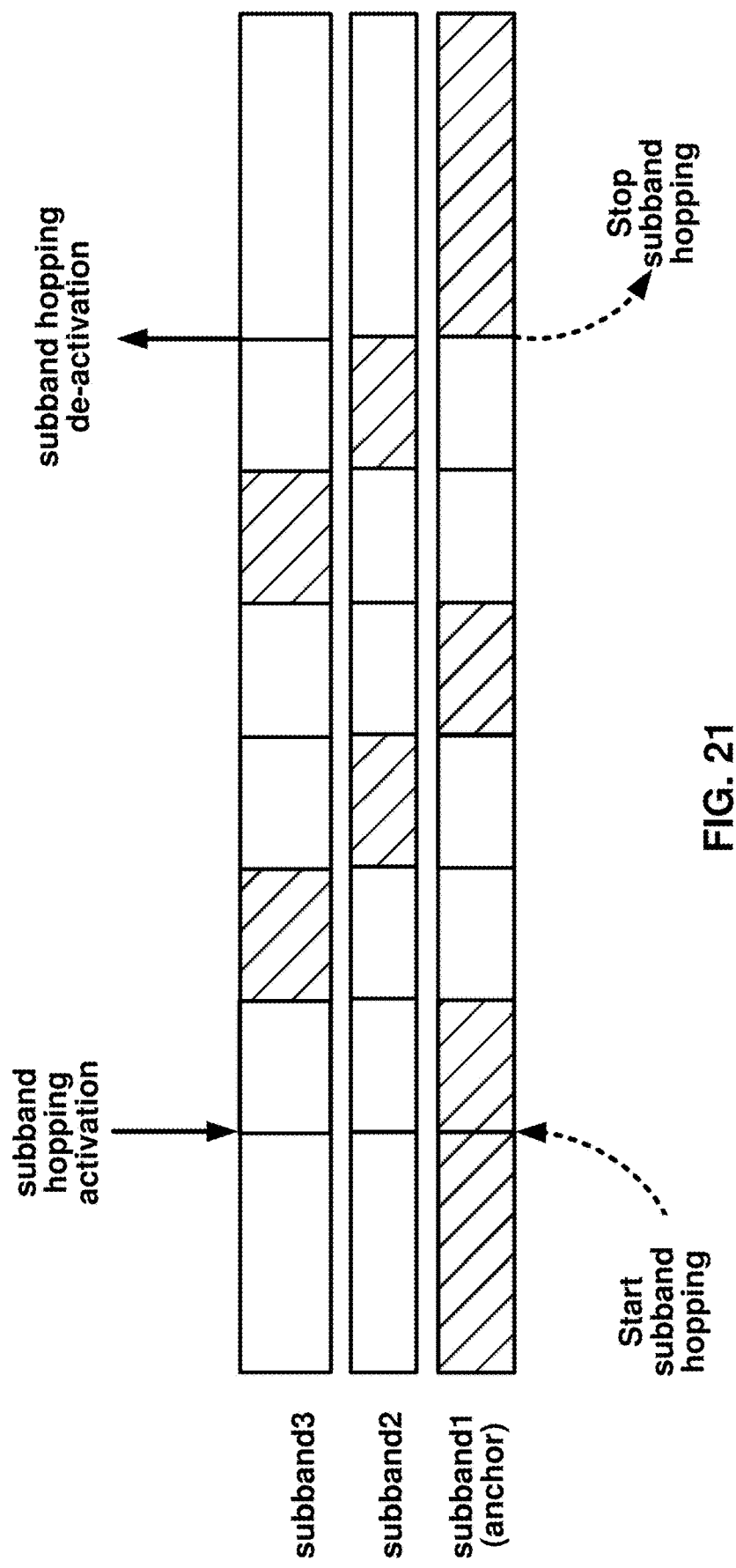
FIG. 21 shows an example of subband hopping activation and deactivation as per one or more embodiments of the present disclosure.

FIG. 21 shows an example of subband hopping activation and deactivation. The wireless device may be using an anchor/default/primary/initial subband (e.g., subband1). The wireless device may activate subband hopping in response to a triggering event. For example, the wireless device may start hopping/applying the subband hopping under one or more conditions. The triggering event may be receiving a signal/indication, e.g., a DCI/MAC-CE/RRC message indicating that subband hopping is activated/enabled. The triggering event may be starting a duration and/or period. The triggering event may be BWP/cell activation. The triggering event may be starting a timer/counter. The triggering event may be measuring a parameter and determining that the parameter is below/above a threshold. The wireless device may automatically (e.g., based on UE implementation) activate subband hopping. The wireless device may indicate to the scheduler (e.g., base station) via some signaling (explicitly, e.g. via some parameter, or implicitly, e.g. using some resource) that it has activated the subband hopping. The wireless device may activate subband hopping and may start hopping/using subbands based on a subband hopping pattern.

The wireless device may determine a first subband (e.g., subband1 in FIG. 21) in response to activating the subband hopping. The first subband may be the initial subband. The first subband may be indicated by the subband hopping pattern (e.g., by applying the frequency offset to the initial subband). The first subband may be a subband that the wireless device is using prior to the subband hopping activation. The wireless device may hop/switch from the first subband to a second subband (e.g., subband3 in FIG. 21) based on the subband hopping pattern. The wireless device may continue hopping based on the subband hopping pattern.

The wireless device may deactivate subband hopping. For example, the wireless device may stop/pause/suspend subband hopping based on the subband hopping pattern. The wireless device may deactivate subband hopping based on one or more conditions. For example, the wireless device may automatically (e.g., based on UE implementation), stop/pause/suspend subband hopping. The wireless device may indicate to the scheduler (e.g., base station) via some signaling (explicitly, e.g. via some parameter, or implicitly, e.g. using some resource) that it has deactivated the subband hopping. The wireless device may receive a signal/indication, e.g., a DCI/MAC-CE/RRC message indicating that subband hopping is deactivated/disabled/paused/suspended. The wireless device may stop subband hopping in response to exhausting a duration and/or period. The wireless device may stop subband hopping in response to expiration of a timer/counter. The wireless device may stop subband hopping based on a parameter, e.g., in response to determining that the parameter is below/above a threshold.

The wireless device may stop subband hopping in response to subband hopping deactivation, as shown in FIG. 21. The wireless device may fall back to the initial/anchor/primary/default subband in response to subband hopping deactivation. For example, the wireless device may stay on/use the initial/anchor/primary/default subband while subband hopping is deactivated/not activated (as in FIG. 21). The wireless device may stay on/continue using a last subband which it used based on the subband hopping pattern, while subband hopping was activated. For example, in another example based on FIG. 21, the wireless device may stay on subband2 in response to subband hopping deactivation. In an example, the wireless device may select one of the subbands to use/stay on while the subband hopping is stopped/deactivated. The wireless device may (explicitly, e.g. via some parameter, or implicitly, e.g. using some resource) indicate to the base station the selected subband.

In an example, the wireless device may apply subband hopping periodically, e.g., based on at least one period. For example, the configuration parameters of the subband hopping pattern may indicate the at least one period. A hopping period may comprise at least two time intervals/durations. A hopping period may comprise a first duration (e.g., ON duration) and/or a second duration (e.g., OFF duration). Each duration may correspond to a hopping mode. For example, the first duration of the hopping period may correspond to a "hopping ON" mode. For example, the first duration of the hopping period may correspond to a "hopping based on subband hopping pattern #1" mode. For example, the second duration of the hopping period may correspond to a "hopping OFF" mode. For example, the first duration of the hopping period may correspond to a "hopping based on subband hopping pattern #2" mode, and so on.

The wireless device may start applying/activate periodic subband hopping in response to receiving an indication. A DCI/MAC-CE/RRC message may comprise the indication. The wireless device may start applying/activate periodic subband hopping in response to BWP/cell activation. The wireless device may start applying/activate periodic subband hopping in response to receiving configuration parameters of the subbands and/or subband hopping pattern. The wireless device may start applying/activate periodic subband hopping based on a timer.

Figure 22:
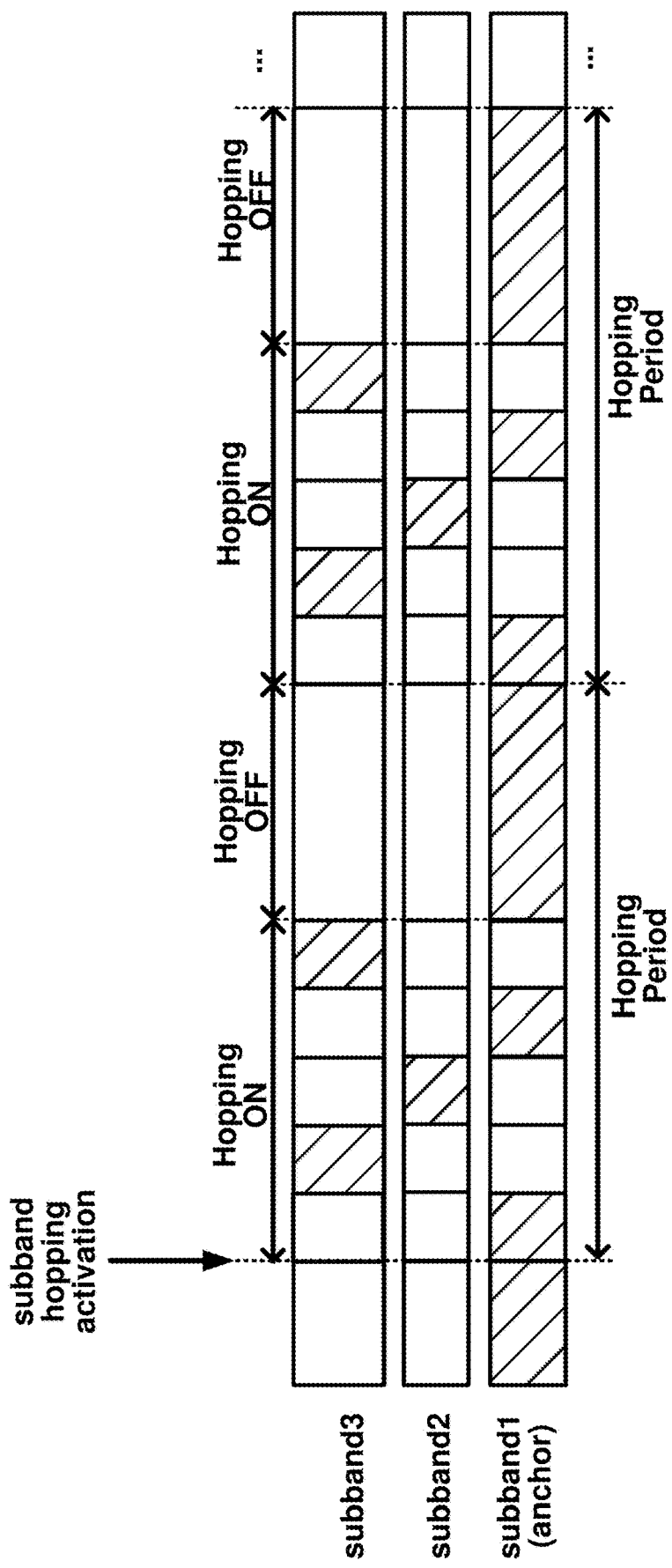
FIG. 22 shows an example of periodic subband hopping as per one or more embodiments of the present disclosure.

FIG. 22 shows an example of periodic subband hopping. The wireless device may activate subband hopping. In response to subband hopping activation, the wireless device may start subband hopping based on a subband hopping pattern. The subband hopping pattern may be periodic. For example, the configuration parameters of a subband hopping pattern may indicate a periodicity (e.g., hopping period as in FIG. 22). In an example, the hopping period may be predefined. A DCI and/or MAC-CE and/or RRC message may indicate the hopping period. The wireless device may determine the hopping period based on one or more parameters (e.g., based on DRX on/off durations).

The wireless device may apply subband hopping (e.g., based on a subband hopping pattern) during a portion of the hopping period (e.g., during the "hopping ON" duration, as shown in FIG. 22). The wireless device may start a "hopping ON" duration immediately when beginning a hopping period. The wireless device may not apply/stop/suspend subband hopping (e.g., based on the subband hopping pattern) during a second portion of the hopping period (e.g., during the "hopping OFF" duration, as shown in FIG. 22). The wireless device may start a "hopping OFF" duration immediately after the "hopping ON" duration is over/expired. During the OFF duration, the wireless device may stay on a subband, e.g., the anchor/primary/default/initial subband, or the last subband corresponding to the last hopping period based on the subband hopping pattern. The wireless device may stop the periodic subband hopping in response to subband hopping deactivation. In an example, the wireless device may apply the subband hopping deactivation during an OFF duration of a respective period. In an example, the wireless device may apply the subband hopping deactivation at the end of a respective period. In an example, the wireless device may not expect to receive a subband hopping deactivation command during a hopping ON duration. In an example, if the wireless device receives a subband hopping deactivation command during a hopping ON duration, the wireless device may apply deactivation immediately after the expiration of hopping ON duration or the hopping period. In an example, a DCI and/or MAC-CE may indicate a value for the hopping ON duration and/or hopping OFF duration.

In an example, the hopping ON duration may be a DRX ON duration. In an example, the hopping OFF duration may be a DRX OFF duration. In an example, the wireless device may apply the subband hopping pattern if the DRX is ON. For example, the wireless device may deactivate subband hopping in response to switching to DRX OFF duration. For example, the periodic subband hopping may be applied to DRX ON duration. For example, the wireless device may not expect to receive subband hopping activation command during a DRX OFF duration. For example, the wireless device may postpone subband hopping to a DRX ON duration, e.g., if activation is received during a DRX OFF duration. By dynamically applying subband hopping, the wireless device may further optimize a power consumption during a DRX ON duration while increasing a frequency diversity gain when needed.

In an example, the wireless device may disable/deactivate subband/BWP hopping if an indication of dormancy is received.

Figure 23:
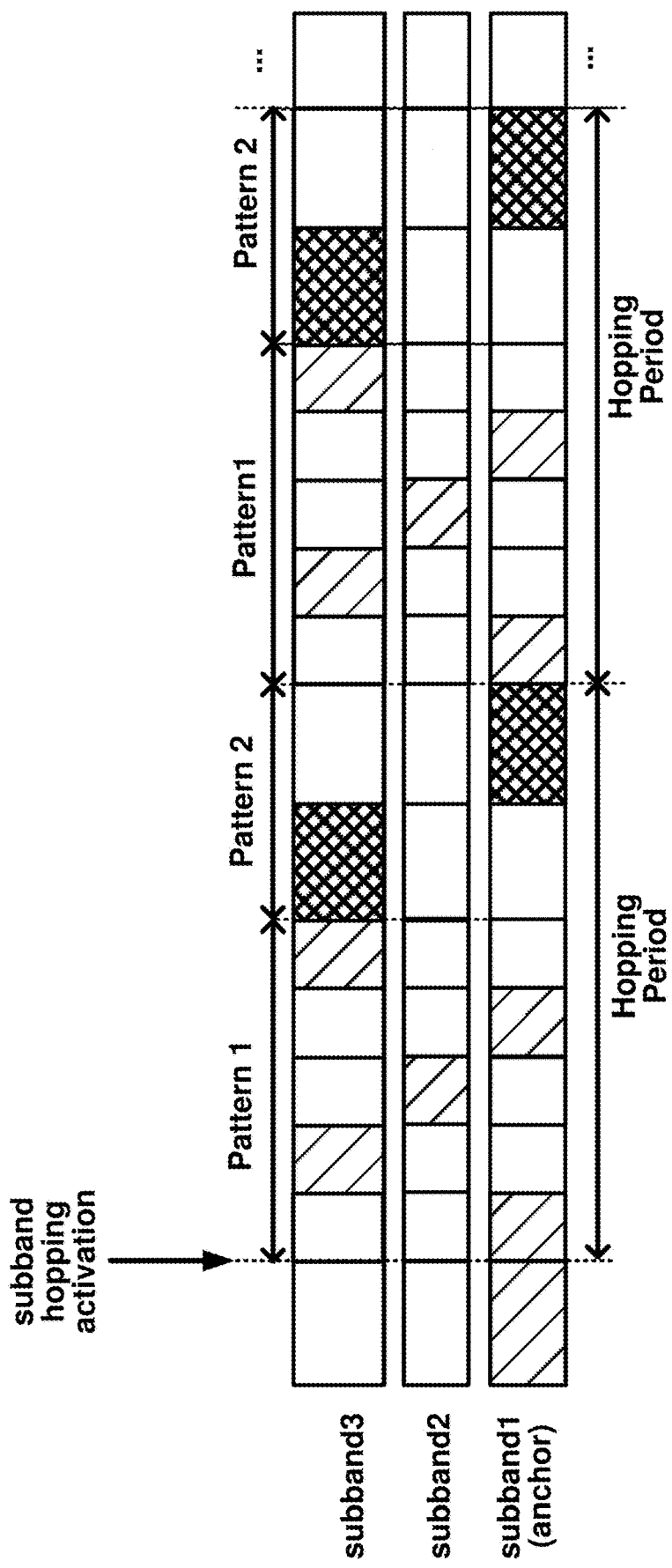
FIG. 23 shows an example of periodic subband hopping based on two hopping patterns as per one or more embodiments of the present disclosure.

FIG. 23 shows an example of periodic subband hopping based on two hopping patterns. The wireless device may receive configuration parameters of two (or more) subband hopping patterns. The hopping period may comprise of two (or more) durations. Each duration may correspond to a subband hopping pattern. For example, as shown in FIG. 23, the wireless device may apply subband hopping based on a first subband hopping pattern (pattern 1) during the first duration of the hopping period; the wireless device may apply subband hopping based on a second subband hopping pattern (pattern 2) during the second duration of the hopping period, and so on. For example, the first hopping pattern may be associated with a reduced delay hopping and/or higher data rate mode, while the second hopping pattern may be associated with a power saving mode.

In an example, the hopping period may consist of three (or more) durations. For example, a first duration for a first hopping pattern, a second period for a second hopping pattern, and a third (or last) period for an OFF duration (no hopping).

In an example, the wireless device may be configured with a first duration for a first subband hopping pattern. The wireless device may apply the first subband hopping pattern during the first duration. For example, the wireless device may start the first duration based on a triggering event (e.g., receiving a signal/indication, and/or periodically, and/or a parameter being below/above a threshold, etc.). The wireless device may change/switch from the first subband hopping pattern to a second subband hopping pattern based on a second triggering event. For example, a DCI and/or MAC-CE and/or RRC message may indicate the pattern switch. For example, the wireless device may switch/change the hopping pattern in response to receiving a parameter corresponding to the second hopping pattern (e.g., a frequency offset different from the first frequency offset of the first subband hopping pattern). For example, the wireless device may switch/change the hopping pattern in response to determining at least a first parameter (e.g., speed and/or delay spread and/or channel occupancy level and/or power level, etc.) falls below/above a second threshold. In an example, the wireless device may switch to a "hopping off" mode based on a third triggering event. For example, the wireless device may stop/suspend/pause subband hopping (based on first pattern and/or second pattern) based on receiving an indication (e.g., DCI and/or MAC-CE and/or RRC message). For example, the wireless device may stop/suspend/pause subband hopping in response to determining at least a second parameter (e.g., speed and/or delay spread and/or channel occupancy level and/or power level, etc.) falls below/above a third threshold.

In an example, the wireless device may be configured with a first subband hopping pattern for a plurality of subbands. In an example, the wireless device may be configured with a first duration for a first subband hopping pattern. The wireless device may apply the first subband hopping pattern during the first duration. The wireless device may determine an initial subband from the plurality of subbands based on the first subband hopping pattern. The initial subband may be an anchor/primary/default subband. The initial subband may be a subband with a lowest subband index. The initial subband may be a subband with a lowest RB index (e.g., starting PRB index within a BWP, or starting CRB index in a cell). The configuration parameters of the subband hopping pattern may indicate the initial subband. The wireless device may transition to the initial subband in response to activation of the subband hopping. The wireless device may use/communicate via the initial subband during a first hopping interval (first hop). The wireless device communication (e.g. monitoring and/or transmissions and/or receptions) may be limited to resource blocks of the initial subband during the first hopping interval.

The wireless device may apply the first subband hopping pattern, and may continue hopping based on the first subband hopping pattern. The wireless device may start decrementing a value corresponding to the first duration, e.g., at each slot/hopping interval. For example, the wireless device may maintain an internal parameter/variable corresponding to the hopping duration. The base station may maintain the same parameter/variable for alignment purposes. The wireless device (and/or the base station) may initially set the value of the parameter/variable equal to the first duration. The wireless device (and/or the base station) may decrement the value of the parameter/variable at each time slot/subframe/hop/hopping interval. The wireless device may continue hopping based on the first subband hopping pattern as long as the value of the parameter/variable is greater than zero. For example, the wireless device may determine a first subband from the plurality of subbands based on the first subband hopping pattern based on the value of the parameter/variable being greater than zero. The wireless device may transition (e.g., at a given hop/hopping interval) to the first subband, based on the first subband hopping pattern. The wireless device may use/communicate via the first subband during the given hopping interval.

For example, the wireless device may determine whether to communicate via a second subband based on the value of the parameter/variable. For example, the wireless device may determine whether to switch from the first subband to the second subband based on the value of the parameter/variable. The parameter/variable may represent a timer, and may be decremented at each time slot/msec/subframe. The wireless device may determine whether to apply the first subband hopping pattern based on the value of the parameter/variable/counter/timer. For example, the wireless device may determine, based on the value of the parameter/variable/timer, to communicate via a second subband. The wireless device may determine/select the second subband based on (e.g., by applying) the first subband hopping pattern if the value of the parameter/variable/counter/timer is greater than zero. The wireless device may determine/select the second subband without applying the first subband hopping pattern if the value of the parameter/variable/counter/timer is equal to (or smaller) than zero.

The second subband may be the anchor/primary/initial/default subband. The second subband may be the first (previous/last) subband. The second subband may not be within the plurality of subbands. The wireless device may determine/select the second subband based on (e.g., by applying) a second subband hopping pattern. For example, the wireless device may start applying the second subband hopping pattern in response to the expiration of the first duration (the value of the parameter/variable/counter/timer reaching zero). The wireless device may use/communicate via the second subband.

The wireless device may stop/pause/suspend decrementing the value of the parameter/variable/counter/timer based on one or more conditions. The wireless device may restart/reset the value of the parameter/variable/counter/timer in response to the one or more conditions. The wireless device may hold/pause/stop/suspend decrementing for a predefined or preconfigured duration. The wireless device may resume decrementing after the predefined or preconfigured duration. For example, the wireless device may set the value of the parameter/variable/counter/timer to the first duration, in response to the one or more conditions. In an example, the wireless device may be in a "hopping off" mode/state. For example, the subband hopping may be deactivated/disabled and/or not activated/enabled. The wireless device may start/apply subband hopping based on the one or more conditions. The wireless device may set the value of the parameter/variable/counter/timer in response to the one or more conditions. For example, the wireless device may set the value of the parameter/variable/counter/timer to the first duration, in response to the one or more conditions while in a "hopping off" mode.

For example, the one or more conditions may comprise detecting an activity on the primary/anchor/default/initial subband. For example, the one or more conditions may comprise receiving an indication of hopping pattern switch. For example, the one or more conditions may comprise receiving an indication of BWP switch. For example, the one or more conditions may comprise expiration of a timer.

For example, the one or more conditions may comprise detecting an activity on the "effective" subband/BWP. The effective subband/BWP may comprise discontinuous bunches (resource blocks) of the BWP/cell associated with the subband hopping pattern. For example, the effective subband/BWP at each hop/hopping interval comprises of the subband/portion of the BWP/cell that is used/activated during the respective hop/hopping interval. For example, the effective/active BWP of the BWP shown in FIG. 19, is shown as hatched parts of each of the three subbands within the BWP that is activated/available at each hop. For example, the effective/active BWP of the BWP-set1 in FIG. 20, is shown as hatched parts of each of the three BWPs activated/available at each hop.

For example, the one or more conditions may comprise receiving a downlink assignment and/or uplink grant on the BWP/subband comprising repetitions (e.g., more than one transmissions, using different RVs). For example, the one or more conditions may comprise receiving a downlink assignment and/or uplink grant for the BWP/subband comprising repetitions. For example, the wireless device may stop decrementing the value of the parameter/variable/counter/timer if a downlink assignment and/or uplink grant is received that does not comprise/indicate repetitions. For example, the wireless device may resume or restart decrementing the value of the parameter/variable/counter/timer if a downlink assignment and/or uplink grant is received that comprises/indicates repetitions.

An activity may comprise detecting a downlink signal/channel (e.g., a DCI). An activity may comprise receiving a DCI indicating a downlink assignment for the active BWP. An activity may comprise receiving a DCI indicating a downlink assignment on the active BWP. An activity may comprise receiving a DCI indicating a downlink assignment for the active/effective subband corresponding to the effective hop (during the respective hopping interval). An activity may comprise receiving a DCI indicating a downlink assignment on the active/effective subband corresponding to the effective hop (during the respective hopping interval). An activity may comprise receiving a configured (periodic) downlink assignment. An activity may comprise receiving a MAC PDU in a configured downlink assignment, e.g., if there is no ongoing random access procedure and/or if the ongoing random access procedure associated with this serving cell is successfully completed upon reception of this downlink assignment.

An activity may comprise receiving a DCI indicating an uplink grant for the active BWP. An activity may comprise receiving a DCI indicating an uplink grant on the active BWP. An activity may comprise receiving a DCI indicating an uplink grant for the active/effective subband corresponding to the effective hop (during the respective hopping interval). An activity may comprise receiving a DCI indicating an uplink grant on the active/effective subband corresponding to the effective hop (during the respective hopping interval). An activity may comprise transmitting a configured (periodic) uplink grant. An activity may comprise transmitting a MAC PDU in a configured uplink grant, e.g., if the LBT failure indication is not received from lower layers.

The wireless device may stop/pause/suspend applying the effective subband hopping pattern when the value of the parameter/variable/counter/timer reaches zero (expires). The wireless device may deactivate/disable subband hopping in response to the value of the parameter/variable/counter/timer reaching zero. The wireless device may transition to the initial/anchor/primary/default subband in response to the value of the parameter/variable/counter/timer reaching zero. The wireless device may stay on (keep using) the last subband (which was enabled during a last hop based on the effective subband hopping pattern) in response to the value of the parameter/variable/counter/timer reaching zero. The wireless device may switch to a second subband hopping pattern in response to the value of the parameter/variable/counter/timer reaching zero. The second subband hopping pattern may be a default hopping pattern. For example, the wireless device may not start decrementing any duration/timer/counter while applying the default hopping pattern. The wireless device may determine that the anchor subband is changed to a default subband. The wireless device may switch the anchor subband (e.g., to a pre-defined/pre-configured initial/default subband) in response to the value of the parameter/variable/counter/timer reaching zero.

Figure 24:
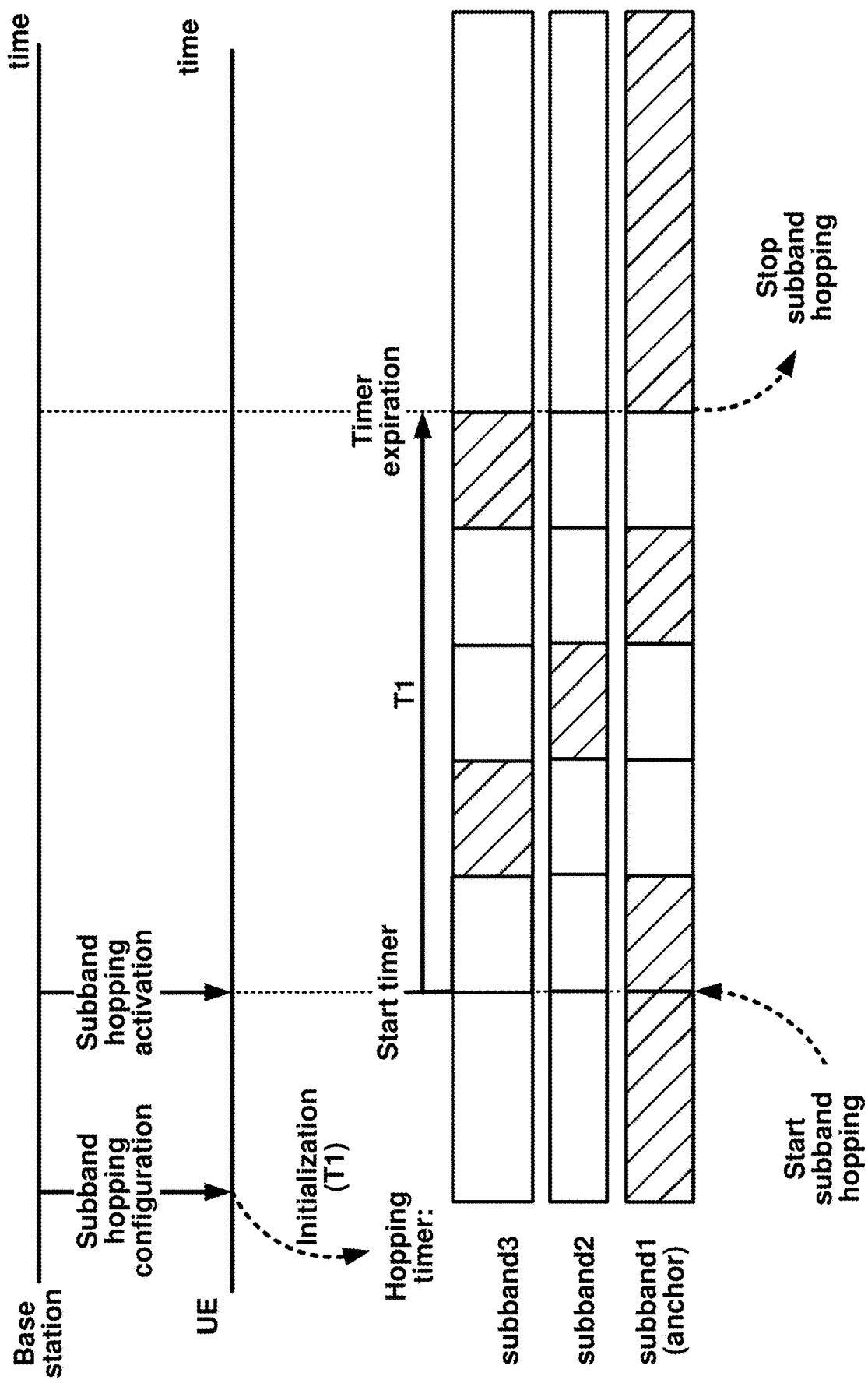
FIG. 24 shows an example of subband hopping timer operation as per one or more embodiments of the present disclosure.

FIG. 24 shows an example of subband hopping timer operation. As shown in the example, the wireless device may receive one or more messages (e.g., RRC messages) comprising configuration parameters of subband hopping. For example, the configuration parameters my indicate a subband hopping pattern. The configuration parameters may indicate a value/duration for a hoping timer (e.g., T1). The value/duration of the hopping timer may be pre-defined (e.g., a certain number multiplied by a duration of subband hopping interval, and/or some msec). The value/duration of the hopping timer may comprise an integer number of hopping intervals (e.g., m times x slots, wherein x may be ½ or 1 or 2 or etc.). The wireless device may initialize the value of the hopping timer based on the configuration parameters.

The wireless device may determine a first subband (e.g., initial/anchor subband, subband1 in FIG. 24) in response to receiving the subband hopping configuration. The wireless device may use/communicate and/or keep using/communicating via the first subband until subband hopping is activated. For example, the wireless device may receive a signal (e.g., DCI/MAC-CE/RRC message) indicating subband hopping activation based on the configured subband hopping pattern. The wireless device may activate subband hopping based on the subband hopping pattern. The wireless device, as shown in the figure, may start the hopping timer in response to the subband hopping activation. In an example, the wireless device may immediately start the hopping timer when the subband hopping is activated. In an example, the wireless device may start the hopping timer after a time offset from when the subband hopping is activated. The wireless device may apply/perform subband hopping during the configured duration. For example, the wireless device may apply the subband hoping pattern while the corresponding hopping timer is running. The wireless device may stop (applying) the subband hopping pattern if the hopping timer associated with the hopping pattern expires. As shown in the figure, the wireless device may stop subband hopping in response to the hopping timer expiration. The wireless device may use/communicate via the first subband (e.g., anchor subband) while the subband hopping is stopped/suspended.

The wireless device may continue using the primary/anchor/default/initial subband during "hopping OFF" duration. The wireless device may keep/maintain the subband hopping configurations and/or parameters before the subband hopping deactivation. For example, the wireless device may maintain the subband hopping configurations and/or parameters until receiving an indication that subband hopping (based on the respective hopping pattern) is deactivated/disabled. The wireless device, while the subband hopping is active but stopped/paused, may wait for one or more triggering events to (re)start subband hopping based on the corresponding hopping pattern again. For example, in response to the one or more triggering events, the wireless device may resume subband hopping based on the corresponding hopping pattern and may (re)start the subband hopping timer.

In an example, the wireless device may be configured with two subband hopping patterns and one (duration for) subband hopping timer. For example, one of the subband hopping patterns may be a default hopping pattern. For example, the wireless device may start subband hopping based on the default hopping pattern in response to subband hopping activation. The wireless device may switch to the second subband hopping pattern in response to one or more conditions. For example, the conditions may comprise receiving a switching command (e.g., indication via a DCI/MAC-CE/RRC message). For example, the conditions may comprise determining at least a parameter/variable has a value below/above a threshold. For example, the conditions may comprise receiving an uplink grant or downlink assignment comprising repetitions. For example, the wireless device may start the subband hopping timer in response to starting/applying the second subband hopping pattern. The wireless device may continue applying the second subband hopping pattern while the subband hopping timer is running. The wireless device may switch back (e.g. fall back) to the default subband hopping pattern if the subband hopping timer is expired (e.g., after a duration of T1). The wireless device may apply the default subband hopping pattern or the second subband hopping pattern before a hopping deactivation command is received.

Figure 25:
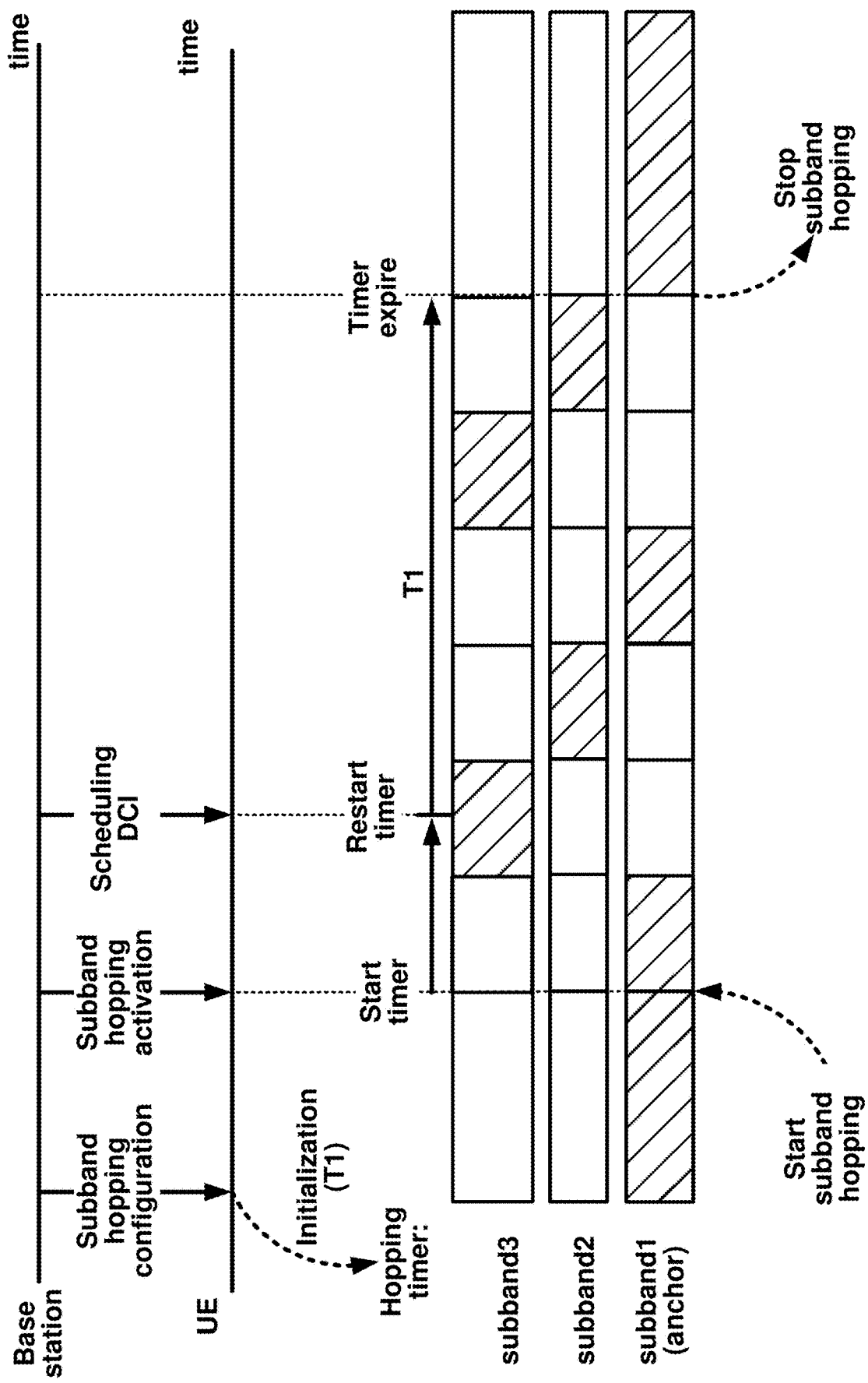
FIG. 25 shows an example of subband hopping operation with hopping timer as per one or more embodiments of the present disclosure.

FIG. 25 shows an example of subband hopping operation with hopping timer. As shown in the figure, the wireless device may start the subband hopping timer when starting to apply a subband hopping pattern. The timer may be running (e.g., a value of the timer variable may be decrementing per slot/msec/hop/etc.) and the wireless device may apply/perform subband hopping based on the subband hopping pattern. The wireless device may receive a DCI while the hopping timer is running. The DCI may be a scheduling DCI comprising one or more downlink assignments or uplink grants. The one or more downlink assignments or uplink grants may comprise repetitions. The wireless device may restart/reset the hopping timer in response to receiving the DCI. In an example, the wireless device may restart/reset the hopping timer in response to receiving a downlink assignment or uplink grant comprising repetition(s). In an example, the wireless device may restart/reset the hopping timer in response to determining a configured (e.g. periodic) downlink assignment or configured (e.g. periodic) uplink grant. The configured downlink assignment or the configured uplink grant may comprise repetition(s). The wireless device may continue hopping based on the effective subband hopping pattern while the hopping timer is running. The wireless device may stop hopping based on the (effective) subband hopping pattern if the hopping timer expires (e.g., after a duration of T1 is passed from a last (re)start of the timer).

The wireless device may restart/reset the hopping timer immediately when receiving a DCI. The wireless device may (re)start/reset the hopping timer immediately when detecting an activity in the active/effective subband. The wireless device may restart/reset the hopping timer immediately when detecting an activity in the anchor/primary/default subband. The wireless device may restart/reset the hopping timer immediately when detecting an activity in the active/effective BWP. The effective BWP may be a hopped-BWP comprising PRBs overlapping with a corresponding (active/effective) subband during each hopping interval. In an example, the wireless device may restart/reset the hopping timer after a timer offset from receiving the DCI and/or detecting the activity. For example, the wireless device may (re)start/reset the timer at the beginning of a next time slot/subframe/hopping interval/hop.

Figure 26:
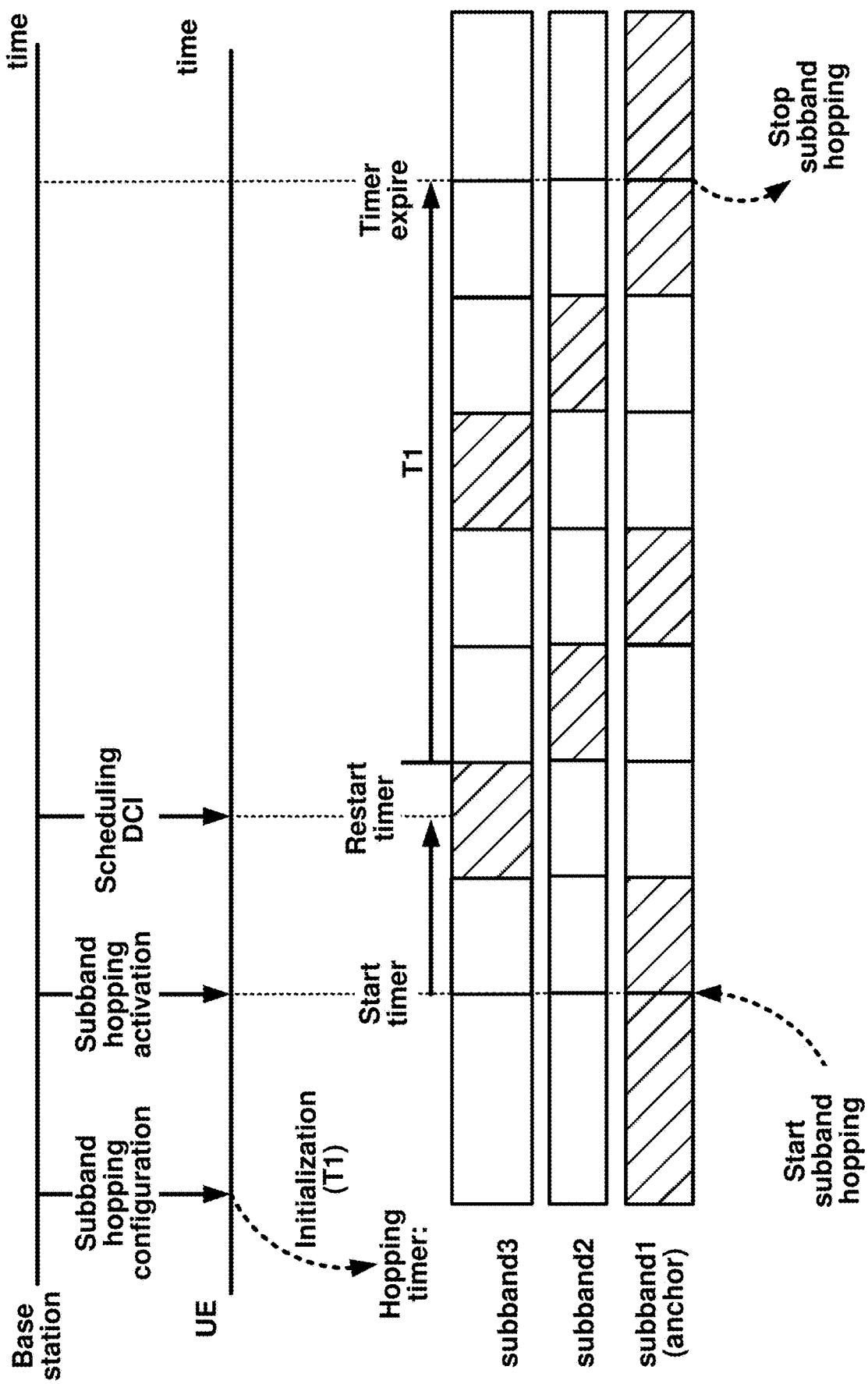
FIG. 26 shows an example of subband hopping operation with hopping timer as per one or more embodiments of the present disclosure.

FIG. 26 shows an example of subband hopping operation with hopping timer. In this example, the wireless device receives a scheduling DCI within a given slot/hop/hopping interval. However, the wireless device restarts the hopping timer at the next time slot/hop/hopping interval. This may be the case when the hopping timer is configured with a duration (T1) equal to multiple integers of hopping interval.

In an example, the wireless device may be configured with an active BWP comprising subbands. The wireless device may be configured with subband hopping across the subbands of the active BWP. The wireless device may be configured with a subband hopping timer. For example, the wireless device may be configured with a subband hopping pattern for the subbands of the BWP. The subband hopping pattern may be BWP-specific. The subband hopping pattern may be associated with the subband hopping timer. The wireless device may determine whether to apply the subband hopping pattern or not based on the subband hopping timer. The subband hopping timer may control subband hopping of the wireless device, e.g., based on a short-term activity within the active BWP.

The wireless device may be configured with a BWP inactivity timer. The BWP inactivity timer may control the BWP switching behavior of the wireless device, e.g., based on a long-term activity within the active BWP. The wireless device may determine whether to switch the BWP based on the BWP inactivity timer. For example, the wireless device may switch to the initial BWP upon expiration of the BWP inactivity timer.

In an example, the conditions based on which the wireless device may restart the BWP inactivity timer may be different from the conditions based on which the wireless device may restart the subband hopping timer. For example, the wireless device may restart the BWP inactivity timer if a DCI indicating a downlink assignment or uplink grant is received on the active BWP or for the active BWP. For example, the wireless device may restart the subband hopping timer if a DCI indicating a downlink assignment or uplink grant is received on the "effective" active BWP or for the effective active BWP. For example, the wireless device may restart the subband hopping timer if a DCI indicating a downlink assignment or uplink grant is received on the active/effective subband corresponding to the active/effective hopping interval (e.g., based on the resource allocation indicated by the DCI) or for the active/effective subband. For example, the wireless device may restart the subband hopping timer if a DCI indicating a downlink assignment or uplink grant is received on the anchor/primary/default/initial subband of the active BWP or for the anchor/primary/default/initial subband of the active BWP. For example, the duration of the BWP inactivity timer may comprise one or more durations of the subband hopping timer.

In an example, the duration of the BWP inactivity timer may be equal to an integer number multiplied by the duration of the subband hopping timer. In an example, the configuration of the BWP inactivity timer may be cell-specific. In an example, the configuration of the BWP inactivity timer may be UE-specific. In an example, the configuration of the subband hopping timer may be cell-specific. In an example, the configuration of the subband hopping timer may be BWP-specific. In an example, the configuration of the subband hopping timer may be UE-specific.

In an example, the wireless device may not be configured with BWP inactivity timer and the subband hopping timer at the same time. For example, the wireless device may not expect to receive configuration parameters of the subband hopping timer if the wireless device is configured with BWP inactivity timer. For example, the wireless device may not expect to receive configuration parameters of the BWP inactivity timer if the wireless device is configured with subband hopping timer and/or subband hopping pattern. In an example, the wireless device may deactivate/discard the BWP inactivity timer in response to receiving configuration parameter(s) of a subband hopping timer and/or subband hopping pattern. In an example, the wireless device may deactivate/discard the BWP inactivity timer in response to starting a subband hopping timer. In an example, the wireless device may determine a value of the BWP inactivity timer based on a value of the subband hopping timer. In an example, the wireless device may determine a value of the subband hopping timer based on a value of the BWP inactivity timer.

In an example, the wireless device may be configured with a BWP-set in a cell. The wireless device may be configured with BWP hopping across the BWPs of the set (e.g., as in FIG. 20). The wireless device may not be configured with BWP inactivity timer. In an example, the BWP inactivity timer may be considered/operate as subband/BWP hopping timer. In an example, the wireless device may not be configured with subband hopping timer, e.g., if a BWP-set for BWP hopping is configured and/or if a BWP inactivity timer is configured. For example, if subband/BWP hopping is activated/enabled/started, the wireless device may start the BWP inactivity timer. The wireless device may not restart the BWP inactivity timer if the MAC entity switches the active BWP within the BWP-set. For example, the wireless device may not restart the BWP inactivity timer upon each hop (BWP switch). For example, the wireless device may restart the BWP inactivity timer if a DCI scheduling a downlink assignment or uplink grant is received on the active BWP. For example, the wireless device may restart the BWP inactivity timer if a DCI scheduling a downlink assignment or uplink grant for the active BWP is received, and/or if the scheduled downlink assignment or the uplink grant overlaps with the time interval and/or frequency region corresponding with the active BWP (based on the hopping pattern). Otherwise, the wireless device may ignore the downlink assignment or the uplink grant and/or may not restart the BWP inactivity timer.

The wireless device may start the BWP inactivity timer in response to activating the cell. The wireless device may start the BWP inactivity timer in response to activating the BWP-set. The wireless device may start the BWP inactivity timer in response to activating a BWP from the BWP-set. The wireless device may stop/deactivate/disable BWP hopping based on the hopping pattern upon expiration of the BWP inactivity timer when BWP hopping is activated/enabled/configured. In an example, the wireless device may switch to another BWP-set upon expiration of the BWP inactivity timer when BWP hopping is activated/enabled/configured. In an example, the wireless device may switch to a default/primary/anchor BWP of the BWP-set upon expiration of the BWP inactivity timer when BWP hopping is activated/enabled/configured. The default/primary/anchor BWP may be indicated via signaling (e.g., DCI and/or MAC-CE and/or RRC message). The default/primary/anchor BWP may be pre-defined, e.g., the BWP in the set with the lowest BWP index, or the BWP in the set with the lowest starting PRB index.

In an example, the wireless device may be configured by multiple BWPs. The wireless device may be configured with multiple BWP inactivity timers, e.g., a BWP inactivity timer per BWP. The wireless device may reset/restart a BWP inactivity timer of a BWP if it's used for hopping (e.g., if the wireless device hops to the BWP based on the hopping pattern). The wireless device may reset/restart all BWP inactivity timers of the multiple BWPs if a BWP is used for hopping (e.g., if the wireless device hops to the BWP based on the hopping pattern). In an example, the wireless device may restart/reset the BWP inactivity timer of a BWP when data/control/configured grant/assignment is received/transmitted on the BWP based on the hopping pattern (e.g., when the wireless device is using the BWP based on the hopping pattern). In an example, the wireless device may restart/reset the BWP inactivity timer of a BWP only when control information is received/transmitted on the BWP based on the hopping pattern (e.g., when the wireless device is using the BWP based on the hopping pattern). In an example, the wireless device may restart/reset the BWP inactivity timer of a BWP only when control information is received/transmitted and/or configured downlink assignment is received or configured uplink grant is transmitted on the BWP based on the hopping pattern (e.g., when the wireless device is using the BWP based on the hopping pattern). The wireless device may change to anchor/primary/default BWP if the BWP inactivity timer is expired. The wireless device may not apply hopping while in/using the anchor/primary/default BWP. In an example, the wireless device may substitute the anchor/primary/default BWP with a first BWP whose BWP inactivity timer is expired. For example, the wireless device may hop to the anchor/primary/default BWP instead of the BWP with an expired BWP inactivity timer when applying the hopping pattern. In an example, the multiple BWP inactivity timers may be the same/equal. In an example, the wireless device may expect a same BWP inactivity timer for the multiple BWPs used for hopping. In an example, the wireless device may ignore the BWP inactivity timers of the multiple BWPs except for the anchor/primary/default BWP.

In an example, the wireless device may be configured with a BWP inactivity timer. The wireless device may apply the BWP inactivity timer to the anchor/primary/default BWP. For example, the wireless device may restart/reset the BWP inactivity timer for the anchor/primary/default BWP based on the communications/scheduling in/for the anchor/primary/default BWP, e.g., irrespective of the other BWPs that the wireless device may hop to/use based on subband hopping. The wireless device may change/switch to anchor/primary/default BWP if the BWP inactivity timer is expired. The wireless device may not apply hopping if the BWP inactivity timer expires.

A wireless device may receive one or more radio resource control (RRC) messages comprising configuration parameters. The configuration parameters may indicate a plurality of subbands of a cell. A bandwidth of a subband may be equal to or smaller than a bandwidth capability of the wireless device. The configuration parameters may indicate a subband hopping pattern for the plurality of subbands. The configuration parameters may indicate a first duration for the subband hopping pattern. The wireless device may transition to a first subband of the plurality of subbands based on the subband hopping pattern. The wireless device may determine, based on the first duration, to communicate via a second subband without applying the subband hopping pattern. The wireless device may communicate via the second subband.

A subband may be a bandwidth part (BWP) of the cell. A bandwidth part (BWP) of the cell may comprise the plurality of subbands. The BWP may be an active downlink BWP. The communicating may comprise monitoring at least one downlink control channel. The BWP my be an active uplink BWP. The communicating may comprise transmitting uplink transmissions. The second subband may be the first subband. The second subband may have a lowest subband index among the plurality of subbands. The second subband may comprise a resource block (RB) of the BWP with a lowest RB index. The second subband may be a primary subband indicated by the configuration parameters. The second subband may not be among the plurality of subbands.

The wireless device may determine the second subband based on a second subband hopping pattern. The configuration parameters may indicate the second subband hopping pattern. The second subband hopping pattern may be pre-defined. The second subband hopping pattern may be for second subbands. The second subbands may comprise the plurality of subbands.

The wireless device may decrement the first duration per time slot. The wireless device may switch, in response to expiration of the first duration, from the first subband to the second subband. The wireless device may suspend/stop the decrementing the first duration in response to receiving an indication of subband hopping suspension. The indication may be received via a downlink control information. The indication may be received via a MAC control element (MAC-CE). The wireless device may suspend/stop the decrementing the first duration in response to receiving an indication of a BWP switch/cell deactivation. The wireless device may suspend/stop the decrementing the first duration in response to receiving a resource allocation for/in a BWP comprising the plurality of subbands without repetition. The wireless device may suspend/stop the decrementing the first duration in response to receiving an indication of a listen-before-talk (LBT) failure in a BWP comprising the plurality of subbands. The wireless device may restart a value of the first duration in response to receiving an uplink grant or a downlink assignment for/in a BWP comprising the plurality of subbands. The wireless device may restart a value of the first duration in response to receiving a resource allocation comprising repetitions for/in a BWP comprising the plurality of subbands. The wireless device may restart a value of the first duration in response to receiving a MAC protocol data unit (PDU) in a configured downlink assignment in a BWP comprising the plurality of subbands. The wireless device may restart a value of the first duration in response to transmitting a MAC protocol data unit (PDU) in a configured uplink grant in a BWP comprising the plurality of subbands. A listen-before-talk (LBT) failure indication may not be received in a BWP comprising the plurality of subbands.

The first duration may occur periodically. The configuration parameters may indicate a periodicity for the first duration. A periodicity for the first duration may be predefined. The subband hopping pattern may be periodic, and a period associated with the subband hopping pattern may comprise the first duration followed by a second duration. The second duration may start immediately after an expiration of the first duration. The wireless device may start/restart/apply the subband hopping pattern during the first duration. The wireless device may suspend/stop/not apply the subband hopping pattern during the second duration. The wireless device may start a timer based on the first duration. The wireless device may start the timer in response to activation of a bandwidth part (BWP) comprising the plurality of subbands. The wireless device may start the timer in response to activating/enabling/applying the subband hopping pattern. The wireless device may reset/restart the timer in response to receiving an uplink grant or a downlink assignment for/in a subband corresponding to the subband hopping pattern, while the timer is running. The wireless device may reset/restart the timer in response to receiving a resource allocation comprising repetitions for/in a BWP comprising the plurality of subbands, while the timer is running. The wireless device may reset/restart the timer in response to receiving a MAC protocol data unit (PDU) in a configured downlink assignment in a subband corresponding to the subband hopping pattern, while the timer is running. The wireless device may reset/restart the timer in response to transmitting a MAC protocol data unit (PDU) in a configured uplink grant in a subband corresponding to the subband hopping pattern, while the timer is running. A listen-before-talk (LBT) failure indication is not received in a BWP comprising the subband. The determining may comprise determining to communicate via the second subband without applying the subband hopping pattern while the timer is not running/after the timer expires. The wireless device may stop to apply the subband hopping pattern in response to expiration of the timer. The wireless device may start the timer after the expiration, based on the first duration, in response to activating/enabling/applying the subband hopping pattern. The wireless device may change/update the first value based on receiving a downlink control information and/or a MAC control element (MAC-CE). The subband hopping pattern may comprise: a starting time for subband hopping; a reference subband; a hopping time interval; and/or a hopping frequency offset.

A wireless device may receive one or more radio resource control (RRC) messages comprising configuration parameters. The configuration parameters may indicate a bandwidth part (BWP) of a cell, comprising a plurality of subbands. A bandwidth of a subband may be equal to or smaller than a bandwidth capability of the wireless device. The configuration parameters may indicate a subband hopping pattern for the plurality of subbands. The configuration parameters may indicate a first value of a hopping timer for the subband hopping pattern. In response to activating/starting subband hopping based on the subband hopping pattern, the wireless device may start the hopping timer for a duration equal to the first value. In response to expiration of the hopping timer, the wireless device may deactivate/stop the subband hopping based on the subband hopping pattern.

A wireless device may receive one or more radio resource control (RRC) messages comprising configuration parameters. The configuration parameters may indicate a plurality of bandwidth parts (BWPs) of a cell. A bandwidth of a BWP may be equal to or smaller than a bandwidth capability of the wireless device. The configuration parameters may indicate a BWP hopping pattern for the plurality of BWPs of the cell. The configuration parameters may indicate a first value of a timer for the BWP hopping pattern. In response to activating/starting BWP hopping based on the BWP hopping pattern, the wireless device may start the timer for a duration equal to the first value. In response to expiration of the hopping timer, the wireless device may deactivate/stop the BWP hopping based on the BWP hopping pattern.

What is claimed is:

1. A wireless device comprising:
one or more processors; and
a memory storing instructions that, when executed by the one or more processors, cause the wireless device to:
receive, from a base station, configuration parameters indicating a hopping pattern of bandwidth parts (BWPs) of a cell;
start a BWP inactivity timer in response to activating a first BWP of the cell;
restart the BWP inactivity timer in response to receiving a downlink control information (DCI) scheduling a downlink assignment or uplink grant for the first BWP;
in response to activating the hopping pattern, stopping the BWP inactivity timer; and
in response to deactivating the hopping pattern, restarting the BWP inactivity timer.

2. The wireless device of claim 1, wherein the configuration parameters indicate the hopping pattern, of the BWPs, across time slots.

3. The wireless device of claim 1, wherein the configuration parameters further indicate a plurality of BWPs of the cell comprising a BWP set, wherein the hopping pattern is on the BWP set.

4. The wireless device of claim 3, wherein the instructions further cause the wireless device to determine to activate the hopping pattern for the BWP set.

5. The wireless device of claim 1, wherein the instructions further cause the wireless device to, after deactivating the hopping pattern, switch from the first BWP to a default BWP in response to the BWP inactivity timer expiring.

6. The wireless device of claim 1, wherein the instructions further cause the wireless device to:
receive an indication to activate the hopping pattern, wherein the indication is received via one of:
the downlink control information;
a medium access control-control element (MAC-CE); or
a radio resource control (RRC) message; and
activate the hopping pattern in response to receiving the indication.

7. The wireless device of claim 1, wherein the instructions further cause the wireless device to determine to activate the hopping pattern based on a periodicity of the hopping pattern.

8. The wireless device of claim 7, wherein the configuration parameters further indicate:
the periodicity of the hopping pattern; and
a hopping timer.

9. The wireless device of claim 7, wherein the instructions further cause the wireless device to determine to activate the hopping pattern based on measuring a value of a channel parameter to be at least one of:

below a first threshold; or
above a second threshold.

10. A base station comprising:
one or more processors; and
a memory storing instructions that, when executed by the one or more processors, cause the base station to:
transmit, to a wireless device, configuration parameters indicating a hopping pattern of bandwidth parts (BWPs) of a cell;
start a BWP inactivity timer, for the wireless device, in response to activating a first BWP of the cell for the wireless device;
restart the BWP inactivity timer in response to transmitting a downlink control information (DCI) scheduling a downlink assignment or uplink grant for the first BWP;
in response to activating the hopping pattern, stopping the BWP inactivity timer; and
in response to deactivating the hopping pattern, restarting the BWP inactivity timer.

11. The base station of claim 10, wherein the configuration parameters indicate the hopping pattern, of the BWPs, across time slots.

12. The base station of claim 10, wherein the configuration parameters further indicate a plurality of BWPs of the cell comprising a BWP set, wherein the hopping pattern is on the BWP set.

13. The base station of claim 12, wherein the instructions further cause the base station to determine to activate the hopping pattern for the BWP set.

14. The base station of claim 10, wherein the instructions further cause the base station to, after deactivating the hopping pattern, switch from the first BWP to a default BWP in response to the BWP inactivity timer expiring.

15. The base station of claim 10, wherein the instructions further cause the base station to:
transmit an indication to activate the hopping pattern, wherein the indication is transmitted via one of:
the downlink control information;
a medium access control-control element (MAC-CE); or
a radio resource control (RRC) message; and
activate the hopping pattern in response to transmitting the indication.

16. The base station of claim 10, wherein the instructions further cause the base station to determine to activate the hopping pattern based on a periodicity of the hopping pattern.

17. The base station of claim 16, wherein the configuration parameters further indicate:
the periodicity of the hopping pattern; and
a hopping timer.

18. The base station of claim 16, wherein the instructions further cause the base station to determine to activate the hopping pattern based on measuring a value of a channel parameter to be at least one of:
below a first threshold; or
above a second threshold.

19. A non-transitory computer-readable medium comprising instructions that, when executed by one or more processors of a wireless device, cause the wireless device to:
receive, from a base station, configuration parameters indicating a hopping pattern of bandwidth parts (BWPs) of a cell;
start a BWP inactivity timer in response to activating a first BWP of the cell;
restart the BWP inactivity timer in response to receiving a downlink control information (DCI) scheduling a downlink assignment or uplink grant for the first BWP;
in response to activating the hopping pattern, stopping the BWP inactivity timer; and
in response to deactivating the hopping pattern, restarting the BWP inactivity timer.

20. The non-transitory computer-readable medium of claim 19, wherein the configuration parameters indicate the hopping pattern, of the BWPs, across time slots.

* * * * *